United States Patent
Jang et al.

(10) Patent No.: US 11,902,569 B2
(45) Date of Patent: Feb. 13, 2024

(54) INTER PREDICTION METHOD AND APPARATUS IN VIDEO CODING SYSTEM

(71) Applicant: LG Electronics Inc., Seoul (KR)

(72) Inventors: Hyeongmoon Jang, Seoul (KR); Eunyong Son, Seoul (KR); Moonmo Koo, Seoul (KR); Seungwook Park, Seoul (KR); Yongjoon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/957,916

(22) Filed: Sep. 30, 2022

(65) Prior Publication Data

US 2023/0035396 A1 Feb. 2, 2023

Related U.S. Application Data

(63) Continuation of application No. 17/348,204, filed on Jun. 15, 2021, now Pat. No. 11,503,334, which is a
(Continued)

(51) Int. Cl.
*H04N 19/56* (2014.01)
*H04N 19/176* (2014.01)
(Continued)

(52) U.S. Cl.
CPC .......... *H04N 19/56* (2014.11); *H04N 19/105* (2014.11); *H04N 19/124* (2014.11);
(Continued)

(58) Field of Classification Search
CPC .... H04N 19/513; H04N 19/176; H04N 19/52; H04N 19/56; H04N 19/61; H04N 19/573;
(Continued)

(56) References Cited

U.S. PATENT DOCUMENTS

2015/0312588 A1* 10/2015 Yamamoto ........... H04N 19/463
375/240.15

FOREIGN PATENT DOCUMENTS

| CN | 102939618 | 2/2013 |
|---|---|---|
| EP | 0765087 | 3/1997 |

(Continued)

OTHER PUBLICATIONS

European Office Action in European Application No. 16835322.5, dated Nov. 20, 2019, 9 pages.
(Continued)

*Primary Examiner* — Farhan Mahmud
(74) *Attorney, Agent, or Firm* — Fish & Richardson P.C.

(57) ABSTRACT

A video decoding method performed by a decoding apparatus includes the steps of: deriving control points (CP) for a current block; acquiring movement vectors for the CPs; deriving a sample unit movement vector in the current block on the basis of the acquired movement vectors; and deriving a prediction sample for the current block on the basis of the sample unit movement vector. According to the present invention, it is possible to effectively perform, through sample unit motion vectors, inter-prediction not only in a case where an image in the current block is plane-shifted but also in a case where there are various image distortions.

16 Claims, 20 Drawing Sheets

Related U.S. Application Data continuation of application No. 16/773,958, filed on Jan. 27, 2020, now Pat. No. 11,122,290, which is a continuation of application No. 15/751,077, filed as application No. PCT/KR2016/007734 on Jul. 15, 2016, now Pat. No. 10,582,215.

(60) Provisional application No. 62/202,182, filed on Aug. 7, 2015.

(51) Int. Cl.
*H04N 19/124* (2014.01)
*H04N 19/503* (2014.01)
*H04N 19/105* (2014.01)
*H04N 19/70* (2014.01)
*H04N 19/182* (2014.01)
*H04N 19/513* (2014.01)
*H04N 19/66* (2014.01)
*H04N 19/91* (2014.01)

(52) U.S. Cl.
CPC ......... *H04N 19/176* (2014.11); *H04N 19/182* (2014.11); *H04N 19/503* (2014.11); *H04N 19/513* (2014.11); *H04N 19/66* (2014.11); *H04N 19/70* (2014.11); *H04N 19/91* (2014.11)

(58) Field of Classification Search
CPC .... H04N 19/58; H04N 19/139; H04N 19/157; G06K 9/481
See application file for complete search history.

(56) References Cited

FOREIGN PATENT DOCUMENTS

| | | |
|---|---|---|
| JP | H09172644 | 6/1997 |
| JP | H09200763 | 7/1997 |
| KR | 20140113854 | 9/2014 |
| WO | WO2011128365 | 10/2011 |
| WO | WO2011149292 | 12/2011 |
| WO | WO2015099816 | 7/2015 |

OTHER PUBLICATIONS

Extended European Search Report in European Appln. No. 16835322.5, dated Feb. 18, 2019, 12 pages.

Huang et al., "Control-Point Representation and Differential Coding Affine-Motion Compensation," IEEE Transactions on Circuits and Systems for Video Technology, Oct. 2013, 23(10): 1651-1660.

JVET, "Algorithm description of Joint Exploration Test Model 2 (JEM2)," JVET-B1001_v3, Joint Video Exploration Team (JVET) of ITU-T SG 16 WP 3 and 1SO/IEC JTC 1/SC 29/WG 11, San Diego, CA, US, Feb. 20-26, 2016, 17 pages.

LG Electronics (China) R&D Center, Peking University, "Parallel AMVP candidate list construction," JCTVC-I0036, 99Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, 20 pages.

Office Action in Chinese Appln. No. 201680055123.2, dated Jun. 1, 2021, 16 pages (with English translation).

\* cited by examiner

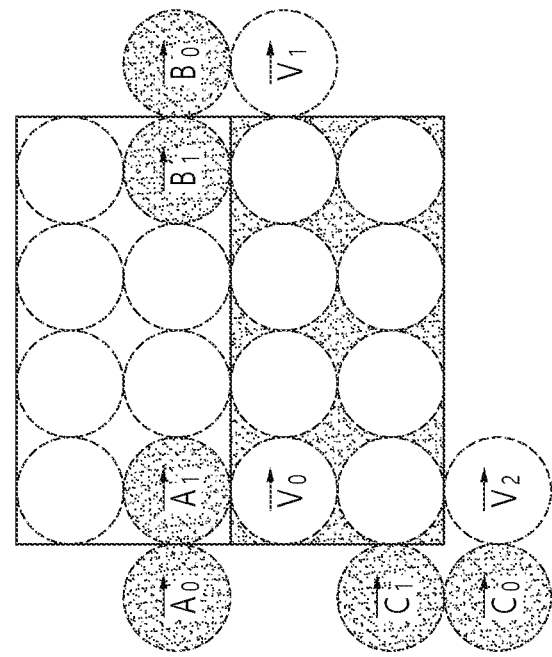
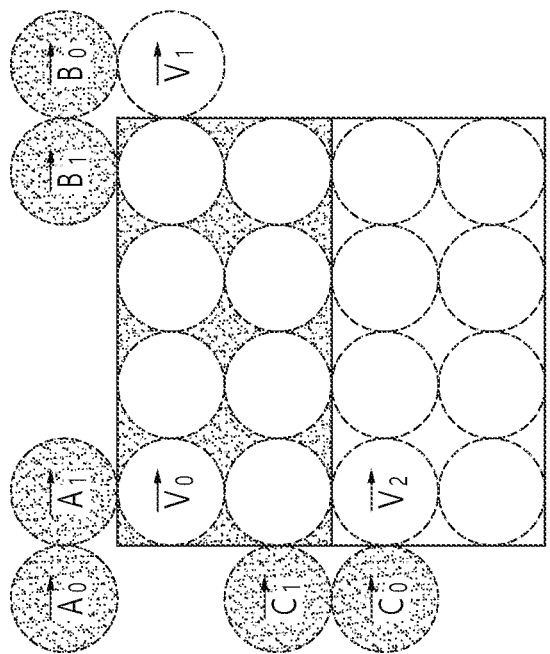
FIG. 12

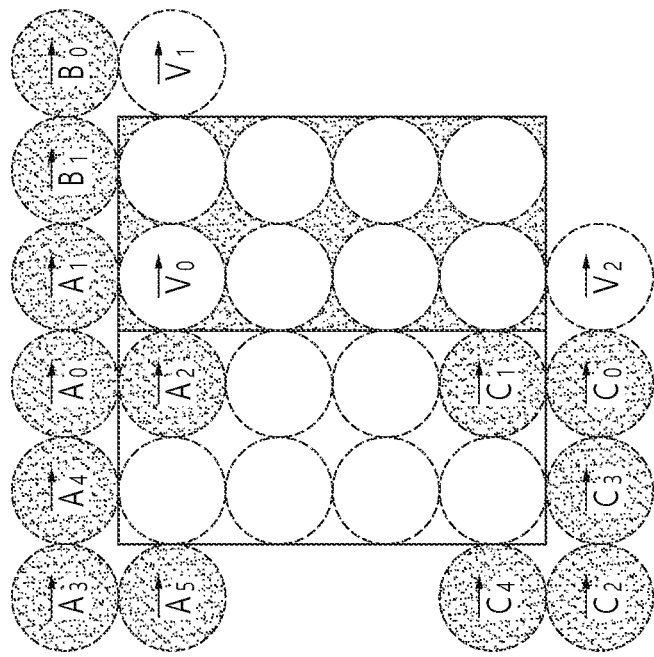
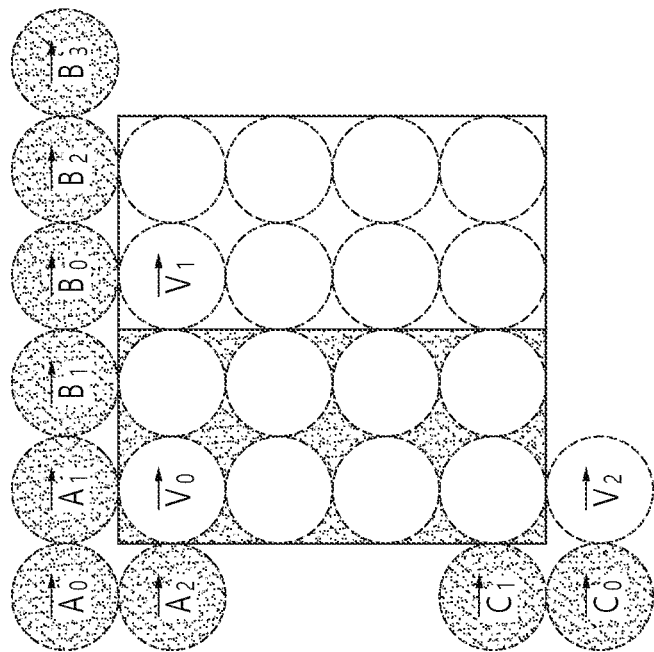
FIG. 13

FIG. 14
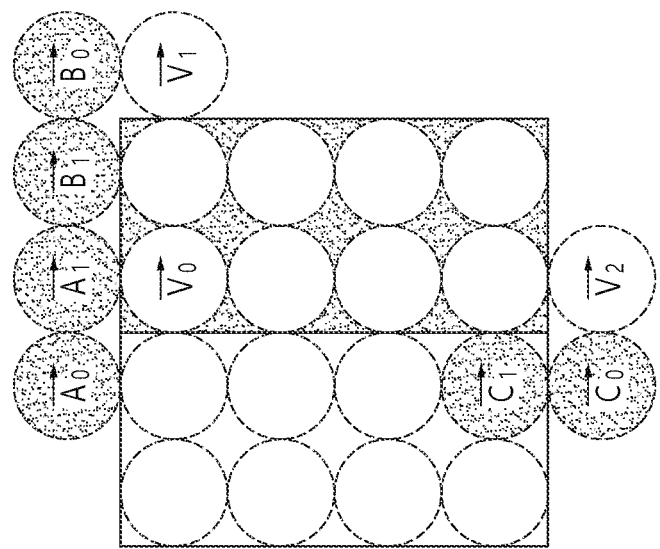
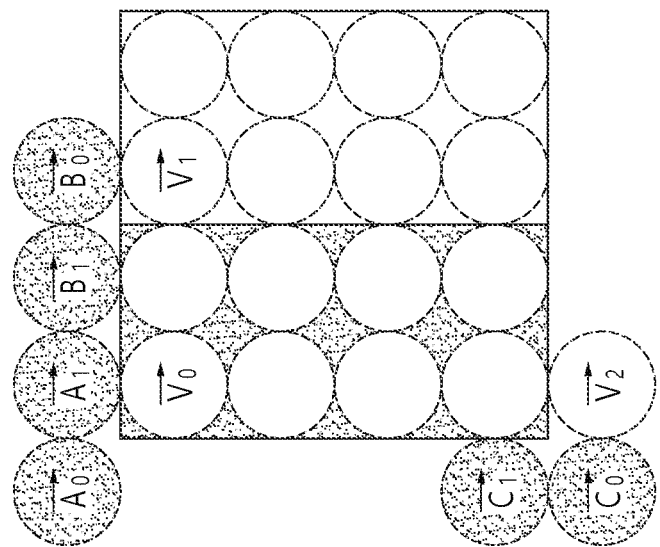

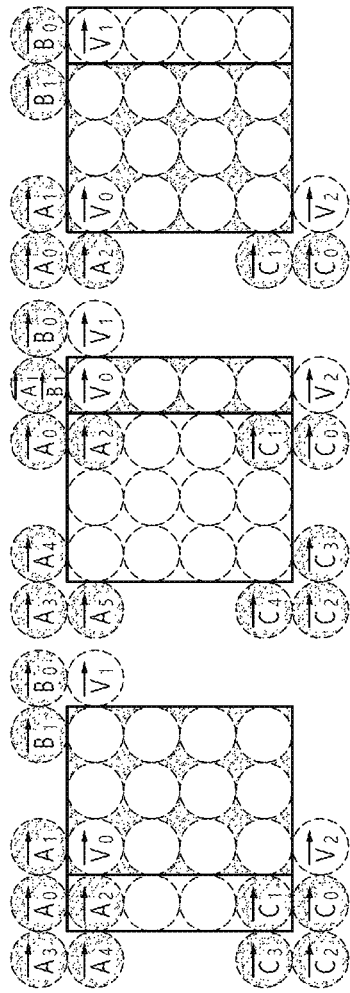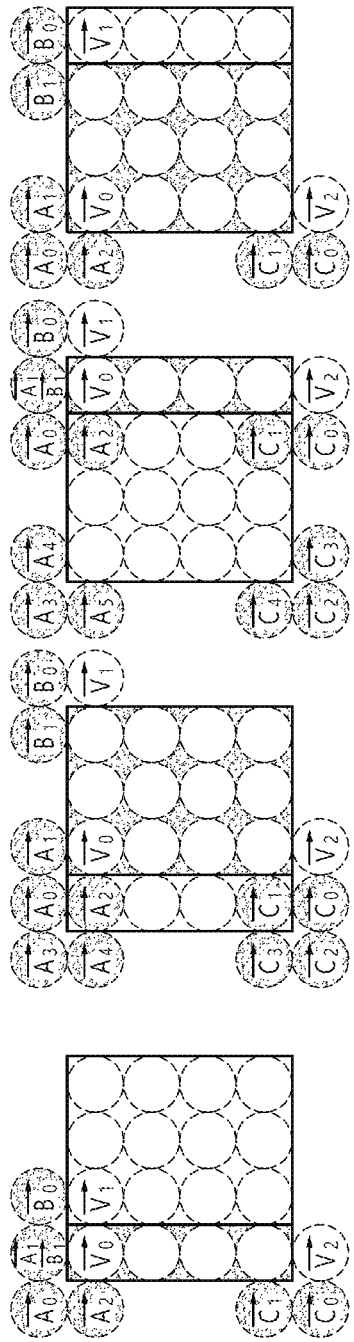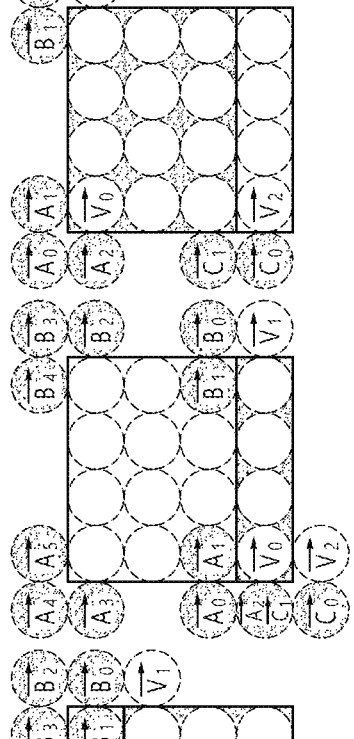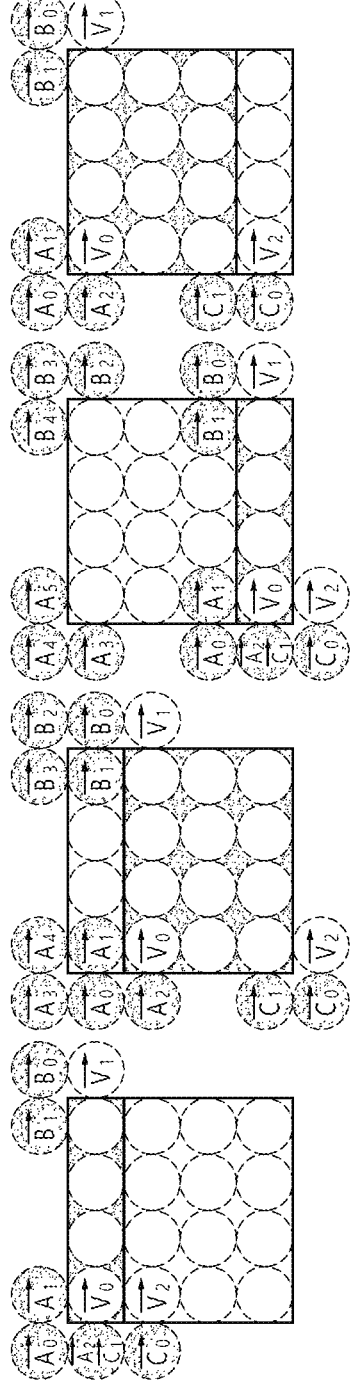

● : Control point's motion information of coded block
▨ : Current PU
○ : Needed to code motion information of control point for current PU ● : Control point's motion information of coded block
▨ : Current PU

INTER PREDICTION METHOD AND APPARATUS IN VIDEO CODING SYSTEM

CROSS-REFERENCE TO RELATED APPLICATIONS

This application is a continuation of U.S. application Ser. No. 17/348,204, filed on Jun. 15, 2021, which is a continuation of U.S. application Ser. No. 16/773,958, filed on Jan. 27, 2020, now U.S. Pat. No. 11,122,290, which is a continuation of U.S. application Ser. No. 15/751,077, filed on Feb. 7, 2018, now U.S. Pat. No. 10,582,215, which is a National Stage application under 35 U.S.C. § 371 of International Application No. PCT/KR2016/007734, filed Jul. 15, 2016, which claims the benefit of U.S. Provisional Application No. 62/202,182, filed on Aug. 7, 2015. The disclosures of the prior applications are incorporated by reference in their entirety.

TECHNICAL FIELD

The present invention relates to a video coding technology and, more particularly, to an inter-prediction method and apparatus in a video coding system.

BACKGROUND

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

The present invention provides a method and a device for enhancing image coding efficiency.

Another technical purpose of the present invention is to provide an affine motion model based inter-prediction method and device.

Another technical purpose of the present invention is to provide a method and device for performing sample unit motion vector based inter-prediction.

Another technical purpose of the present invention is to provide a method and device for deriving a sample unit motion vector based on a motion vector of control points for the current block.

Another technical purpose of the present invention is to provide a method and device for deriving a motion vector regarding control points of a current block as a non-square block based on a sample of a neighboring block.

Another technical purpose of the present invention is to provide a method and device for deriving a motion vector regarding a control point of a current block based on a motion vector regarding a control point of a previously decoded neighboring block.

In an aspect, a video decoding method performed by a decoding device is provided. The decoding method includes: deriving control points (CPs) for a current block; obtaining motion vectors for the CPs; deriving a sample unit motion vector in the current block on the basis of the obtained motion vectors; and deriving a prediction sample for the current block on the basis of the sample unit motion vector.

In another aspect, a decoding device performing video decoding is provided. The decoding device includes: a decoding unit obtaining prediction mode information regarding a current block from a bit stream; a prediction unit deriving control points (CPs) regarding the current block, obtaining motion vectors regarding the CPs, deriving a sample unit motion vector in the current block based on the obtained motion vectors, and deriving a prediction sample regarding the current block based on the sample unit motion vector; and an adder generating a reconstructed sample based on the prediction sample.

In another aspect, a video encoding method performed by an encoding device is provided. The video encoding method includes: driving control points (CPs) regarding a current block; obtaining motion vectors regarding the CPs; deriving a sample unit motion vector in the current block based on the obtained motion vectors; generating a prediction sample regarding the current block based on the sample unit motion vector; and encoding prediction mode information regarding the current block and outputting the encoded prediction mode information.

In another aspect, an encoding device performing video encoding is provided. The encoding device includes: a prediction unit determining a prediction mode regarding a current block, deriving control points (CPs) regarding the current block, obtaining motion vectors regarding the CPs, deriving a sample unit motion vector in the current block based on the obtained motion vectors, and generating a prediction sample regarding the current block based on the sample unit motion vector; and an encoding unit encoding prediction mode information regarding the current block and outputting the encoded prediction mode information.

According to the present invention, more accurate sample-based motion vectors for the current block may be derived and thus the inter-prediction efficiency may be significantly increased.

According to the present invention, motion vectors for samples in the current block may be efficiently derived based on the motion vectors of the control points for the rent block.

According to the present invention, motion vectors of control points for a current block may be derived based on motion vectors of control points of a previously decoded neighboring block, without additionally transmitting information regarding the motion vectors of the control points for the current block. Accordingly, an amount of data for the motion vectors of the control points may be eliminated or reduced, and overall coding efficiency may be improved.

According to the present invention, inter-prediction may be effectively performed through sample unit motion vectors even in case where an image in the current block is rotated, zoomed in, zoomed out, or deformed to parallelogram, as well as in case where the image of the current block is plane-shifted. Accordingly, an amount of data for a residual signal for the current block may be eliminated or reduced, and overall coding efficiency may be improved.

BRIEF DESCRIPTION OF THE DRAWINGS

FIG. 12 is a view illustrating a configuration in which prediction candidates of CPs of a PU to which the partitioning type 2N×N is applied are limited to two prediction candidates.

FIG. 13 is a view illustrating motion information prediction candidates of CPs of a PU to which the partitioning type N×2N is applied.

FIG. 14 is a view illustrating a configuration in which prediction candidates of the CPs of a PU to which the partitioning type N×2N is applied are limited to two prediction candidates.

FIGS. 15A to 15D are views illustrating motion information prediction candidates of CPs of asymmetric PUs.

DETAILED DESCRIPTION

Figure 1:
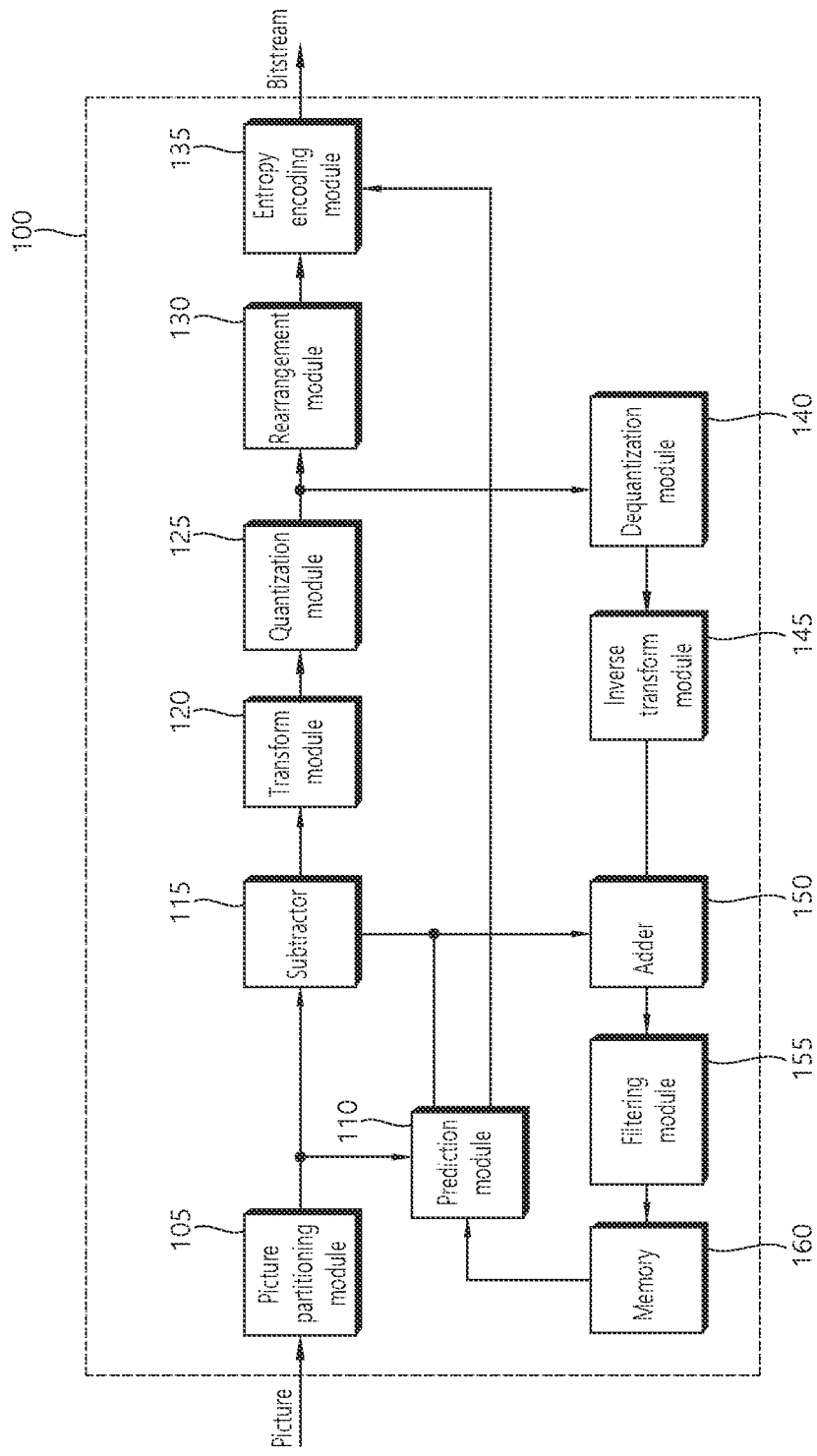
FIG. 1 is a block diagram schematically illustrating a video encoding device according to an embodiment of the invention.

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions in an image encoding/decoding device and does not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, exemplary embodiments of the invention will be described in detail with reference to the accompanying drawings.

FIG. 1 is a block diagram schematically illustrating a video encoding device according td an embodiment of the invention.

Referring to FIG. 1, a video encoding device 100 includes a picture partitioning module 105, a prediction module 110, a transform module 120, a quantization module 125, a rearrangement module 130, an entropy encoding module 135, a dequantization module 140, an inverse transform module 145, a filtering module 155, and memory 160.

The picture partitioning module 105 may be configured to split the input picture into at least one processing unit block. In this connection, a block as a processing unit may be a prediction unit PU, a transform unit TU, or a coding unit CU. The picture may be composed of a plurality of coding tree unit CTUs. Each CTU may be split into CUs as a quad tree structure. The CU may be split into CUs having a deeper depth as a quad-tree structures. The PU and TU may be obtained from the CU. For example, the PU may be partitioned from a CU into a symmetric or asymmetric square structure. Further, the TU may be split into a quad tree structure from the CU, The CTU may correspond to a coding tree block CTB the CU may correspond to a coding block CB, the PU may correspond to a prediction block PB and the TU may correspond to a transform block TB.

The prediction module 110 includes an inter-prediction unit that performs an inter-prediction process and an intra prediction unit that performs an intra prediction process, as will be described later. The prediction module 110 performs a prediction process on the processing units of a picture divided by the picture partitioning module 105 to create a prediction block including a predicted sample or a predicted sample array. In the prediction module 110, the processing unit of a picture may be a CU, a TU, or a PU. The prediction module 110 may determine whether the prediction performed on the corresponding processing unit is an inter-prediction or an intra prediction, and may determine specific details for example, a prediction mode of the prediction methods. The processing unit subjected to the prediction process may be different from the processing unit of which the prediction method and the specific details are determined. For example, the prediction method and the prediction mode may be determined in the units of PU and the prediction process may be performed in the units of TU.

In the inter-prediction, a prediction process may be performed on the basis of information on at least one of a previous picture and/or a subsequent picture of a current picture to create a prediction block. In the intra prediction, a prediction process may be performed on the basis of pixel information of a current picture to create a prediction block.

As an inter-prediction method, a skip mode, a merge mode, and Advanced Motion Vector Prediction (AMVP) may be used. In inter-prediction, a reference picture may be selected for the PU and a reference block corresponding to the PU may be selected. The reference block may be selected on an integer pixel (or sample) or fractional pixel (or sample) basis. Then, a prediction block is generated in which the residual signal with respect to the PU is minimized and the motion vector magnitude is also minimized. Pixels, pels, and samples may be used interchangeably herein.

A prediction block may be generated as an integer pixel unit, or as a fractional pixel unit such as a ½ pixel unit or a ¼ pixel unit. In this connection, a motion vector may also be expressed as a fractional pixel unit.

Information such as the index of the reference picture selected via the inter-prediction, the motion vector difference MDV, the motion vector predictor MVP, residual signal, etc., may be entropy encoded and then transmitted to the decoding device. When the skip mode is applied, the prediction block may be used as a reconstruction block, so that the residual may not be generated, transformed, quantized, or transmitted.

When the intra prediction is performed, the prediction mode may be determined in the unit of PU and the prediction process may be performed in the unit of PU. Alternatively, the prediction mode may be determined in the unit of PU and the inter-prediction may be performed in the unit of TU.

The prediction modes in the intra prediction may include 33 directional prediction modes and at least two non-directional modes, as an example. The non-directional modes may include a DC prediction mode and a planar mode.

In the intra prediction, a prediction block may be configured after a filter is applied to a reference sample. At this time, it may be determined whether a filter should be applied to a reference sample depending on the intra prediction mode and/or the size of a current block.

Residual values (a residual block or a residual signal) between the constructed prediction block and the original block are input to the transform module 120. The prediction mode information, the motion vector information, and the like used for the prediction are encoded along with the residual values by the entropy encoding module 135 and are transmitted to the decoding device.

The transform module 120 performs a transform process on the residual block in the unit of TUs and generates transform coefficients.

A transform block is a rectangular block of samples and is a block to which the same transform is applied. The transform block may be a TU and may have a quad-tree structure.

The transform module 120 may perform a transform process depending on the prediction mode applied to a residual block and the size of the block.

For example, when intra prediction is applied to a residual block and the residual block has an 4×4 array, the residual block is transformed using discrete sine transform DST. Otherwise, the residual block may be transformed using discrete cosine transform DCT.

The transform module 120 may construct a transform block of transform coefficients through the transform.

The quantization module 125 may quantize the residual values, that is, transform coefficients, transformed by the transform module 120 and may create quantization coefficients. The values calculated by the quantization module 125 may be supplied to the dequantization module 140 and the rearrangement module 130.

The rearrangement module 130 may rearrange the transform coefficients supplied from the quantization module 125. By rearranging the quantization coefficients, it is possible to enhance the encoding efficiency in the entropy encoding module 135.

The rearrangement module 130 may rearrange the quantized transform coefficients in the form of a two-dimensional block to the form of a one-dimensional vector through the use of a coefficient scanning method.

The entropy encoding module 135 may be configured to entropy code the symbol according to a probability distribution based on the quantized transform values rearranged by the rearrangement module 130 or the encoding parameter value calculated during the encoding process, etc. and then to output a bit stream. The entropy encoding method is a method of receiving a symbol having various values and expressing the symbol as a binary string that may be decoded while removing statistical redundancy thereof.

In this connection, the symbol means the to-be encoded/decoded syntax element, coding parameter, residual signal value and so on. The encoding parameter is required for encoding and decoding. The encoding parameter may contain information that may be inferred during encoding or decoding, as well as information encoded in an encoding device and passed to a decoding device like the syntax element. The encoding parameter is the information needed to encode or decode the image. The encoding parameter may include statistics or values such as for example, the intra/inter-prediction mode, movement/motion vector, reference picture index, coding block pattern, residual signal presence or absence, transform coefficient, quantized transform coefficient, quantization parameter, block size, block partitioning information, etc. Further, the residual signal may mean a difference between an original signal and a prediction signal. Further, the difference between the original signal and the prediction signal may be transformed to define the residual signal, or the difference between the original signal and the prediction signal may be transformed and quantized to define the residual signal. The residual signal may be called the residual block in the block unit, and may be called the residual samples in the sample unit.

When the entropy encoding is applied, the symbols may be expressed so that a small number of bits are allocated to a symbol having a high probability of occurrence, and a large number of bits are allocated to a symbol having a low probability of occurrence. This may reduce the size of the bit string for the to-be-encoded symbols. Therefore, the compression performance of image encoding may be increased via the entropy encoding.

Encoding schemes such as exponential Golomb, Context-Adaptive Variable Length Coding (CAVLC), and Context-Adaptive Binary Arithmetic Coding (CABAC) may be used for the entropy encoding. For example, the entropy encoding module 135 may store therein a table: for performing entropy encoding, such as a variable length coding/code (VLC) table. The entropy encoding module 135 may perform entropy encoding using the stored VLC table. Further, the entropy encoding module 135 derives a binarization method of a corresponding symbol and a probability model of a corresponding symbol/bin, and then performs entropy encoding using the derived binarization method or probability model.

The entropy encoding module 135 may give a predetermined change to a parameter set or syntaxes to be transmitted, if necessary.

The dequantization module 140 dequantizes the values transform coefficients quantized by the quantization module 125. The inverse transform module 145 inversely transforms the values dequantized by the dequantization module 140.

The residual value or residual samples or residual samples array generated by the dequantization module 140 and the inverse transform module 145, and the prediction block predicted by the prediction module 110 may be combined to form a reconstructed block including a reconstructed sample or a reconstructed sample array.

In FIG. 1, a residual block and a prediction block are added to create a reconstructed block by an adder. At this time, the adder may be considered as a particular unit reconstructed block creating unit that generates a reconstructed block.

The filtering module 155 applies a deblocking filter, an ALF Adaptive Loop an SAO Sample Adaptive Offset to the reconstructed picture.

The deblocking filter removes a block distortion generated at the boundary between blocks in the reconstructed picture. The ALF performs a filtering process on the basis of the result values of the comparison of the original picture with the reconstructed picture of which the blocks are filtered by the deblocking filter. The ALF may be applied only when high efficiency is necessary. The SAO reconstructs offset differences between the residual blocks having the deblocking filter applied thereto and the original picture and is applied in the form of a band offset, an edge offset, or the like.

The memory 160 may store the reconstructed block or picture calculated by the filtering module 155. The reconstructed block or picture stored in the memory 160 may be supplied to the prediction module 110 that performs the inter-prediction.

Figure 2:
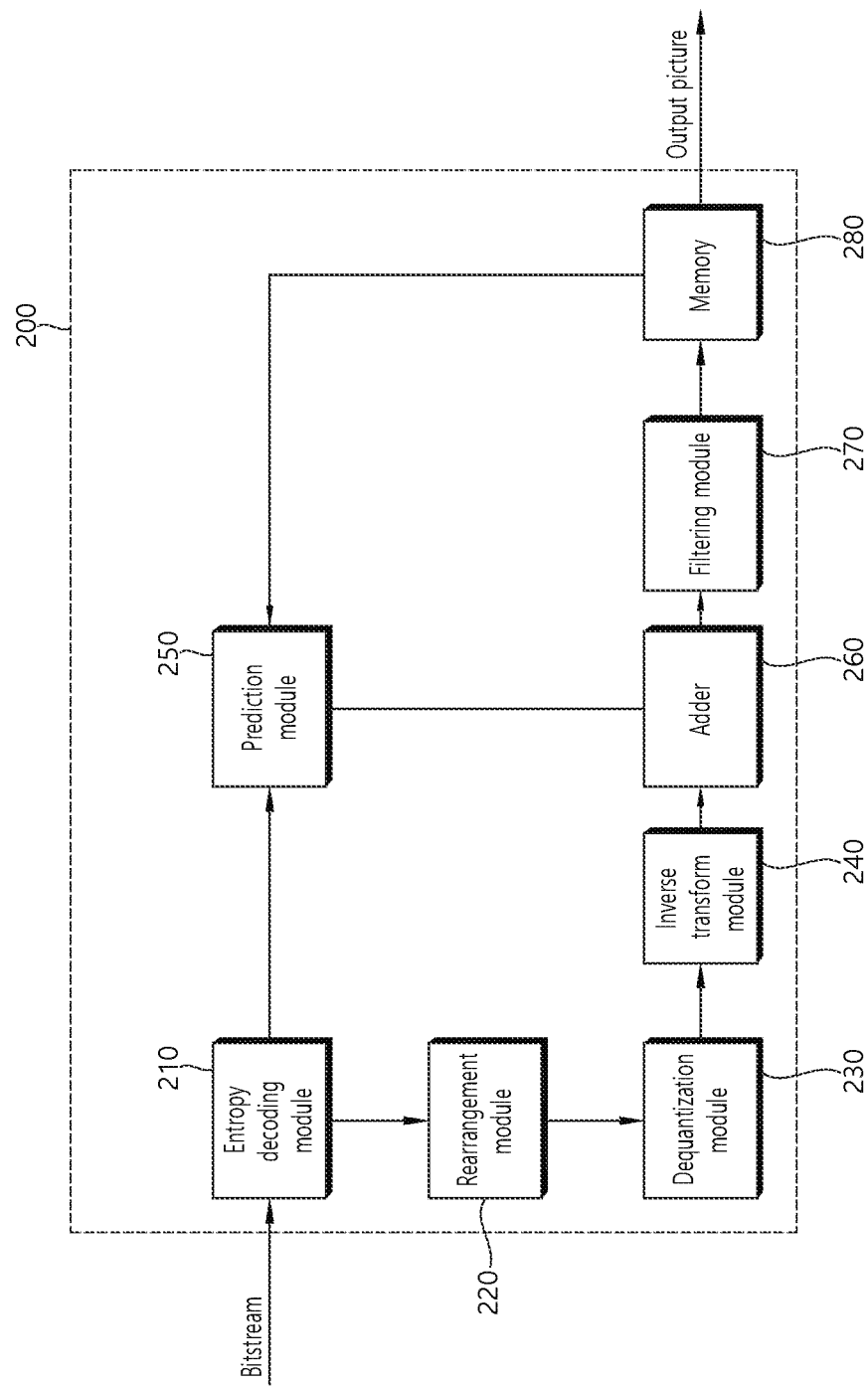
FIG. 2 is a block diagram schematically illustrating a video decoding device according to an embodiment of the invention.

FIG. 2 is a block diagram schematically illustrating a video decoding device according to an embodiment of the invention. Referring to FIG. 2, a video decoding device 200 may include an entropy decoding module 210, a rearrangement module 215, a dequantization module 220, an inverse transform module 225, a prediction module 230, a filtering module 235, and memory 240.

When a video bit stream is input from the video encoding device, the input bit stream may be decoded on the basis of the order in which video information is processed by the video encoding device.

The entropy decoding module 210 may entropy-decode the input bit stream according to a probability distribution to generate symbols in a quantized coefficient form. The entropy decoding method is a method of receiving a sequence of binary numbers and generating each of the symbols using the sequence. The entropy decoding method is similar to the entropy encoding method described above.

For example, when a Variable Length Coding VLC (hereinafter referred to as 'VLC') such as CAVLC is used to perform entropy encoding in a video encoding device, the entropy decoding module 210 may perform decoding using the same VLC table as the encoding device used in the encoding device. Further, when CABAC is used to perform entropy encoding in a video encoding device, the entropy decoding module 210 may perform the entropy decoding using CABAL More specifically, the CABAC entropy decoding method may include receiving a bin corresponding to each syntax element in a bit stream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information for constructing a predicted block out of the information decoded by the entropy decoding module 210 may be supplied to the prediction module 230, and the residual values, that is, the quantized transform coefficients, entropy-decoded by the entropy decoding module 210 may be input to the rearrangement module 215.

The rearrangement module 215 may rearrange the bit stream information, that is, the quantized transform coefficients, entropy-decoded by the entropy decoding module 210 on the basis of the rearrangement method in the video encoding device.

The rearrangement module 215 may reconstruct and rearrange the coefficients expressed in the form of a one-dimensional vector into coefficients in the form of a two-dimensional block.

The rearrangement module 215 may scan the coefficients on the basis of the prediction mode applied to the current block transform block and the size of the transform block and may create an array of coefficients quantized transform coefficients in the form of a two-dimensional block.

The dequantization module 220 may perform dequantization on the basis of the quantization parameters supplied from the video encoding device and the coefficient values of the rearranged block.

The inverse transform module 225 may perform the inverse DCT and/or inverse DST of the DCI and/or DST, which has been performed by the transform module of the video encoding device, on the quantization result from the video encoding device.

The inverse transform may be performed on the basis of a transfer unit or a partition unit of a picture determined by the video encoding device. The transform module of the video encoding device may selectively perform the DCT and/or DST depending on plural information pieces such as the prediction method, the size of a current block, and the prediction direction, and the inverse transform module 225 of the video decoding device may perform the inverse transform on the basis of the transform information on the transform performed by the transform module of the video encoding device.

The prediction module 230 generates a prediction block including a predicted sample or a predicted sample array based on the prediction block generation-related information provided by the entropy decoding module 210 and the previously decoded block and/or picture information provided from the memory 240.

If the prediction mode for the current PU is the intra prediction mode, the prediction module 230 may perform the intra prediction to generate a prediction block based on pixel information in the current picture.

If the prediction mode for the current PU is the inter-prediction mode, the prediction module 230 may be configured to perform inter-prediction on a current PU based on information included in at least one picture of a previous picture or a subsequent picture to the current picture. In this connection, information about the motion information necessary for inter-prediction of the current PU provided in the video encoding device, such as motion vector and reference picture index may be deduced via checking the skip flag and merge flag received from the encoding device.

The prediction module 230 may generate a prediction block such that the residual signal relative to the current block is minimized and the motion vector size is minimized when inter-prediction is performed on the current picture.

On the other hand, the motion information derivation method may be changed according to the prediction mode of the current block. The prediction mode applied to inter-prediction may include an Advanced. Motion Vector Prediction (AMVP) mode, a merge mode, and the like.

For example, when a merge mode is applied, the encoding device and the decoding device may generate a merge candidate list using the motion vector of the reconstructed spatial neighboring block and/or the motion vector corresponding to the Col block which is a temporally neighboring block. In the merge mode, the motion vector of the candidate block selected in the merge candidate list is used as the motion vector of the current block. The encoding device may transmit a merge index indicating a candidate block having an optimal motion vector selected from the candidate blocks included in the merge candidate list to the decoding device. In this case, the decoding device may derive the motion vector of the current block using the merge index.

In another example, when the AMVP (Advanced Motion Vector Prediction) mode is applied, the encoding device and decoding device generate a motion vector predictor candidate list using a motion vector of a reconstructed spatial neighboring block and/or a motion vector corresponding to a Col block as a temporal neighboring block. That is, the motion vector of the reconstructed spatial neighboring block and/or the motion vector corresponding to the Col block as a temporal neighboring block may be used as a motion vector candidate. The encoding device may transmit to the decoding device a prediction motion vector index indicating the optimal motion vector selected from among the motion vector candidates included in the motion vector predictor candidate list. In this connection, the decoding device may select the prediction motion vector for the current block from the motion vector candidates included in the motion vector candidate list using the motion vector index.

The encoding device may obtain the motion vector difference MVD between the motion vector for the current block and the motion vector predictor (MVP), encode the MVD, and transmit the encoded MVD to the decoding device. That is, the MVD may be a value obtained by subtracting the motion vector predictor (MVP) from the motion vector (MV) for the current block. In this connection, the decoding device may decode the received motion vector difference, and derive the motion vector for the current block via addition between the decoded motion vector difference and the motion vector predictor.

Further, the encoding device may transmit a reference picture index indicating a reference picture to the decoding device.

The prediction module 230 of the decoding device may predict the motion vector of the current block using the motion information of the neighboring block and derive the motion vector of the current block using the residual received from the encoding device. The decoding device may generate predicted sample (or predicted sample array) for the current block based on the derived motion vector and the reference picture index information received from the encoding device.

The decoding device may generate reconstructed samples (or reconstructed samples array) by adding predicted sample (or predicted sample array) and residual samples as obtained from transform coefficients sent from the encoding device to each other. Based on these reconstructed samples, reconstructed blocks and reconstructed pictures may be generated.

In the above-described AMVP and merge modes, motion information of the reconstructed neighboring block and/or motion information of the Col block may be used to derive motion information of the current block.

In the skip mode, which is one of the other modes used for inter-picture prediction, neighboring block information may be used for the current block as it is. Therefore, in the case of skip mode, the encoding device does not transmit syntax information such as the residual to the decoding device in addition to information indicating which block's motion information to use as the motion information for the current block.

The reconstructed block may be generated using the prediction block generated by the prediction module 230 and the residual block provided by the inverse-transform module 225. FIG. 2 illustrates that using the adder, the prediction block and the residual block are combined to generate the reconstructed block. In this connection, the adder may be viewed as a separate module (a reconstructed block generation module) that is configured to generate the reconstructed block. In this connection, the reconstructed block includes a reconstructed samples or a reconstructed samples array as described above; the prediction block includes a predicted sample or a predicted sample array; the residual block may include a residual samples or a residual samples array. Therefore, the reconstructed samples or the reconstructed samples array may be considered to be generated by combining the corresponding predicted sample or predicted sample array with the corresponding residual samples or residual samples array.

When the skip mode is used for a block, the residual signal may not be transmitted and the predicted block may be used as a reconstructed block.

The reconstructed block and/or picture may be supplied to the filtering module 235. The filtering module 235 may perform a deblocking filtering operation, an SAO operation, and/or an ALF operation on the reconstructed block and/or picture.

The memory 240 may store the reconstructed picture or block for use as a reference picture or a reference block and may supply the reconstructed picture to an output unit.

The elements that is directly related to decoding images among the entropy decoding module 210, the rearrangement module 215, the dequantization module 220, the inverse transform module 225, the prediction module 230, the filtering module 235 and the memory 240 which are included in the decoding device 200, for example, the entropy decoding module 210, the rearrangement module 215, the dequantization module 220, the inverse transform module 225, the prediction module 230, the filtering module 235, and so on may be expressed as a decoder or a decoding module that is distinguished from other elements.

In addition, the decoding device 200 may further include a parsing module not illustrated in the drawing that parses information related to the encoded images included in a bit stream. The parsing module may include the entropy decoding module 210, and may be included in the entropy decoding module 210. Such a parsing module may also be implemented as an element of the decoding module.

Inter-prediction may be performed on a current block in consideration of motion of a target object or an image between pictures. However, the existing inter-prediction method is performed based on method of compensating for a translational motion (translational motion model). The translational motion model may be referred to as a block matching method because inter-prediction is performed by deriving a reference block matched to the current block based on one motion vector. That is, in the method applied to the existing inter-prediction and the translational motion model, all samples of a prediction unit (IDU) have the same motion information.

Figure 3:
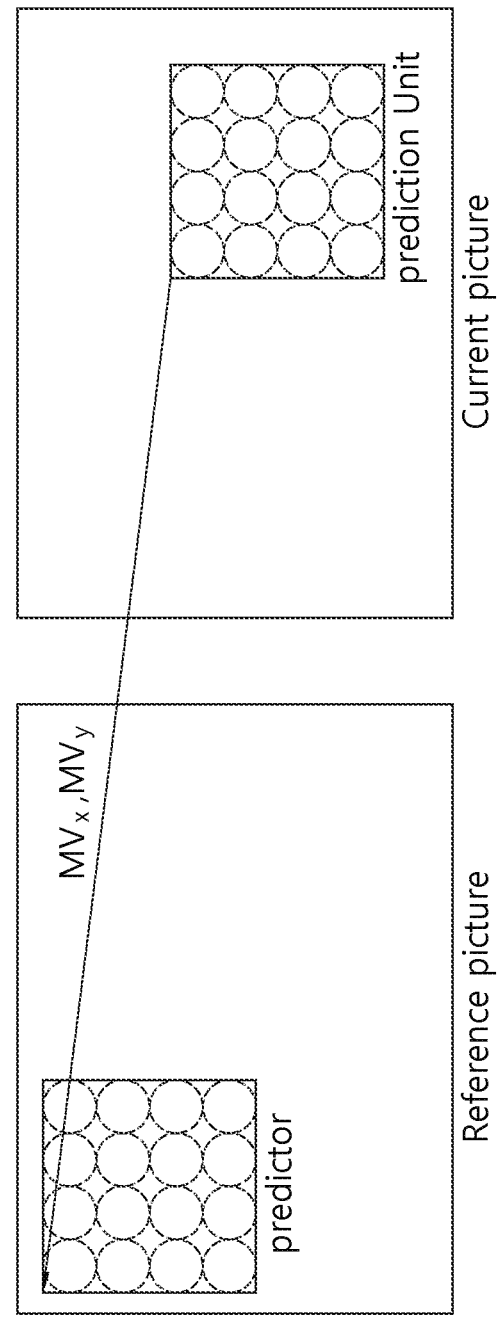
FIG. 3 is a view illustrating a configuration in which a prediction is generated in inter-prediction to which a translational motion model is applied.

FIG. 3 is a view illustrating a way in which a prediction block is generated from inter-prediction to which the translational motion model is applied.

Referring to FIG. 3, since all the samples of a PU have the same motion information, prediction and compensation are performed in a limited form. In detail, according to the translational motion model, a region having the same shape and size as those of a prediction block within a reference picture is designated as a prediction reference block using a motion vector $MV_x$ in the x-axis direction and a motion vector $MV_y$ in the y-axis direction, motion parameters for one motion vector in units of PU, and samples within the reference block are used as prediction samples for the prediction block. However, application of the translational motion model has a limitation in that prediction efficiency is degraded over deformation such as enlargement, reduction, rotation, and the like, of an image. According to the present invention, it is possible to modify the process in which the same motion information is transmitted and derived in units of the existing PU, so that the samples in the PU may have different motion information. A prediction model according to the present invention may be referred to as a 2-dimensional affine transform method or an affine motion model. Inter-prediction using the affine motion model may be the same as that illustrated in FIG. 4.

Figure 4:
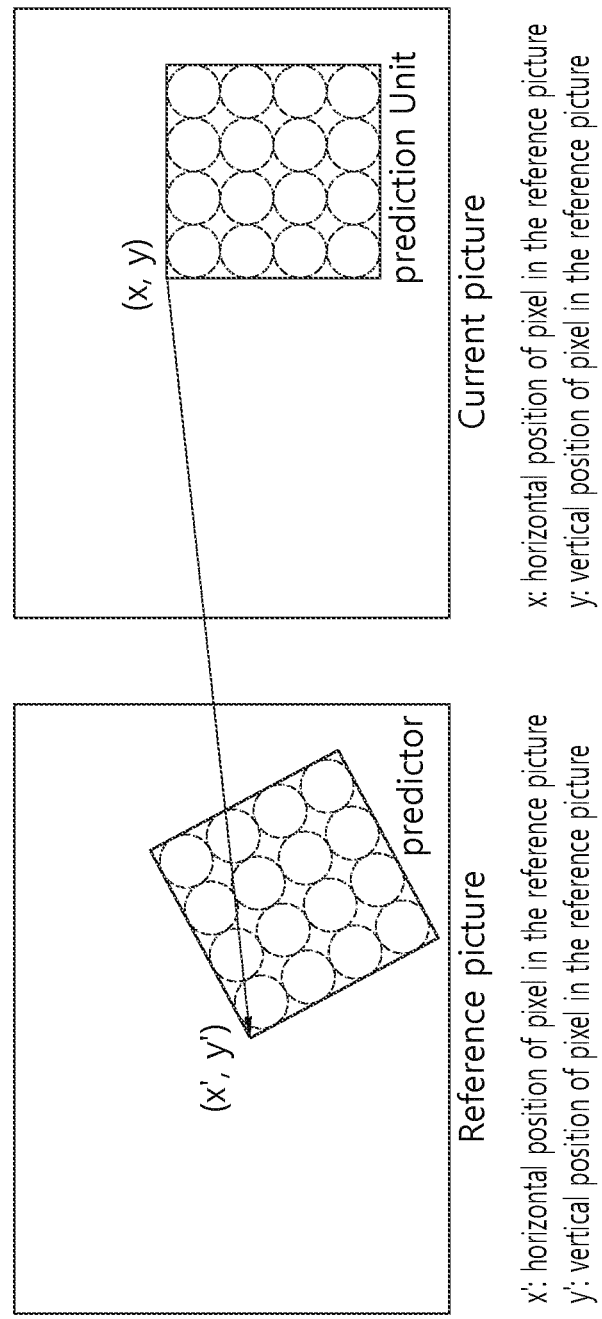
FIG. 4 is a view illustrating a configuration in which a prediction block is generated in inter-prediction to which an affine motion model is applied.

FIG. 4 illustrates an example in which a prediction block is generated in inter-prediction using an affine motion model. Hereinafter, the current block may correspond to the PU.

Referring to FIG. 4, x and y represent an x-coordinate and a y-coordinate of each sample in the current block, respectively. x' and y' represent an x-coordinate and a y-coordinate of a corresponding sample in a reference picture corresponding to x and y, respectively. In this case, a region including the samples at a sample position pointed to by (x',y') may be referred to as a reference block or a reference region. In this case, the reference block may correspond to a region including an image transformed according to rotational deformation, shape deformation, size deformation such as zoom-in or zoom-out, etc. regarding an image within the current block. Therefore, a size and a shape of the reference block may be different from those of the current block. A specific method of deriving a motion vector which is different or unique for each of the samples in the current block illustrated in FIG. 4 is illustrated in FIG. 5.

Figure 5:
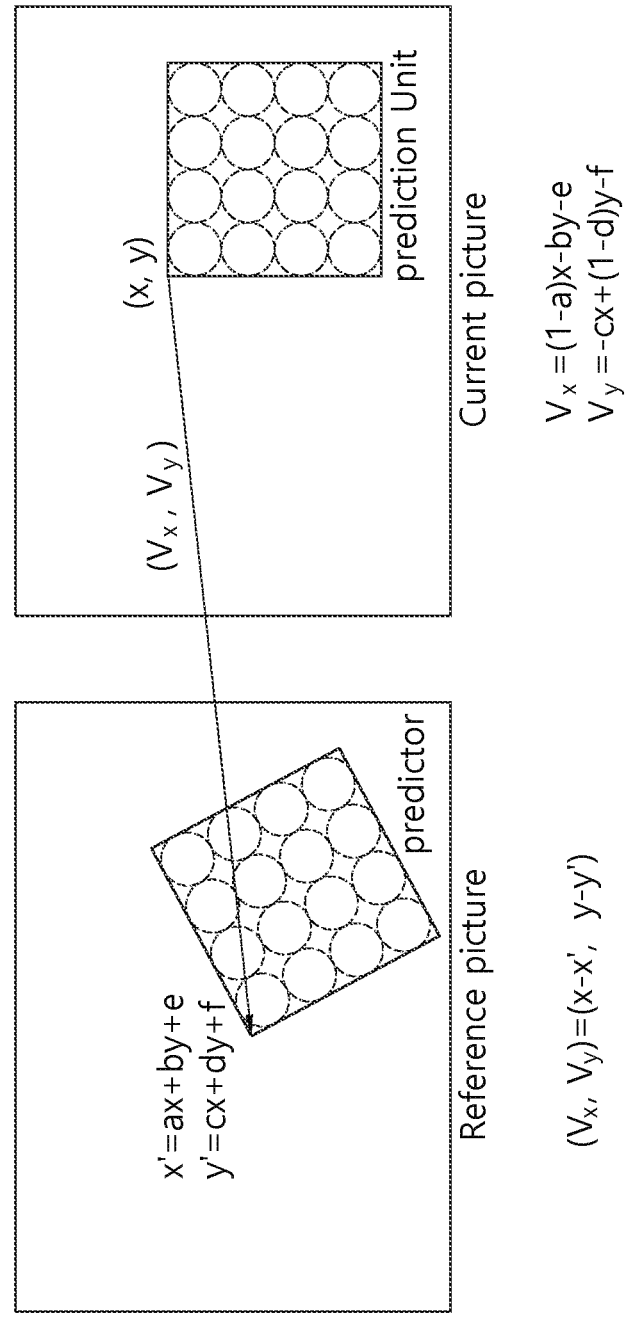
FIG. 5 is a view illustrating a state in which a prediction block is generated and a motion vector in inter-prediction to which the affine motion model is applied.

FIG. 5 is a view illustrating a state in which a prediction block is generated and a motion vector in inter-prediction using an affine motion model. Referring to FIG. 5, a formula for deriving a motion vector when the affine motion model is applied is shown. The motion vector may be derived based on the following equation.

$$(V_x, V_y) \leq (x-x', y-y') V_x = (1-a)x - by - e$$

$$V_y = -cx + ((1-d)y - f \quad \text{[Equation 1]}$$

Here, $v_x$ represents an x component of a sample unit motion vector of a (x, y) coordinate sample in the current block, and $v_y$ represents a y component of the sample unit motion vector of the (x, y) coordinate sample in the current block. That is, $(v_x, v_y)$ is the sample unit motion vector for the (x, y) coordinate sample. Here, a, b, c, d, e, and f denote parameters of an equation for deriving the sample unit motion vector (motion information) of the (x, y) coordinates from control points (CPs) of the current block. The CP may be expressed as a steered pixel. The parameters may be derived from motion information of the CPs of each PU transmitted in units of PU. The equation for deriving the sample unit motion vector derived from the motion information of the CPs may be applied to each sample of each PU or may be derived to a position of a predicted sample in a reference image according to relative positions of the x and y axes of each PU sample. The sample unit motion vector may be derived to be different depending on a size of a PU according to partitioning applied to a coding unit (CU), asymmetric or symmetric type, a partition II), and the like. A specific embodiment thereof will be described with reference to FIGS. 6 to 16.

Figure 6:
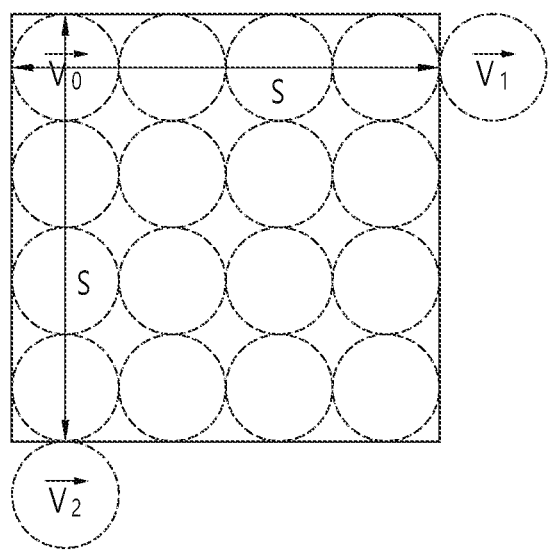
FIG. 6 is a view illustrating CPs of a PU partitioned from a CU based on a partitioning type 2N×2N.

FIG. 6 a view illustrating CPs of a PU partitioned from a CU based on a partitioning type 2N×2N.

As illustrated in Equation (1) above, the parameters of the equation for deriving the sample unit motion vector may be derived as different values based on the motion vectors of the CPs of the current block. The CPs may be three CPs. The CPs may use motion information of CPs at different positions according to a shape of the PU.

Referring to FIG. 6, a method in a PU partitioned from a CU based on a partitioning type 2N×2N for an equation for deriving the sample unit motion vector is shown. For example, a motion Vector of a top-left sample in the PU may be referred to as $V_0$. In addition, using samples of neighboring blocks adjacent to the PU, motion vectors of each CP may be $V_1$ and $V_2$. That is, when a width and a height of the PU are S and coordinates of a top-left sample position of the PU is (xp, yp), coordinates of CP0, among the CPs, may be set to (xp, yp), coordinates of CP1 may be set to (xp+S, yp), and coordinates of CP2 may be set to (xp, yp+S). The motion vector of CP0 may be set to $V_0$, the motion vector of CP1 may be set to $V_1$, and the motion vector of CP2 may be $V_2$. The sample unit motion vector may be derived using the motion vectors of the CPs. The sample unit motion vector may be derived based on the following equation.

$$V_x = \frac{V_{x_1} - V_{x_0}}{S}x + \frac{V_{x_2} - V_{x_0}}{S}y + V_{x_0} \quad \text{[Equation 2]}$$

$$V_y = \frac{V_{y_1} - V_{y_0}}{S}x + \frac{V_{y_2} - V_{y_0}}{S}y + V_{y_0}$$

Here, $V_x$ and $V_y$ represent an x component and a y component of a motion vector for a sample of the (x, y) coordinates in the current block, respectively, $Vx_0$ and $Vy_0$ represent an x component and a y component of a motion vector $V_0$ for CP0, $Vx_1$ and $Vy_1$ represent an x component and a y component of the motion vector $V_1$ for CP1, and $Vx_2$ and $Vy_2$ represent an x component and a y component of the motion vector $V_2$ for CP2, respectively. According to the equation for deriving the sample unit motion vector as in Equation 2, a motion vector may be derived based on a relative position in the PU for each sample of the PU partitioned from the CU based on the partitioning type 2N×2N.

Figure 7:
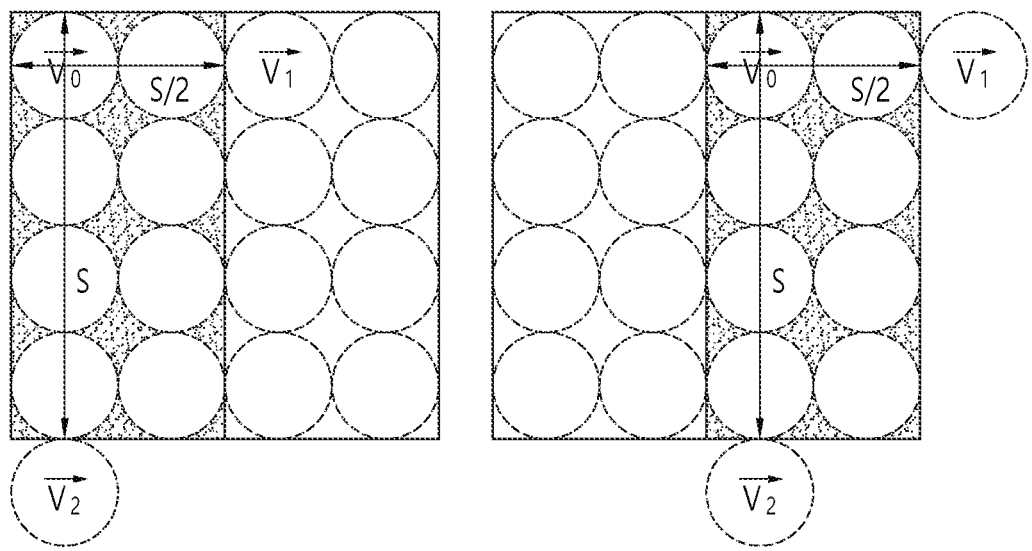
FIG. 7 is a view illustrating CPs of PUs partitioned from a CU based on a partitioning type N×2N.

FIG. 7 illustrates CPs of PUs partitioned from a CU based on the partitioning type N×2N. Referring to FIG. 7, a process of deriving a motion vector of PUs partitioned from the CU based on the partitioning type N×2N is shown. An equation for deriving a sample unit motion vector in the PU may be derived by the same method as that of the case of the aforementioned partitioning type 2N×2N. In the process of deriving the equation, a width value corresponding to the shape of the PU may be used. In order to derive the sample unit motion vector, three CPs may be derived and the positions of the CPs may be adjusted as illustrated in FIG. 7. That is, when a width and a height of the PU are S/2 and S, respectively, and coordinates of the top-left sample position of the PU is (xp, yp), coordinates of CP0, among the CPs, are (xp, yp), coordinates of CP1 may b (xp+S/2, yp), and coordinates of CP2 may be (xp, yp+S). The sample unit motion vector may be derived based on the following equation.

$$V_x = \frac{2(V_{x_1} - V_{x_0})}{S}x + \frac{V_{x_2} - V_{x_0}}{S}y + V_{x_0}$$
$$V_y = \frac{2(V_{y_1} - V_{y_0})}{S}x + \frac{V_{y_2} - V_{y_0}}{S}y + V_{y_0}$$

[Equation 3]

Here, $V_x$ and $V_y$ represent an x component and a y component of a motion vector for a sample of the (x, y) coordinates in the current block, respectively, $Vx_0$ and $Vy_0$ represent an x component and a y component of a motion vector $V_0$ for CP0 $Vx_1$ and $Vy_1$ represent an x component and a y component of the motion vector $V_1$ for CP1, and $Vx_2$ and $Vy_2$ represent an x component and a y component of the motion vector $V_2$ for CP2, respectively. Equation 3 represents an equation for deriving a sample unit motion vector considering that a width of the PU is S/2. According to the equation for deriving the sample unit motion vector as in Equation 3, a motion vector may be derived based on a relative position in the PU for each sample of the PU partitioned from the CU based on the partitioning type N×2N.

Figure 8:
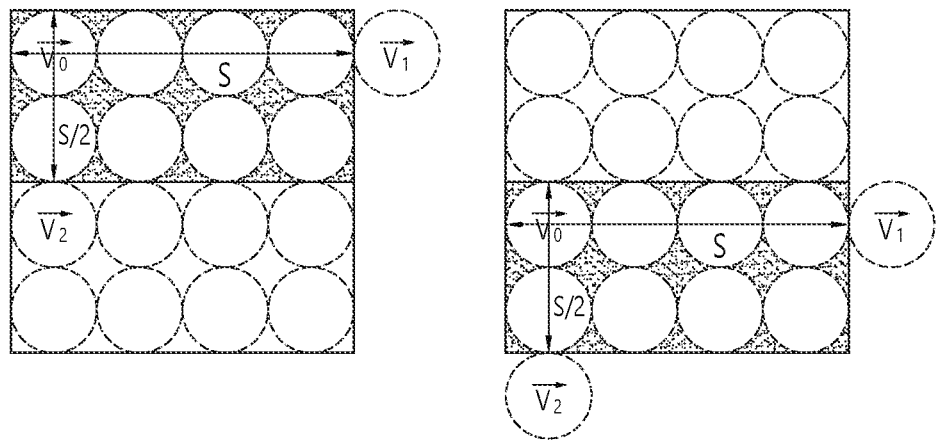
FIG. 8 is a view illustrating CPs of PUs partitioned from a CU based on a partitioning type 2N×N.

FIG. 8 illustrates CPs of PUs partitioned from a CU based on the partitioning type 2N×N. As illustrated in FIG. 8, in order to derive the sample unit motion vector, three CPs may be derived, and the positions of the CPs may be adjusted as illustrated in FIG. 8 to adjust a height to S/2 according to the shape of the PU illustrated in FIG. 8. That is, when a width and a height of the PU are S and S/2, respectively, and coordinates of the top-left sample position of the PU is (xp, yp), coordinates of CP0, among the CPs, may be (xp, yp), coordinates of CP1 is (xp+S, yp), and coordinates of CP2 may be (xp, yp+S/2). The sample unit motion vector may be derived based on the following equation.

$$V_x = \frac{V_{x_1} - V_{x_0}}{S}x + \frac{2(V_{x_2} - V_{x_0})}{S}y + V_{x_0}$$
$$V_y = \frac{V_{y_1} - V_{y_0}}{S}x + \frac{2(V_{y_2} - V_{y_0})}{S}y + V_{y_0}$$

[Equation 4]

Here, $V_x$ and $V_y$ represent an x component and a y component of a motion vector for a sample of the (x, y) coordinates in the current block, respectively, $Vx_0$ and $Vy_0$ represent an x component and a y component of a motion vector $V_0$ for CP0, $Vx_1$ and $Vy_1$ represent an x component and a y component of the motion vector $V_1$ for CP1, and $Vx_2$ and $Vy_2$ represent an x component and a y component of the motion vector $V_2$ for CP2, respectively. Equation 4 represents an equation for deriving a sample unit motion vector considering that a height of the PU is S/2. According to the equation for deriving the sample unit motion vector as in Equation 4, a motion vector may be derived based on a relative position in the PU for each sample of the PU partitioned from the CU based on the partitioning type 2N×N.

Figure 9:
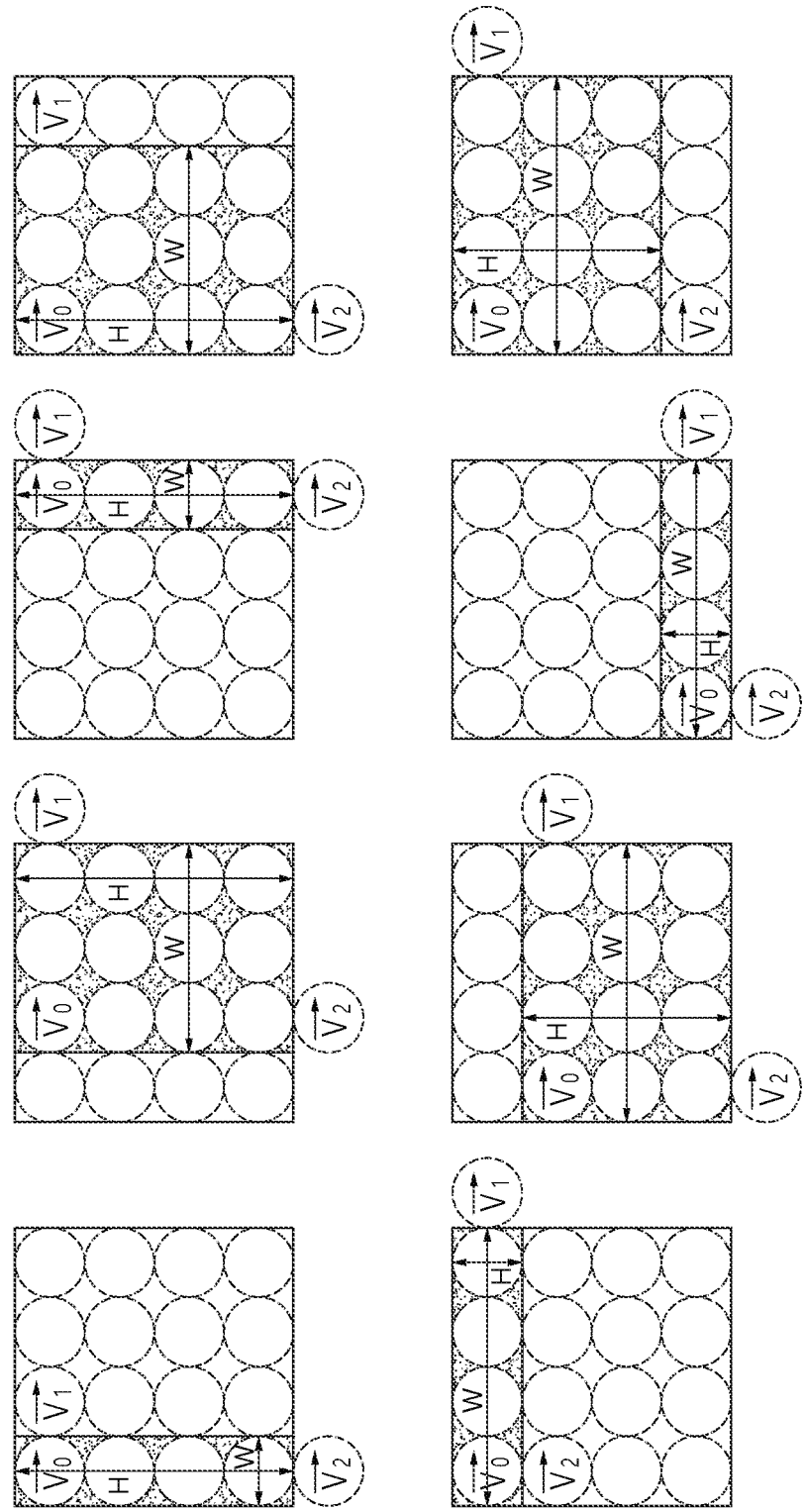
FIG. 9 is a view illustrating CPs of asymmetric PUs.

FIG. 9 illustrates CPs of asymmetric PUs. The asymmetric PUs may be PUs partitioned from a CU based on the partitioning type nL×2N, nR×2N, 2N×nU, or 2N×nD.

As illustrated in FIG. 9, widths and heights of the asymmetric PUs may be W and H, respectively. In this case, an equation for deriving a sample unit motion vector in the PU may be derived as follows. In order to derive the sample unit motion vector, three CPs for each PU may be derived and coordinates of the CPs may be adjusted based on the width and height according to the shape of the PU as illustrated in FIG. 9. That is, when the width and height of the PU are W and H and coordinates of a top-left sample position of each PU is (xp, yp), coordinates of CP0, among the CPs, may be set to (xp, yp), coordinates of CP1 may be set to (xp+W, yp), and coordinates of CP2 may be set to (xp, yp+H). In this case, the sample unit motion vector in the PU may be derived based on the following equation.

$$V_x = \frac{V_{x_1} - V_{x_0}}{W}x + \frac{V_{x_2} - V_{x_0}}{H}y + V_{x_0}$$
$$V_y = \frac{V_{y_1} - V_{y_0}}{W}x + \frac{V_{y_2} - V_{y_0}}{H}y + V_{y_0}$$

[Equation 5]

Here, $V_x$ and $V_y$ represent an x component and a y component of a motion vector for a sample of the (x, y) coordinates in the current block, respectively, $Vx_0$ and $Vy_0$ represent an x component and a y component of a motion vector $V_0$ for CP0, $Vx_1$ and $Vy_1$ represent an x component and a y component of the motion vector $V_1$ for CP1, and $Vx_2$ and $Vy_2$ represent an x component and a y component of the motion vector $V_2$ for CP2, respectively. Equation 5 represents an equation for deriving a sample unit motion vector considering the widths and the heights of the asymmetrical Pus. According to the equation for deriving the sample unit motion vector as in Equation 5, a motion vector may be derived based on a relative position in the PU for each sample of the PU partitioned from the CU based on the partitioning type nL×2N, nR×2N, 2N×nU, or 2N×nD.

Meanwhile, according to the present invention, in order to reduce motion information of CPs transmitted in units of PUs, e.g., three CPs, motion information prediction candidate for at least one CP may be selected based on motion information of a neighboring block or a neighboring sample of a PU. The motion information prediction candidate may be called a motion information candidate or a motion vector candidate.

Figure 10:
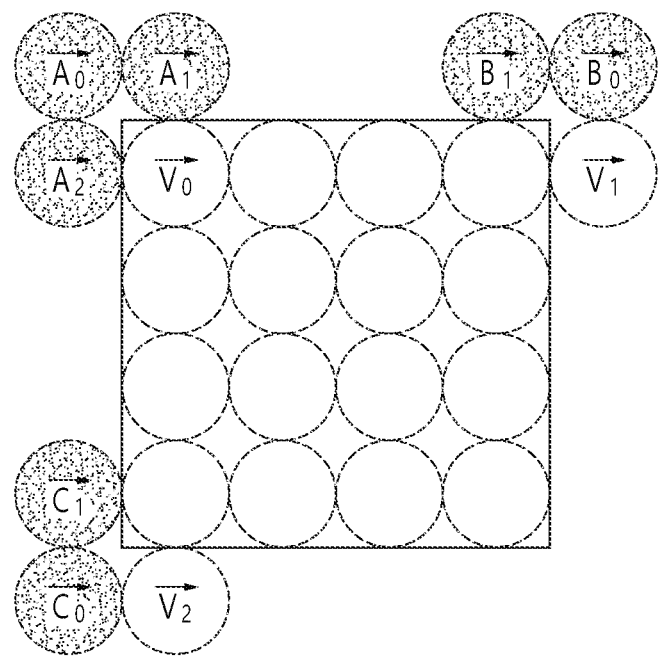
FIG. 10 is a view illustrating motion information prediction candidates of CPs of a PU to the partitioning type 2N×2N is applied.

FIG. 10 illustrates motion information prediction candidates of CPs of a PU to which the partitioning type 2N×2N is applied. Referring to FIG. 10, a method of configuring motion information prediction candidates of CPs is shown. Motion information of neighboring blocks (or neighboring samples) adjacent to each CP may be used as prediction candidates for motion information of three CPs. In addition, motion information of neighboring samples adjacent to each CP may be used as a motion information prediction candidate of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are S and coordinates of a top-left sample position of the PU is (xp, yp), A0 is a motion vector of a sample of (xp−1, yp−1) coordinates, and A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring blocks (or neighboring samples), may be used as prediction candidates, and the two pieces of motion information may be represented by B0 and B1, respectively. In case where a width and a height of the PU are S and coordinates of a top-left sample position of the PU is (xp, yp), B0 may represent a motion vector of a sample of (xp+S−1, yp−1) coordinates and B1 may represent a motion vector of a sample of (xp+S−1, yp−1) coordinates. In this case, at least one of the motion vectors B0 and B1 may be used as a prediction candidate of v1.

Also, in the case of the motion vector v2 of CP2, two pieces of motion information, among pieces of the motion information of the previously decoded neighboring blocks (or neighboring samples), may be used as prediction candidates, and the two pieces of motion information may be represented by C0 and C1, respectively. In case where a width and a height of the PU are S and coordinates of a top-left sample position of the PU is (xp, yp), C0 may represent a motion vector of a sample of (xp−1, yp+S) coordinates and C1 may represent a motion vector of a sample of (xp−1, yp+S−1) coordinates. In this case, at least one of the motion vectors C0 and C1 may be used as a prediction candidate of v2.

In this case, if an affine motion model is applied to a neighboring block including a sample at a corresponding position, motion information of the prediction candidate position may be derived based on a motion vector of the sample at the corresponding position, and if the affine motion model is not applied to the neighboring block including the sample at the corresponding position, motion information of the prediction candidate position may be derived based on a motion vector of the neighboring block including the sample at the corresponding position. This is the same in the case of the other remaining embodiments of FIGS. 10 to 16 below. In detail, for example, in case where the affine motion model is applied to a neighboring block including a sample of (xp−1, yp−1) coordinates, A0 may be derived based on a motion vector of the sample of the (xp−1, yp−) coordinates, and in case where the affine motion model is not applied to a neighboring block including a sample of (xp−1, yp−1) coordinates, A0 may be derived based on a motion vector of a neighboring block including a sample of the (xp−1, yp−1) coordinates.

In this case, the numbers of prediction candidates for each CP in the figure may serve to differentiate between prediction candidates or may indicate a priority order of the prediction candidates. For example, in the case of a prediction candidate for CP0, A0 may have a higher priority over A1 and A1 may have a higher priority over A2. This is the same for the case of the other remaining embodiments of FIGS. 11 to 16 below.

Figure 11:
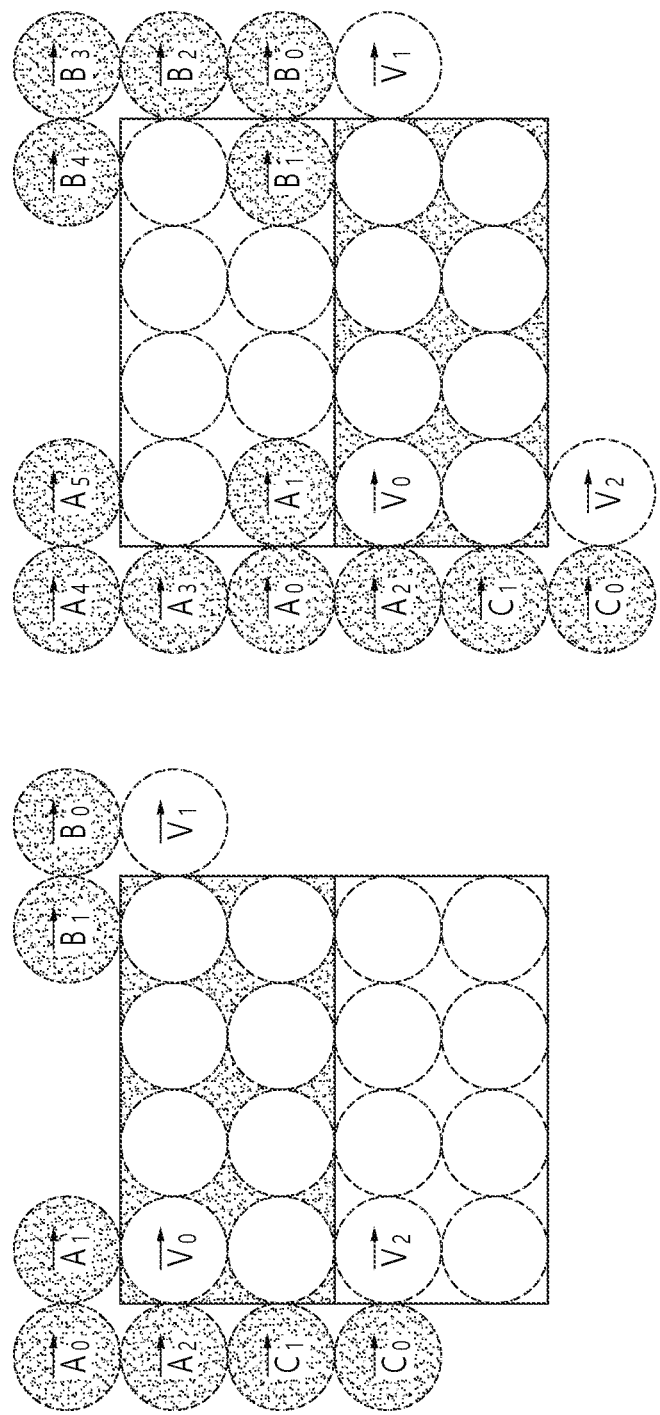
FIG. 11 illustrates an example of motion information prediction candidates of CPs of a PU to which a partitioning type 2N×N is applied.

FIG. 11 illustrates motion information prediction candidates of CPs of a PU to which the partitioning type 2N×N is applied. Referring to FIG. 11, a method of configuring a motion information prediction candidate of the CPs is shown. As illustrated in FIG. 11, a prediction candidate for the motion vectors of the CPs may be configured in consideration of the fact that the PU does not have a square shape, and a prediction candidate for the motion vectors of the CPs may be configured in consideration of a decoding process order of the PU.

Motion information of neighboring blocks (or neighboring samples) adjacent to each CP may be used as prediction candidates for motion information of three CPs. When the affine motion model is applied to the neighboring blocks, motion information of neighboring samples adjacent to each CP may be used as a motion information prediction candidate of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are S and S/2, respectively, and coordinates of a top-left sample position of the PU is (xp, yp), A0 is a motion vector of a sample of (xp−1, yp−1) coordinates, and A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring blocks (or neighboring samples), may be used as prediction candidates, and the two pieces of motion information may be represented by B0 and B1, respectively. In case where a width and a height of the PU are S and S/2, respectively, and coordinates of a top-left sample position of the PU is (xp, yp), B0 may represent a motion vector of a sample of (xp+S−1, yp−1) coordinates and B1 may represent a motion vector of a sample of (xp+S−1, yp−1) coordinates. In this case, at least one of the motion vectors B0 and B1 may be used as a prediction candidate of v1.

Also, in the case of the motion vector v2 of CP2, two pieces of motion information, among pieces of the motion information of the previously decoded neighboring blocks (or neighboring samples), may be used as prediction candidates, and the two pieces of motion information may be represented by C0 and C1, respectively. In case where a width and a height of the PU are S and S/2, respectively, and coordinates of a top-left sample position of the PU is (xp, yp), C0 may represent a motion vector of a sample of (xp−1, yp+S/2) coordinates and C1 may represent a motion vector of a sample of (xp−1, yp+S/2−1) coordinates. In this case, at least one of the motion vectors C0 and C1 may be used as a prediction candidate of v2.

In another embodiment, when a partition ID of the PU is 1, samples of neighboring blocks of the current CU may further be included as prediction candidates for the motion vector v0 of CP0 and the motion vector v1 of CP1. For example, in the case of the motion vector v0 of CP0, motion information of a previously decoded neighboring block a neighboring block or a neighboring sample of the current CU) may further be included as a prediction candidate. In detail, at least one of three pieces of motion information of neighboring samples may further be used as a prediction candidate, and the three pieces of motion information may be represented by A3, A4, and A5, respectively. In case where a width and a height of the CU including the PU are S and coordinates of the top-left sample position of the CU is (xc, yc), A3 may represent a motion vector of a sample of (xc−1, yc) coordinates, A4 may represent a motion vector of a sample of (xc−1, yc−1) coordinates, and A5 may represent a motion vector of a sample of (xc, yc−1) coordinates. In this case, at least one of the motion vectors A3, A4, and A5 may further be used as a prediction candidate of v0.

Also, in the case of the motion vector v1 of CP1, motion information of the previously decoded neighboring blocks (or neighboring samples), may be used as a prediction candidate. In detail, at least one of three pieces of motion information of neighboring samples may further be used as a prediction candidate, and the three pieces of motion information may be represented by B2, B3, and B4, respectively. In case where a width and a height of the CU including the PU are S and coordinates of a top-left sample position of the CU is (xc, yc), B2 may represent a motion vector of a sample of (xc+S, yc) coordinates, B3 may represent a motion vector of a sample of (xc+S−1, yc−1) coordinates, and B4 may represent a motion vector of a sample of (xc+S−1, yc−1) coordinates. In this case, at least one of the motion vectors B2, B3, and B4 may further be used as a prediction candidate of v1.

In another embodiment, each PU included in the CU may use the same prediction candidates of the PUs in the CU, as prediction candidates for the motion vectors of the CPs, regardless of partition ID. For example, in the case of the motion vector v0 of CP0 of each PU, three pieces of motion information, among pieces of the motion information of the previously decoded neighboring blocks (i.e., neighboring blocks or neighboring samples of the current CU), may be used as prediction candidates, and the three pieces of motion information may be represented by A0, A1, and A2, respectively. In case where a width and a height of the CU are S and coordinates of the top-left sample position of the CU is (xc, yc), A0 may represent a motion vector of a sample of (xc−1, yc−1) coordinates, A1 may represent a motion vector of a sample of (xc, yc−1) coordinates, and A2 may represent a motion vector of a sample of (xc−1, yc) coordinates. In this case, at least one of the motion vectors A0, A1 and A2 may be used as a prediction candidate of v0.

Also, in the case of the motion vector v1 of CP1 of each PU, two pieces of motion information, among pieces of motion information of the previously decoded neighboring blocks (or neighboring samples) may be used as prediction candidates, and the two pieces of motion information may be represented by B0 and B1. In case where a width and a height of the CU are S and coordinates of the top-left sample position of the CU is (xc, yc), B0 may represent a motion vector of a sample of (xc+S, yc−1) coordinates and B1 may represent a motion vector of a sample of (xc+S−1, yc−1) coordinates. In this case, at least one of the motion vectors B0 and B1 may be used as a prediction candidate of v1.

Also, in the case of the motion vector v2 of CP2 of each PU, two pieces of motion information, among pieces of the motion information of the previously decoded neighboring blocks (or neighboring samples), may be used as prediction candidates, and the two pieces of motion information may be represented by C0 and C1, respectively. In case where a width and a height of the CU are S and coordinates of the top-left sample position of the CU is (xc, yc), C0 may represent a motion vector of a sample of (xc−1, yc+S) coordinates and C1 may represent a motion vector of a sample of (xc−1, yc+S−1) coordinates. In this case, at least one of the motion vectors C0 and C1 may be used as a prediction candidate of v2.

As a method of configuring; a prediction candidate for motion vectors of CPs of a PU to which the 2N×N partitioning type is applied, prediction candidates may be limited to a predetermined number so as to be configured.

FIG. 12 illustrates a configuration in which prediction candidates of CPs of a PU to which the partitioning type 2N×N is applied are limited to two prediction candidates. Referring to FIG. 12, it is illustrated that a list including two samples as prediction candidates of each CP of the PU is configured. For example, in the case of the motion vector v0 of CP0, two pieces of motion information, among pieces of motion information of the previously decoded neighboring blocks (or neighboring samples), may be used as prediction candidates, and the two pieces of motion information may be represented by A0 and A1. In case where a width and a height of the PU are S and S/2, respectively, and the coordinates of the top-left sample position of the PU is (xp, yp), A0 may represent a motion vector of a sample of (xp−1, yp−1) coordinates and A1 may represent a motion vector of a sample of (xp, yp−1) coordinates. In this case, A0 and A1 may be used as prediction candidates of v0.

Also, in the case of the motion vector v1 of CP1, two pieces of motion information, among pieces of the motion information of the previously decoded neighboring blocks (or neighboring samples), may be used as prediction candidates, and the two pieces of motion information may be represented by B0 and B1, respectively. In case where a width and a height of the PU are S and S/2, respectively, and coordinates of a top-left sample position of the PU is (xp, yp), B0 may represent a motion vector of a sample of (xp+S−1, yp−1) coordinates and B1 may represent a motion vector of a sample of (xp+S−1, yp−1) coordinates. In this case, the motion vectors B0 and B1 may be used as prediction candidates of v1.

Also, in the case of the motion vector v2 of CP2, two pieces of motion information, among pieces of the notion information of the previously decoded neighboring blocks (or neighboring samples), may be used as prediction candidates, and the two pieces of motion information may be represented by C0 and C1, respectively. In case where a width and a height of the PU are S and S/2, respectively, and coordinates of a top-left sample position of the PU is (xp, yp), C0 may represent a motion vector of a sample of (xp−1, yp+S/2) coordinates and C1 may represent a motion vector of a sample of (xp−1, yp+S/2−1) coordinates. In this case, the motion vectors C0 and C1 may be used as prediction candidates of v2.

FIG. 13 illustrates motion information prediction candidates of CPs of a PU to which the partitioning type N×2N is applied. Referring to FIG. 13, a method of configuring motion information prediction candidates of the CPs is shown. As illustrated in FIG. 13, a prediction candidate for a motion vector of the CPs may be configured in consideration of the fact that the PU does not have a square shape, and a prediction candidate for a motion vector of the CPs may be configured in consideration of a decoding processing order of the PU.

As illustrated in FIG. 13, coded motion information of a neighboring block (or neighboring sample) adjacent to each CP may be used as prediction candidates for motion information of three CPs. In case where the affine motion model is applied to the neighboring block, motion information of a neighboring sample adjacent to each CP may be used as a motion information prediction candidate of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are S/2 and S, respectively, and coordinates of a top-left sample position of the PU is (xp, yp), A0 is a motion vector of a sample of (xp−1, yp−1) coordinates, and A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring block (or neighboring sample), may be used as prediction candidates, and the two pieces of motion information may be represented by B0 and B1, respectively. In case where a width and a height of the PU are S/2 and S, respectively, and coordinates of a top-left sample position of the PU is (xp, yp), B0 may represent a motion vector of a sample of (xp+S/2, yp−1) coordinates and B1 may represent a motion vector of a sample of (xp+S/2−1, yp−1) coordinates. In this case, at least one of the motion vectors B0 and B1 may be used as a prediction candidate of v1. Also, in case where a partition ID of the PU is 0, at least one of a motion vector B2 of a sample of (xp+S/2+1, yp−1) coordinates and a motion vector B3 of a sample of (xp+S/2+2, yp−1) coordinates may further be included as a prediction candidate of v1.

Also, in the case of the motion vector v2 of CP2, two pieces of motion information, among pieces of the motion information of the previously decoded neighboring block (or neighboring sample), may be used as prediction candidates, and the two pieces of motion information may be represented by C0 and C1, respectively. In case where a width and a height of the PU are S/2 and S, respectively, and coordinates of a top-left sample position of the PU is (xp, yp), C0 may represent a motion vector of a sample of (xp−1, yp+S) coordinates and C1 may represent a motion vector of a sample of (xp−1, yp+S−1) coordinates. In this case, at least one of the motion vectors C0 and C1 may be used as a prediction candidate of v2.

In another embodiment, when a partition ID of the PU is 1, samples of neighboring blocks of the current CU may further be included as prediction candidates for the motion vector v0 of CP0 and the motion vector v2 of CP2. For example, in the case of the motion vector v0 of CP0, motion information of a previously decoded neighboring block (i.e., a neighboring block or a neighboring sample of the current CU) may further be included as a prediction candidate. In detail, at least one of three pieces of motion information of neighboring samples may further be used as a prediction candidate, and the three pieces of motion information may be represented by A3, A4, and A5, respectively. In case where a width and a height of the CU including the PU are S and coordinates of the top-left sample position of the CU is (xc, yc), A3 may represent a motion vector of a sample of (xc−1, yc−1) coordinates, A4 may represent a motion vector of a sample of (xc, yc−1) coordinates, and A5 may represent a motion vector of a sample of (xc−1, yc) coordinates. In this case, at least one of the motion vectors A3, A4, and A5 may further be used as a prediction candidate of v0.

Also, in the case of the motion vector v2 of CP2, motion information of the previously decoded neighboring blocks (or neighboring samples), may be used as a prediction candidate. In detail, at least one of three pieces of motion information of neighboring samples may further be used as a prediction candidate, and the three pieces of motion information may be represented by C2, C3, and C4, respectively. In case where a width and a height of the CU including the PU are S and coordinates of a top-left sample position of the CU is (xc, yc), C2 may represent a motion vector of a sample of (xc−1, yc+S) coordinates, C3 may represent a motion vector of a sample of (xc, yc+S) coordinates, and C4 may represent a motion vector of a sample of (xc−1, yc+S−1) coordinates. In this case, at least one of the motion vectors C2, C3, and C4 may further be used as a prediction candidate of v2.

In another embodiment, each PU included in the CU may use the same prediction candidates of the PUs in the CU, as prediction candidates for the motion vectors of the CPs, regardless of partition ID. For example, in the case of the motion vector v0 of CP0 of each PU, three pieces of motion information, among pieces of the motion information of the previously decoded neighboring blocks (i.e., neighboring blocks or neighboring samples of the current CU), may be used as prediction candidates, and the three pieces of motion information may be represented by A0, A1, and A2, respectively. In case where a width and a height of the CU are S and coordinates of the top-left sample position of the CU is (xc, yc), A0 may represent a motion vector of a sample of (xc−1, yc−1) coordinates, A1 may represent a motion vector of a sample of (xc, yc−1) coordinates, and A2 may represent a motion vector of a sample of (xc−1, yc) coordinates. In this case, at least one of the motion vectors A0, A1 and A2 may be used as a prediction candidate of v0.

Also, in the case of the motion vector v1 of CP1 of each PU, two pieces of motion information, among pieces of motion information of the previously decoded neighboring blocks (or neighboring samples) may be used as prediction candidates, and the two pieces of motion information may be represented by B0 and B1. In case where a width and a height of the CU are S and coordinates of the top-left sample position of the CU is (xc, yc), B0 may represent a motion vector of a sample of (xc+S, yc−1) coordinates and B1 may represent a motion vector of a sample of (xc+S−1, yc−1) coordinates. In this case, at least one of the motion vectors B0 and B1 may be used as a prediction candidate of v1.

Also, in the case of the motion vector v2 of CP2 of each PU, two pieces of motion information, among pieces of the motion information of the previously decoded neighboring blocks (or neighboring samples), may be used as prediction candidates, and the two pieces of motion information may be represented by C0 and C1, respectively. In case where a width and a height of the CU are S and coordinates of the top-left sample position of the CU is (xc, yc), C0 may represent a motion vector of a sample of (xc−1, yc+S) coordinates and C1 may represent a motion vector of a sample of (xc−1, yc+S−1) coordinates. In this case, at least one of the motion vectors C0 and C1 may be used as a prediction candidate of v2.

As a method of configuring a prediction candidate for motion vectors of CPs of a PU to which the N×2N partitioning type is applied, prediction candidates may be limited to a predetermined number so as to be configured.

FIG. 14 illustrates a configuration in which prediction candidates of CPs of a PU to which the partitioning type N×2N is applied are limited to two prediction candidates. Referring to FIG. 14, it is illustrated that a list including two samples as prediction candidates of each CP of the PU is configured. For example, in the case of the motion vector v0 of CP0, two pieces of motion information, among pieces of motion information of the previously decoded neighboring blocks (or neighboring samples), may be used as prediction candidates, and the two pieces of motion information may be represented by A0 and A1. In case where a width and a height of the PU are S/2 and S, respectively, and the coordinates of the top-left sample position of the PU is (xp, yp), A0 may represent a motion vector of a sample of (xp−1, yp−1) coordinates and A1 may represent a motion vector of a sample of (xp, yp−1) coordinates. In this case, A0 and A1 may be used as prediction candidates of v0.

Also, in the case of the motion vector v1 of CP1, two pieces of motion information, among pieces of the motion information of the previously decoded neighboring blocks (or neighboring samples), may be used as prediction candidates, and the two pieces of motion information may be represented by B0 and B1, respectively. In case where a width and a height of the PU are S/2 and S, respectively, and coordinates of a top-left sample position of the PU is (xp, yp), B0 may represent a motion vector of a sample of (xp+S/2, yp−1) coordinates and B1 may represent a motion vector of a sample of (xp+S/2−1, yp−1) coordinates. In this case, the motion vectors B0 and B1 may be used as a prediction candidate of v1.

Also, in the case of the motion vector v2 of CP2, two pieces of motion information, among pieces of the motion information of the previously decoded neighboring blocks (or neighboring samples), may be used as prediction candidates, and the two pieces of motion information may be represented by C0 and C1, respectively. In case where a width nd a height of the PU are S/2 and S, respectively, and coordinates of a top-left sample position of the PU is (xp, yp), C0 may represent a motion vector of a sample of (xp−1, yp+S) coordinates and C1 may represent a motion vector of a sample of (xp−1, yp+S−1) coordinates. In this case, the motion vectors C0 and C1 may be used as a prediction candidate of v2.

FIGS. 15A to 15D illustrate motion information prediction candidates of CPs of asymmetric PUs. The asymmetric PUs may be PUs partitioned from a CU based on a partitioning type nL×2N, nR×2N, 2N×nU, or 2N×nD.

Referring to FIG. 15A, a method of configuring a motion information prediction candidate of the CPs of a PU to which the partitioning type nL×2N is applied is shown. As illustrated in FIG. 15A, a prediction candidate for a motion vector of the CPs may be configured in consideration of the fact that the PU does not have a square shape, and a prediction candidate for a motion vector of the CPs may be configured in consideration of decoding processing order of the PU.

As illustrated in FIG. 15A, coded motion information of neighboring blocks (or neighboring samples) adjacent to each CP may be used as prediction candidates for motion information of three CPs. When the affine motion model is applied to the neighboring blocks, motion information of neighboring samples adjacent to each CP may be used as a motion information prediction candidate of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are W and H, respectively, and coordinates of a top-left sample position of the PU is (xp, yp), A0 is a motion vector of a sample of (xp−1, yp−1) coordinates, and A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring block (or neighboring sample), may be used as prediction candidates, and the two pieces of motion information may be represented by B0 and B1, respectively. In case where a width and a height of the PU are W and H, respectively, and coordinates of a top-left sample position of the PU is (xp, yp), B0 may represent a motion vector of a sample of (xp+W, yp−1) coordinates and B1 may represent a motion vector of a sample of (xp+W−1, yp−1) coordinates. In this case, at least one of the motion vectors B0 and B1 may be used as a prediction candidate of v1.

Also, in the case of the motion vector v2 of CP2, two pieces of motion information, among pieces of the motion information of the previously decoded neighboring block (or neighboring sample), may be used as prediction candidates, and the two pieces of motion information may be represented by C0 and C1, respectively. In case where a width and a height of the PU are W and H, respectively, and coordinates of a top-left sample position of the PU is (xp, yp), C0 may represent a motion vector of a sample of (xp−1, yp+H) coordinates and C1 may represent a motion vector of a sample of (xp−1, yp+H−1) coordinates. In this case, at least one of the motion vectors C0 and C1 may be used as a prediction candidate of v2.

In another embodiment, when a partition ID of the PU is 1, samples of neighboring blocks of the current CU may further be included as prediction candidates for the motion vector v0 of CP0 and the motion vector v2 of CP2. For example, in the case of the motion vector v0 of CP0, motion information of a previously decoded neighboring block (i.e., a neighboring block or a neighboring sample of the current CU) may further be included as a prediction candidate. In detail, at least one of two pieces of motion information of neighboring samples may further be used as a prediction candidate, and the two pieces of motion information may be represented by A3 and A4, respectively. In case where a width and a height of the CU including the PU are H and coordinates of the top-left sample position of the CU is (xc, yc), A3 may represent a motion vector of a sample of (xc−1, yc−1) coordinates and A4 may represent a motion vector of a sample of (xc−1, yc) coordinates. In this case, at least one of the motion vectors A3 and A4 may further be used as a prediction candidate of v0.

Also, in the case of the motion vector v2 of the CP2, motion information of a neighboring block (or a neighboring sample) previously decoded may further be included as a prediction candidate. In detail, at least one of two pieces of motion information of neighboring samples may further be used as a prediction candidate, and the two pieces of motion information may be represented by C2 and C3, respectively. In case where a width and a height of the CU including the PU are H and coordinates of a top-left sample position of the CU is (xc, yc), C2 may represent a motion vector of a sample of (xc−1, yc+H) coordinates and C3 may represent a motion vector of a sample of (xc−1, yc+H−1) coordinates. In this case, at least one of the motion vectors C2 and C3 may further be used as a prediction candidate of v2.

Referring to FIG. 15B, a method of configuring a prediction candidate for motion information of the CPs of a PU to which the partitioning type nR×2N is applied is shown. A prediction candidate for the motion vectors of the CPs may be configured in consideration of the fact that the PU does not have a square shape, and a prediction candidate for the motion vectors of the CPs may be configured in consideration of decoding processing order of the PU.

As illustrated in FIG. 15B, coded motion information of a neighboring block adjacent to each CP may be used as motion information prediction candidates of three CPs. In case where the affine motion model is applied to the neighboring block, motion information of a neighboring sample adjacent to each CP may be used as a prediction candidate for motion information of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are W and H, respectively, and coordinates of a top-left sample position of the PU is (xp, yp), A0 is a motion vector of a sample of (xp−1, yp−1) coordinates, and A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring block (or neighboring sample), may be used as prediction candidates, and the two pieces of motion information may be represented by B0 and B1, respectively. In case where a width and a height of the PU are W and H, respectively, and coordinates of a top-left sample position of the PU is (xp, yp), B0 may represent a motion vector of a sample of (xp+W, yp−1) coordinates and B1 may represent a motion vector of a sample of (xp+W−1, yp−1) coordinates. In this case, at least one of the motion vectors B0 and B1 may be used as a prediction candidate of v1.

Also, in the case of the motion vector v2 of CP2, two pieces of motion information, among pieces of the motion information of the previously decoded neighboring block (or neighboring sample), may be used as prediction candidates, and the two pieces of motion information may be represented by C0 and C1, respectively. In case where a width and a height of the PU are W and H, respectively, and coordinates of a top-left sample position of the PU is (xp, yp), C0 may represent a motion vector of a sample of (xp−1, yp+H) coordinates and C1 may represent a motion vector of a sample of (xp−1, yp+H−1) coordinates. In this case, at least one of the motion vectors C0 and C1 may be used as a prediction candidate of v2.

In another embodiment, when a partition ID of the PU is 1, samples of neighboring blocks of the current CU may further be included as prediction candidates for the motion vector v0 of CP0 and the motion vector v2 of CP2. For example, in the case of the motion vector v0 of CP0, motion information of a previously decoded neighboring block (i.e., a neighboring block or a neighboring sample of the current CU) may further be included as a prediction candidate. In detail, at least one of three pieces of motion information of neighboring samples may further be used as a prediction candidate, and the three pieces of motion information may be represented by A3, A4, and A5, respectively. In case where a width and a height of the CU including the PU are H and coordinates of the top-left sample position of the CU is (xc, yc), A3 may represent a motion vector of a sample of (xc−1, yc−1) coordinates, A4 may represent a motion vector of a sample of (xc, yc−1) coordinates, and A5 may represent a motion vector of a sample of (xc−1, yc) coordinates. In this case, at least one of the motion vectors A3, A4, and A5 may further be used as a prediction candidate of v0.

Also, in the case of the motion vector v2 of CP2, motion information of the previously decoded neighboring block (or neighboring sample), may be used as a prediction candidate. In detail, at least one of three pieces of motion information of neighboring samples may further be used as a prediction candidate, and the three pieces of motion information may be represented by C2, C3, and C4, respectively. In case where a width and a height of the CU including the PU are H and coordinates of a top-left sample position of the CU is (xc, yc), C2 may represent a motion vector of a sample of (xc−1, yc+H) coordinates, C3 may represent a motion vector of a sample of (xc, yc+H) coordinates, and C4 may represent a motion vector of a sample of (xc−1, yc+H−1) coordinates. In this case, at least one of the motion vectors C2, C3, and C4 may further be used as a prediction candidate of v2.

Referring to FIG. 15C, a method of configuring a prediction candidate for motion information of the CPs of a PU to which the partitioning type 2N×nU is applied is shown. As illustrated in FIG. 15C, a prediction candidate for the motion vectors of the CPs may be configured in consideration of the fact that the PU does not have a square shape, and a prediction candidate for the motion vectors of the CPs may be configured in consideration of decoding processing order of the PU.

As illustrated in FIG. 15C, coded motion information of a neighboring block adjacent to each CP may be used as motion information prediction candidates of the three CPs. In case where the affine motion model is applied to the neighboring block, motion information of a neighboring sample adjacent to each CP may be used as a prediction candidate for motion information of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are W and H, respectively, and coordinates of a top-left sample position of the PU is (xp, yp), A0 is a motion vector of a sample of (xp−1, yp−1) coordinates, and A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring block (or neighboring sample), may be used as prediction candidates, and the two pieces of motion information may be represented by B0 and B1, respectively. In case where a width and a height of the PU are W and H, respectively, and coordinates of a top-left sample position of the PU is (xp, yp), B0 may represent a motion vector of a sample of (xp+W, yp−1) coordinates and B1 may represent a motion vector of a sample of (xp+W−1, yp−1) coordinates. In this case, at least one of the motion vectors B0 and B1 may be used as a prediction candidate of v1.

Also, in the case of the motion vector v2 of CP2, two pieces of motion information, among pieces of the motion information of the previously decoded neighboring block (or neighboring sample), may be used as prediction candidates, and the two pieces of motion information may be represented by C0 and C1, respectively. In case where a width and a height of the PU are W and H, respectively, and coordinates of a top-left sample position of the PU is (xp, yp), C0 may represent a motion vector of a sample of (xp−1, yp+H) coordinates and C1 may represent a motion vector of a sample of (xp−1, yp+H−1) coordinates. In this case, at least one of the motion vectors C0 and C1 may be used as a prediction candidate of v2.

In another embodiment, when a partition ID of the PU is 1, samples of neighboring blocks of the current CU may further be included as prediction candidates for the motion vector v0 of CP0 and the motion vector v1 of CP1. For example, in the case of the motion vector v0 of CP0, motion information of a previously decoded neighboring block (i.e., a neighboring block or a neighboring sample of the current CU) may further be included as a prediction candidate. In detail, at least one of two pieces of motion information of neighboring samples may further be used as a prediction candidate, and the two pieces of motion information may be represented by A3 and A4, respectively. In case where a width and a height of the CU including the PU are W and coordinates of the top-left sample position of the CU is (xc, yc), A3 may represent a motion vector of a sample of (xc−1, yc−1) coordinates and A4 may represent a motion vector of a sample of (xc, yc−1) coordinates. In this case, at least one of the motion vectors A3 and A4 may further be used as a prediction candidate of v0.

Also, in the case of the motion vector v1 of the CP1, motion information of a previously decoded neighboring block (or neighboring sample) may further be included as a prediction candidate. In detail, at least one of two pieces of motion information of neighboring samples may further be used as a prediction candidate, and the two pieces of motion information may be represented by B2 and B3, respectively. In case where a width and a height of a CU including the PU are W and coordinates of a top-left sample position of the CU is (xc, yc), B2 may represent a motion vector of a sample of (xc+S, yc−1) coordinates and B3 may represent a motion vector of a sample of (xc+S−1, yc−1) coordinates. In this case, at least one of the motion vectors B2 and B3 may further be used as a prediction candidate of v1.

Referring to FIG. 15D, a method of configuring a prediction candidate for motion information of the CPs of a PU to which the partitioning type 2N×nD is applied is shown. As illustrated in FIG. 15D, a prediction candidate for the motion vectors of the CPs may be configured in consideration of the fact that the PU does not have a square shape, and a prediction candidate for the motion vectors of the CPs may be configured in consideration of decoding processing order of the PU.

As illustrated in FIG. 15D, coded motion information of a neighboring block (or neighboring sample) adjacent to each CP may be used as a prediction candidate for motion information of the three CPs. In case where the affine motion model is applied to the neighboring block, motion information of a neighboring sample adjacent to each CP may be used as a motion information prediction candidate of each CP. For example, in the case of motion vector v0 of CP0, three pieces of motion information, among pieces of motion information of previously decoded neighboring blocks (or neighboring samples), may be used as prediction candidates, and the three pieces of motion information may be represented by A0, A1, and A2. In case where a width and a height of the PU are W and H, respectively, and coordinates of a top-left sample position of the PU is (xp, vp), A0 may be a motion vector of a sample of (xp−1, yp−1) coordinates. A1 may represent a motion vector of a sample of (xp, yp−1) coordinates, and A2 may represent a motion vector of a sample of (xp−1, yp) coordinates. In this case, at least one of the motion vectors A0, A1 and A2 may be used as a prediction candidate of v0.

Also, in the case of the motion vector v1 of CP1, two pieces of motion information, among pieces of the motion information of the previously decoded neighboring block (or neighboring sample), may be used as prediction candidates, and the two pieces of motion information may be represented by B0 and B1, respectively. In case where a width and a height of the PU are W and H, respectively, and coordinates of a top-left sample position of the PU is (xp, yp), B0 may represent a motion vector of a sample of (xp+W, yp−1) coordinates and B1 may represent a motion vector of a sample of (xp+W−1, yp−1) coordinates. In this case, at least one of the motion vectors B0 and B1 may be used as a prediction candidate of v1.

Also, in the case of the motion vector v2 of CP2, two pieces of motion information, among pieces of the motion information of the previously decoded neighboring block (or neighboring sample), may be used as prediction candidates, and the two pieces of motion information may be represented by C0 and C1, respectively. In case where a width and a height of the PU are W and H, respectively, and coordinates of a top-left sample position of the PU is (xp, yp), C0 may represent a motion vector of a sample of (xp−1, yp+H) coordinates and C1 may represent a motion vector of a sample of (xp−1, yp+H−1) coordinates. In this case, at least one of the motion vectors C0 and C1 may be used as a prediction candidate of v2.

In another embodiment, when a partition ID of the PU is 1, samples of neighboring blocks of the current CU may further be included as prediction candidates for the motion vector v0 of CP0 and the motion vector v1 of CP1. For example, in the case of the motion vector v0 of CP0, motion information of a previously decoded neighboring block (i.e., a neighboring block or a neighboring sample of the current CU) may further be included as a prediction candidate. In detail, at least one of three pieces of motion information of neighboring samples may further be used as a prediction candidate, and the three pieces of motion information may be represented by A3, A4, and A5, respectively. In case where a width and a height of the CU including the PU are W and coordinates of the top-left sample position of the CU is (xc, yc) A3 may represent a motion vector of a sample of (xc−1, yc) coordinates, A4 may represent a motion vector of a sample of (xc−1, yc−1) coordinates, and A5 may represent a motion vector of a sample of (xc, yc−1) coordinates. In this case, at least one of the motion vectors A3, A4, and A5 may further be used as a prediction candidate of v0.

Also, in the case of the motion vector v1 of the CP1, motion information of a previously decoded neighboring block (or neighboring sample) may further be included as a prediction candidate. In detail, at least one of three pieces of motion information of neighboring samples may further be used as a prediction candidate, and the three pieces of motion information may be represented by B2, B3, and B4, respectively. In case where a width and a height of a CU including the PU are W and coordinates of a top-left sample position of the CU is (xc, yc), B2 may represent a motion vector of a sample of (xc+W, yc) coordinates, B3 may represent a motion vector of a sample of (xc+W, yc−1) coordinates, and B4 may represent a motion vector of a sample of (xc+W−1, yc−1) coordinates. In this case, at least one of the motion vectors B2, B3, and B4 may further be used as a prediction candidate of v1.

Each PU included in the CU illustrated in FIGS. 15A to 15D may use the same prediction candidates of the PUs in the CU as prediction candidates for the motion vectors of the CPs regardless of shape and partition ID. For example, in the case of the motion vector v0 of the CP0 of each PU, three pieces of motion information, among the pieces of motion information of the previously decoded neighboring blocks (i.e., neighboring blocks or neighboring samples of the current CU), may be used as prediction candidates and the three pieces of motion information may be represented by A0, A1, and A2, respectively. In case where a width and a height of the CU are W and H, respectively, and the coordinates of the top-left sample position of the CU is (xc, yc), A0 may represent a motion vector of a sample of (xc−1, yc−1) coordinates, A1 may represent a motion vector of a sample of (xc, yc−1) coordinates, and A2 may represent a motion vector of a sample of (xc−1, yc) coordinates. In this case, at least one of the motion vectors A0, A1 and A2 may be used as a prediction candidate of v0.

Also, in the case of the motion vector v1 of CP1 of each PU, two pieces of motion information, among pieces of motion information of the previously decoded neighboring blocks (or neighboring samples) may be used as prediction candidates, and the two pieces of motion information may be represented by B0 and B1. In case where a width and a height of the CU are W and coordinates of the top-left sample position of the CU is (xc, yc), B0 may represent a motion vector of a sample of (xc+W, yc−1) coordinates and B1 may represent a motion vector of a sample of (xc+W−1, yc−1) coordinates. In this case, at least one of the motion vectors B0 and B1 may be used as a prediction candidate of v1.

Also, in the case of the motion vector v2 of CP2 of each PU, two pieces of motion information, among pieces of the motion information of the previously decoded neighboring blocks (or neighboring samples), may be used as prediction candidates, and the two pieces of motion information may be represented by C0 and C1, respectively. In case where a width and a height of the CU are W and coordinates of the top-left sample position of the CU is (xc, yc), C0 may represent a motion vector of a sample of (xc−1, yc+H) coordinates and C1 may represent a motion vector of a sample of (xc−1, yc+H−1) coordinates. In this case, at least one of the motion vectors C0 and C1 may be used as a prediction candidate of v2.

As a method of configuring a prediction candidate for motion vectors of CPs of a PU to which the nL×2N, nR×2N, 2N×nU, or 2N×nD partitioning type is applied, prediction candidates may be limited to a predetermined number so as to be configured.

Figure 16:
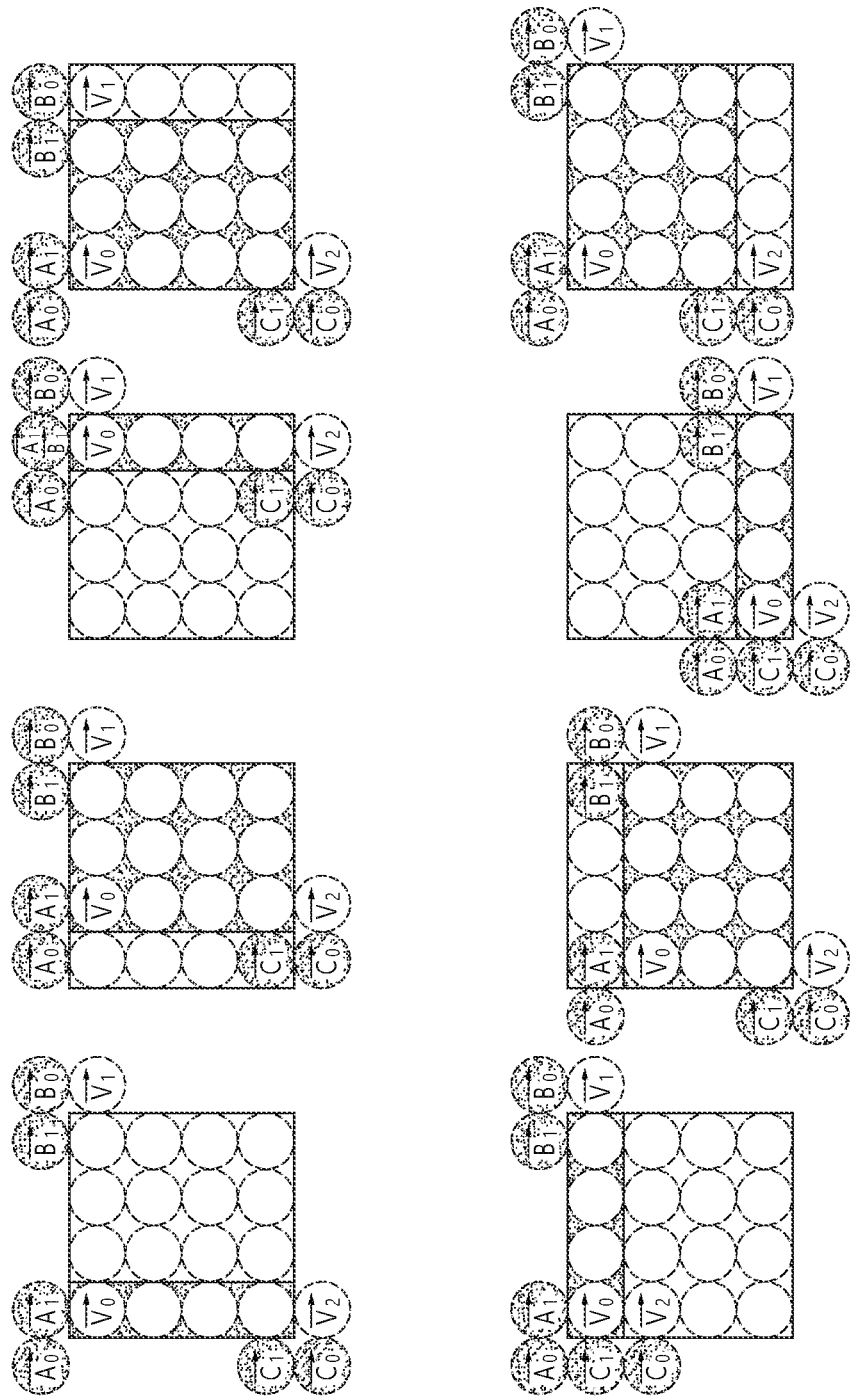
FIG. 16 is a view illustrating a configuration in which prediction candidates of CPs of asymmetric PUs are limited to two prediction candidates.

FIG. 16 illustrates a configuration in which prediction candidates of CPs of asymmetric PUs are limited to two prediction candidates. The asymmetric PUs may be PUs partitioned from a CU based on the partitioning type nL×2N, nR×2N, 2N×nU, or 2N×nD.

Referring to FIG. 16, a configuration in which prediction candidates of each CP of each PU is limited to two prediction candidates is illustrated. For example, in the case of the motion vector v0 of CP0, two pieces of motion information, among pieces of motion information of the previously decoded neighboring blocks (or neighboring samples), may be used as prediction candidates, and the two pieces of motion information may be represented by A0 and A1. In case where a width and a height of the PU are W and H, respectively, and the coordinates of the top-left sample position of the PU is (xp, yp), A0 may represent a motion vector of a sample of (xp−1, yp−1) coordinates and A1 may represent a motion vector of a sample of (xp, yp−1) coordinates. In this case, A0 and A1 may be used as prediction candidates of v0.

Also, in the case of the motion vector v1 of CP1, two pieces of motion information, among pieces of the motion information of the previously decoded neighboring blocks (or neighboring samples), may be used as prediction candidates, and the two pieces of motion information may be represented by B0 and B1, respectively. In case where a width and a height of the PU are W and respectively, and coordinates of a top-left sample position of the PU is (xp, yp), B0 may represent a motion vector of a sample of (xp+W yp−1) coordinates and B1 may represent a motion vector of a sample of (xp+W−1, yp−1) coordinates. In this case, the motion vectors B0 and B1 may be used as a prediction candidate of v1.

Also, in the case of the motion vector v2 of CP2, two pieces of motion information, among pieces of the motion information of the previously decoded neighboring blocks (or neighboring samples), may be used as prediction candidates, and the two pieces of motion information may be represented by C0 and C1, respectively. In case where a width and a height of the PU are W and H, respectively, and coordinates of a top-left sample position of the PU is (xp, yp), C0 may represent a motion vector of a sample of (xp−1, yp+H) coordinates and C1 may represent a motion vector of a sample of (xp−1, yp+H−1) coordinates. In this case, the motion vectors C0 and C1 may be used as a prediction candidate of v2.

Meanwhile, when the motion vector of each CP is derived as described in the aforementioned embodiment, an amount of data for motion information may slightly be increased. A method of reducing the amount of data using the characteristics that each CP is located at the boundary of the current PU may be used.

If a CP of a PU (next PU) to be decoded next to the current PU has the same position as the CP of the current PU, the encoding device may not separately code motion information on the CP of the next PU, and may use a method of coding using the above-described prediction candidates only for the CP in the case where motion information is not present in a previous decoding process.

Figure 17:
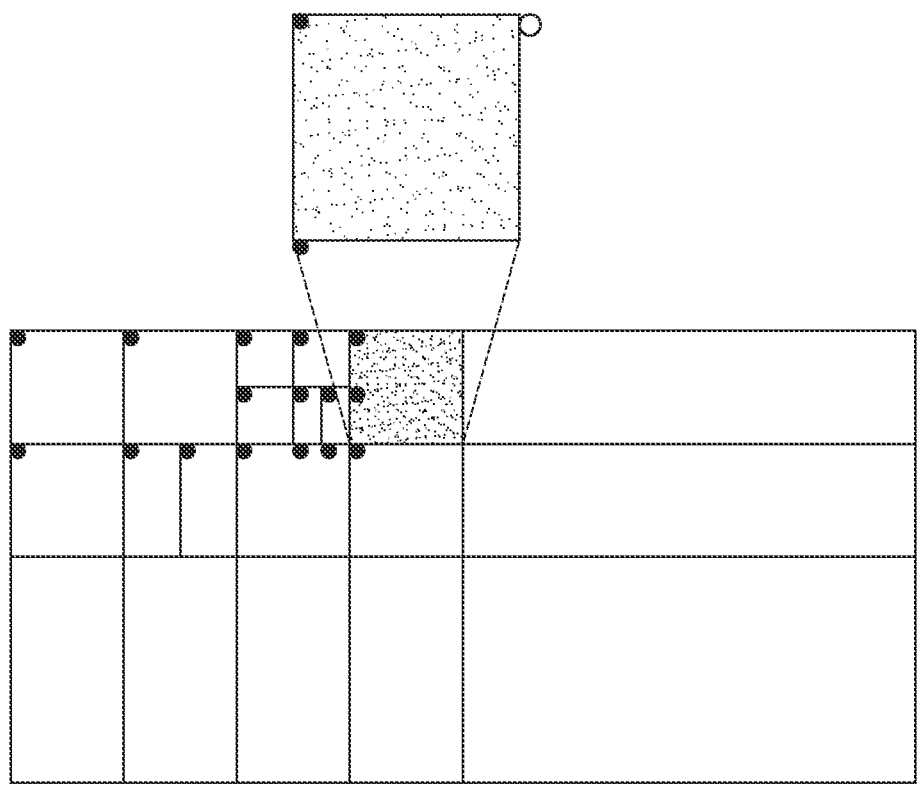
FIG. 17 is a view illustrating a PU including a CP for which motion information coding is required and a CP for which motion information coding is not required.

FIG. 17 illustrates a PU including a CP for which motion information coding is required and a CP for which motion information coding is not required. Whether or not a PU is a PU for which motion information is required may be determined by checking a decoding process of motion information of a neighboring block of a current PU within the encoding device/decoding device. Therefore, transmission of additional syntax information may not be required in determining whether the PU is a PU for which motion information is required. Referring to FIG. 17, CPs of the current PU is illustrated. The top-left, sample of the current PU may be referred to as CP0, the upper right neighboring sample of the current PU may be referred to as CP1, and the bottom-left neighboring sample of the current PU may be referred to as CP2. In case where the blocks are coded according to raster scan order, it may be determined that the right block of the current PU has not been decoded yet. Thus, it may be determined that motion information for the CP located at the right block needs to be coded. For example, since motion vectors of the CPs, excluding CP1, have been derived in a process of decoding previous PUs, the encoding device may code only motion information for the CP1 and transmit the coded motion information through a bit stream.

Figure 18:
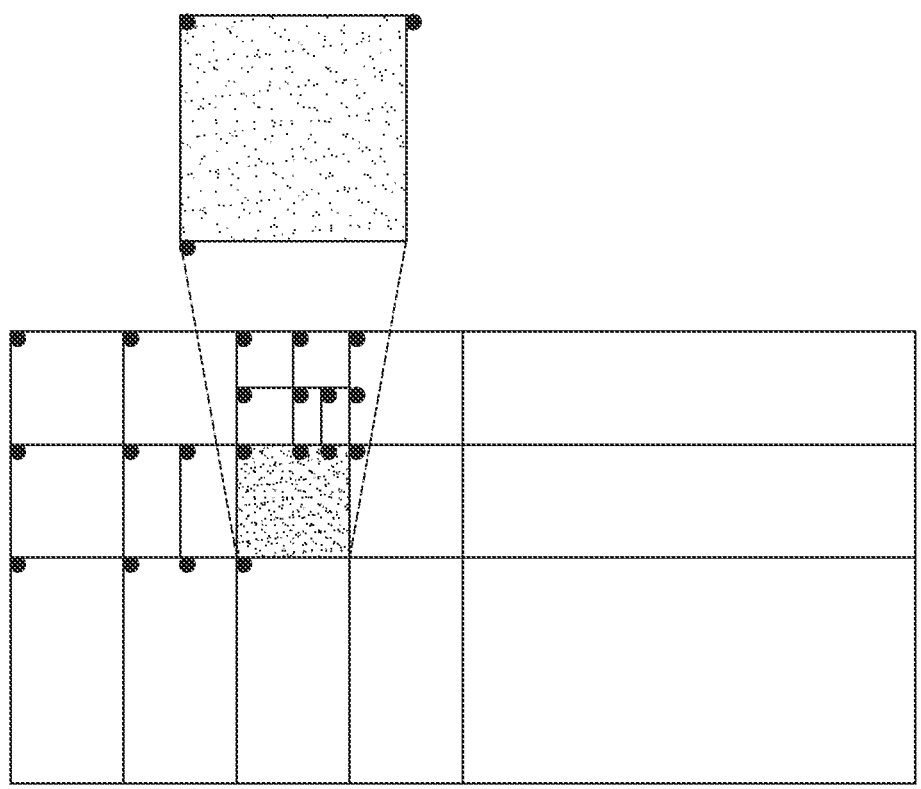
FIG. 18 is a view illustrating a PU including CPs for which motion information coding is not required.

FIG. 18 illustrates a PU including CPs for which motion information coding is not required. Referring to FIG. 18, motion information of a sample in which CPs of a current PU are located has already been derived from an upper block of the current PU. Accordingly, the encoding device may code the corresponding motion information without decoding additional motion information That is, the decoding device may derive a motion vector of the CPs of the current PU based on a motion vector derived in the previous decoding process, without receiving additional motion information.

For example, in the case of CP0, in case where an uppermost block, among left neighboring blocks adjacent to a left boundary of the current block, is decoded based on the affine motion model, a motion vector of CP1 of the corresponding block may be used as a motion vector of CP0 of the current block. Also, in case where a leftmost block, among upper neighboring blocks adjacent to an upper boundary of the current block, is decoded based on the affine motion model, a motion vector of CP2 of the corresponding block may be used as a motion vector of CP0 of the current block. Also, in case where an upper left neighboring block of the current block is decoded based on the affine motion model, a motion vector of a lower right neighboring sample of the corresponding block derived based on the CPs of the corresponding block may be used as a motion vector of CP0 of the current block. In this case, the motion vector of the lower right neighboring sample of the corresponding block may be derived based on the CPs of the corresponding block based on Equations 2 to 5 described above.

For example, in the case of CP1, in case where an upper right neighboring block of the current block is decoded based on the affine motion model, a motion vector of CP2 of the corresponding block may be used as a motion vector of CP1 of the current block. In case where a rightmost block of the upper neighboring blocks adjacent to the upper boundary of the current block is decoded based on the affine motion model, a motion vector of a lower right neighboring sample of the corresponding block derived based on the CPs of the block may be used as a motion vector of CP1 of the current block. In this case, the motion vector of the lower right neighboring samples of the corresponding block may be derived based on the CPs of the corresponding block based on Equations 2 to 5 described above.

For example, in the case of CP2, in case where a lower left neighboring block of the current block is decoded based on the affine motion model, a motion vector of CP1 of the corresponding block may be used as a motion vector of CP2 of the current block. Also, in case where a lowermost block of left neighboring blocks adjacent to a left boundary of the current block is decoded based on the affine motion model, a motion vector of a lower tight neighboring sample of the corresponding block derived based on the CPs of the current block may be used as a motion vector of CP2 of the current block. In this case, the motion vector of the lower right neighboring sample of the corresponding block may be derived based on the CPs of the corresponding block based on Equations 2 to 5 described above.

Figure 19:
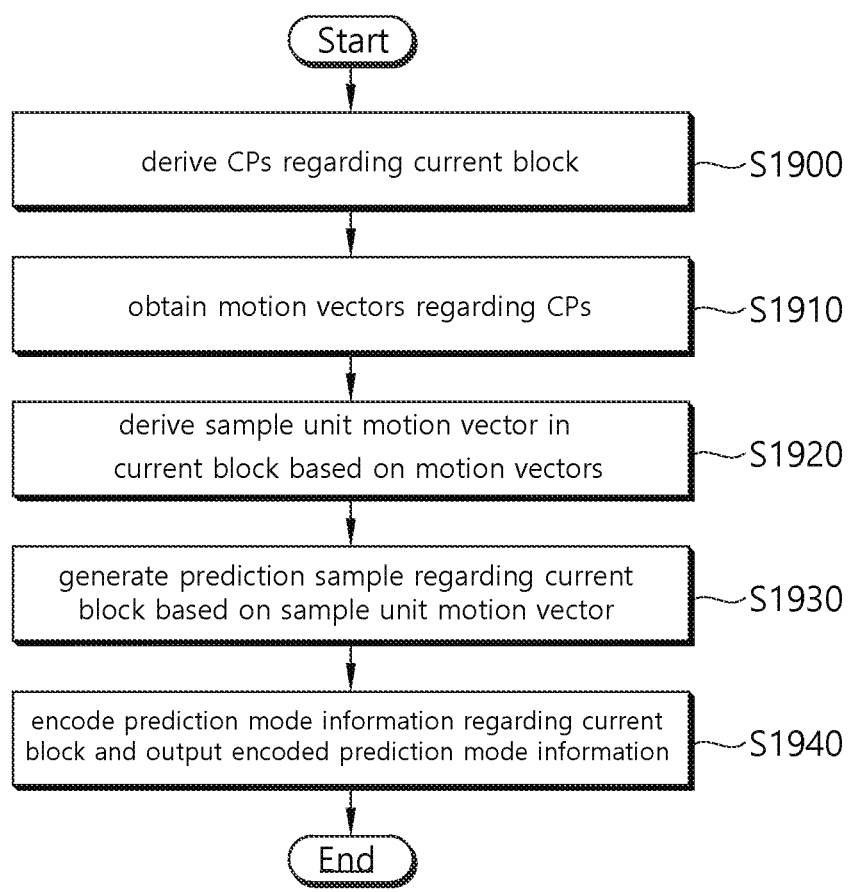
FIG. 19 is a view schematically illustrating a video encoding method by an encoding device according to the present invention.

FIG. 19 schematically illustrates a video encoding method by an encoding device according to the present invention. The method disclosed in FIG. 19 may be performed by the encoding device disclosed in FIG. 1. Specifically, for example, steps S1900 to S1930 of FIG. 19 may be performed by the predicting unit of the encoding device, and step S1940 may be performed by the entropy-encoding unit of the encoding device.

The encoding device derives control points (CPs) for a current block (S1900). The encoding device may determine whether to apply the affine motion model of the current block based on an RD cost. In case where the affine motion model is applied to the current block, the encoding device may derive CPs to apply the affine motion model. The CPs may be three CPs.

For example, in case where the current block is a PU partitioned from a CU based on the partitioning type 2N×2N and a width and a height of the current block are S, the encoding device may derive three CPs in which CP0 is a sample of (0, 0) coordinates, CP1 is a sample of (S, 0) coordinates, and CP2 is a sample of (0, S) coordinates based on coordinates (0, 0) of the top-left sample position of the current block.

Also, in case where the current block is a PU partitioned from a CU based on the partitioning type N×2N and a width and a height of the current block are S/2 and S, respectively, the encoding device may derive three CPs in which CP0 is a sample of (0, 0) coordinates, CP1 is a sample of (S/2, 0) coordinates, and CP2 is a sample of (0, S) coordinates based on the coordinates (0, 0) of the top-left sample position of the current block.

Also, in case where the current block is a PU partitioned from a CU based on the partitioning type 2N×N and a width and a height of the current block are S and S/2, respectively, the encoding device may derive three CPs in which CP0 is a sample of (0, 0) coordinates, CP1 is a sample of (S/2, 0) coordinates, and CP2 is a sample of (0, S/2) coordinates based on the coordinates (0, 0) of the top-left sample position of the current block.

Also, in case where the current block is a PU partitioned from a CU based on the partitioning type nL×2N, nR×2N, 2N×nU, or 2N×nD and a width and a height of the current block are W and H, respectively, the encoding device may derive three CPs in which CP0 is a sample of (0, 0) coordinates, CP1 is a sample of (W, 0) coordinates, and CP2 is a sample of (0, H) coordinates based on the coordinates (0, 0) of the top-left sample position of the current block.

The encoding device obtains motion vectors for the CPs (S1910). The encoding device may derive motion vectors for the CPs based on neighboring samples adjacent to the CPs. The samples adjacent to the CPs may be configured as prediction candidates. The encoding device may configure prediction candidates for the motion vectors of the CPs based on coded motion information of neighboring blocks (or samples) adjacent to each CP and derive a motion vector of each CP based on an optimal candidate among the configured prediction candidates. The prediction candidates may be determined based on a partitioning type, a partition ID, and a shape of the current block.

For example, in case where the current block is a PU to which the partitioning type 2N×2N is applied, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are S and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on a neighboring sample group 0 including the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are S and coordinates of a top-left sample position of the current block is (xp, yp), B0 may represent a motion vector of a sample of (xp+S, yp−1) coordinates and B1 may represent a motion vector of a sample of (xp+S−1, yp−1) coordinates. In this case, the encoding device may use at least one of the motion vectors B0 and B1 as a prediction candidate of v1. That is, the encoding device may derive the motion vector v1 regarding CP1 based on a neighboring sample group 1 including the sample of the (xp+S, yp−1) coordinates and the sample of the (xp+S−1, yp−1) coordinates.

Also, in the case of the motion vector v2 of CP2, the encoding device may use two pieces of motion information, among pieces of motion information of neighboring blocks (or neighboring samples), as prediction candidates, and the two pieces of motion information may be represented by C0 and C1. In case where a width and a height of the current block are S and coordinates of a top-left sample position of the current block is (xp, yp), C0 may represent a motion vector of a sample of (xp−1, yp+S) coordinates and C1 may represent a motion vector of a sample of (xp−1, yp+S−1) coordinates. In this case, the encoding device may use at least one of the motion vectors C0 and C1 as a prediction candidate of v2. That is, the encoding device may derive the motion vector v2 regarding CP2 based on a neighboring sample group 2 including at least one of the sample of the (xp−1, yp+S) coordinates and the sample of the (xp−1, yp+S−1) coordinates.

In another example, in case where the current block is a PU to which the partitioning type 2N×N is applied, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are S and S/2, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on a neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are S and S/2, respectively, and coordinates of a top-left sample position of the current block is (xp, yp), B0 may represent a motion vector of a sample of (xp+S, yp−1) coordinates and B1 may represent a motion vector of a sample of (xp+S−1, yp−1) coordinates. In this case, the encoding device may use at least one of the motion vectors B0 and B1 as a prediction candidate of v1. That is, the encoding device may derive the motion vector v1 regarding CP1 based on a neighboring sample group 1 including at least one of the sample of the (yp−1) coordinates and the sample of the (xp+S−1, yp−1) coordinates.

Also, in the case of the motion vector v2 of CP2, the encoding device may use two pieces of motion information, among pieces of motion information of neighboring blocks (or neighboring samples), as prediction candidates, and the two pieces of motion information may be represented by C0 and C1. In case where a width and a height of the current block are S and S/2, respectively, and coordinates of a top-left sample position of the current block is (xp, yp), C0 may represent a motion vector of a sample of (xp−1, yp+S/2) coordinates and C1 may represent a motion vector of a sample of (xp−1, yp+S/2−1) coordinates. In this case, the encoding device may use at least one of the motion vectors C0 and C1 as a prediction candidate of v2. That is, the encoding device may derive the motion vector v2 regarding CP2 based on a neighboring sample group 2 including at least one of the sample of the (xp−1, yp+S/2) coordinates and the sample of the (xp−1, yp+S/2−1) coordinates.

In case where a partition ID of the current block is 1, the encoding device may further include samples of neighboring blocks of the current CU as prediction candidates for the motion vector v0 of CP0 and the motion vector v1 of CP1. For example, in the case of the motion vector v0 of CP0, the encoding device may further include motion information of neighboring blocks (i.e., neighboring samples) as a prediction candidate. In detail, the encoding device may further use at least one of three pieces of motion information of neighboring samples as a prediction candidate, and the three pieces of motion information may be represented by A3, A4, and A5, respectively. In case where a width and a height of the CU including the current block are S and coordinates of the top-left sample position of the CU is (xc, yc), A3 may represent a motion vector of a sample of (xc−1, yc) coordinates, A4 may represent a motion vector of a sample of (xc−1, yc−1) coordinates, and A5 may represent a motion vector of a sample of (xc, yc−1) coordinates. In this case, the encoding device may further use at least one of the motion vectors A3, A4, and A5 as a prediction candidate of v0. That is, the encoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v1 of CP1, the encoding device may further include motion information of a neighboring block of the current CU as a prediction candidate. In detail, the encoding device may further use at least one of three pieces of motion information of neighboring samples as a prediction candidate, and the three pieces of motion information may be represented by B2, B3, and B4, respectively. In case where a width and a height of the CU including the current block are S and coordinates of the top-left sample position of the CU is (xc, yc), B2 may represent a motion vector of a sample of (xc+S, yc) coordinates, B3 may represent a motion vector of a sample of (xc+S, yc−1) coordinates, and B4 may represent a motion vector of a sample of (xc+S−1, yc−1) coordinates. In this case, the encoding device may further use at least one of the motion vectors B2, B3, and B4 as a prediction candidate of v1. That is, the encoding device may further include at least one of the sample of the (xc+S, yc) coordinates, the sample of the (xc+S, yc−1) coordinates, and the sample of the (xc+S−1, yc−1) coordinates in the neighboring sample group 1.

Also, the encoding device may configure the prediction candidates for the motion vectors of the CPs of the current block by limiting the number of prediction candidates to a certain number. In the case of the motion vector v0 of CP0, the encoding device may use two pieces of motion information, among pieces of motion information of the neighboring blocks (or neighboring samples), as prediction candidates, and the two pieces of motion information may be represented by A0 and A1. In case where a width and a height of the current block are S and S/2, respectively, and the coordinates of the top-left sample position of the current block is (xp, yp), A0 may represent a motion vector of a sample of (xp−1, yp−1) coordinates and A1 may represent a motion vector of a sample of (xp, yp−1) coordinates. In this case, the encoding device may use A0 and A1 as prediction candidates of v0. That is, the encoding device may include the sample of the (xp−1, yp−1) coordinates and the sample of the (xp, yp−1) coordinates in the neighboring sample group 0, and availability of the sample of the (xp−1, yp−1) coordinates and the sample of the (xp, yp−1) coordinates may be sequentially determined according to first predefined priority order.

In the case of the motion vector v1 of CP1, the encoding device may use two pieces of motion information, among pieces of motion information of the neighboring blocks neighboring samples), as prediction candidates, and the two pieces of motion information may be represented by B0 and B1. In case where a width and a height of the current block are S and S/2, respectively, and the coordinates of the top-left sample position of the current block is (xp, yp), B0 may represent a motion vector of a sample of (xp+S, yp−1) coordinates and B1 may represent a motion vector of a sample of (xp+S−1, yp−1) coordinates. In this case, the encoding device may use B0 and B1 as prediction candidates of v1. That is, the encoding device may include the sample of the (xp+S, yp−1) coordinates and the sample of the (xp+S−1, yp−1) coordinates in the neighboring sample group 1, and availability of the sample of the (xp+S, yp−1) coordinates and the sample of the (xp+S−1, yp−1) coordinates may be sequentially determined according to second predefined priority order.

In the case of the motion vector v2 of CP2, the encoding device may use two pieces of motion information, among pieces of motion information of the neighboring blocks (or neighboring samples), as prediction candidates, and the two pieces of motion information may be represented by C0 and C1. In case where a width and a height of the current block are S and S/2, respectively, and the coordinates of the top-left sample position of the current block is (xp, yp), C0 may represent a motion vector of a sample of (xp−1, yp+S/2) coordinates and C1 may represent a motion vector of a sample of (xp−1, yp+S/2−1) coordinates. In this case, the encoding device may use C0 and C1 as prediction candidates of v2. That is, the encoding device may include the sample of the (xp−1, yp+S/2) coordinates and the sample of the (xp−1, yp+S/2−1) coordinates in the neighboring sample group 2, and availability of the sample of the (xp−1, yp+S/2) coordinates and the sample of the (xp−1, yp+S/2−1) coordinates may be sequentially determined according to third predefined priority order.

In another example, in case where the current block is a PU to which the partitioning type N×2N is applied, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are S/2 and S, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on a neighboring sample group 0 including the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are S/2 and S, respectively, and coordinates of a top-left sample position of the current block is (xp, yp), B0 may represent a motion vector of a sample of (xp+S/2, yp−1) coordinates and B1 may represent a motion vector of a sample of (xp+S/2−1, yp−1) coordinates. In this case, the encoding device may use at least one of the motion vectors B0 and B1 as a prediction candidate of v1. Also, in case where a partition ID of the current block is 0, the encoding device may further include at least one of the motion vector B2 of the sample of the (xp+S/2+1, yp−1) coordinates and the motion vector B3 of the sample of the (xp+S/2+2, yp−1) coordinates as a prediction candidate of v1. That is, the encoding device may derive the motion vector v1 regarding CP1 based on the neighboring sample group 1 including the sample of the (xp+S/2, yp−1) coordinates and the sample of the (xp+S/2−1, yp−1) coordinates.

Also, in the case of the motion vector v2 of CP2, the encoding device may use two pieces of motion information, among pieces of motion information of neighboring blocks (or neighboring samples), as prediction candidates, and the two pieces of motion information may be represented by C0 and C1. In case where a width and a height of the current block are S/2 and S, respectively, and coordinates of a top-left sample position of the current block is (xp, yp), C0 may represent a motion vector of a sample of (xp−1, yp+S) coordinates and C1 may represent a motion vector of a sample of yp+S−1) coordinates. In this case, the encoding device may use at least one of the motion vectors C0 and C1 as a prediction candidate of v2. That is, the encoding device may derive the motion vector v2 regarding CP2 based on the neighboring sample group 2 including the sample of the (xp−1, yp+S) coordinates and the sample of the (xp−1, yp+S−1) coordinates.

In case where a partition ID of the current block is 1, the encoding device may further include samples of neighboring blocks of the current CU as prediction candidates for the motion vector v0 of CP0 and the motion vector v2 of CP2. For example, in the case of the motion vector v0 of CP0, the encoding device may further include motion information of neighboring blocks (i.e., neighboring samples) as a prediction candidate. In detail, the encoding device may further use at least one of three pieces of motion information of neighboring samples as a prediction candidate, and the three pieces of motion information may be represented by A3, A4, and A5, respectively. In case where a width and a height of the CU including the current block are S and coordinates of the top-left sample position of the CU is (xc, yc), A3 may represent a motion vector of a sample of (xc−1, yc−1) coordinates, A4 may represent a motion vector of a sample of (xc, yc−1) coordinates, and A5 may represent a motion vector of a sample of (xc−1, yc) coordinates. In this case, the encoding device may further use at least one of the motion vectors A3, A4, and A5 as a prediction candidate of v0. That is, the encoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v2 of CP2, the encoding device may further include motion information of neighboring blocks (or neighboring samples) as a prediction candidate. In detail, the encoding device may further use at least one of three pieces of motion information of neighboring samples as a prediction candidate, and the three pieces of motion information may be represented by C2, C3, and C4, respectively. In case where a width and a height of the CU including the current block are S and coordinates of the top-left sample position of the CU is (xc, ye), C2 may represent a motion vector of a sample of (xc−1, yc+S) coordinates, C3 may represent a motion vector of a sample of (xc, yc+S) coordinates, and C4 may represent a motion vector of a sample of (xc−1, yc+S−1) coordinates. In this case, the encoding device may further use at least one of the motion vectors C2, C3, and C4 as a prediction candidate of v2. That is, the encoding device may further include at least one of the sample of the (xc−1, yc+S−1) coordinates, the sample of the (xc, yc+S) coordinates, and the sample of the (xc−1, yc+S−1) coordinates in the neighboring sample group 2.

Also, the encoding device may configure the prediction candidates for the motion vectors of the CPs of the current block by limiting the number of prediction candidates to a certain number. In the case of the motion vector v0 of CPU, the encoding device may use two pieces of motion information, among pieces of motion information of the neighboring blocks (or neighboring samples), as prediction candidates, and the two pieces of motion information may be represented by A0 and A1. In case where a width and a height of the current block are S/2 and S, respectively, and the coordinates of the top-left sample position of the current block is (xp, yp), A0 may represent a motion vector of a sample of (xp−1, yp−1) coordinates and A1 may represent a motion vector of a sample of (xp, yp−1) coordinates. In this case, the encoding device may use A0 and A1 as prediction candidates of v0. That is, the encoding device may include the sample of the (xp−1, yp−1) coordinates and the sample of the (xp, yp−1) coordinates in the neighboring sample group 0, and availability of the sample of the (xp−1, yp−1) coordinates and the sample of the (xp, yp−1) coordinates may be sequentially determined according to first predefined priority order.

In the case of the motion vector v1 of CP1, the encoding device may use two pieces of motion information, among pieces of motion information of the neighboring blocks (or neighboring samples), as prediction candidates, and the two pieces of motion information may be represented by B0 and B1. In case where a width and a height of the current block are S/2 and S, respectively, and the coordinates of the top-left sample position of the current block is (xp, yp), B0 may represent a motion vector of a sample of (xp+S/2, yp−1) coordinates and B1 may represent a motion vector of a sample of (xp+S/2−1, yp−1) coordinates. In this case, the encoding device may use B0 and B1 as prediction candidates of v1. That is, the encoding device may include the sample of the (xp+S/2, yp−1) coordinates and the sample of the (xp+S/2−1, yp−1) coordinates in the neighboring sample group 1, and availability of the sample of the (xp+S/2, yp−1) coordinates and the sample of the (xp+S/2−1, yp−1) coordinates may be sequentially determined according to second predefined priority order.

Also, in the case of the motion vector v2 of CP2, the encoding device may use two pieces of motion information, among pieces of motion information of the neighboring blocks (or neighboring samples), as prediction candidates, and the two pieces of motion information may be represented by C0 and C1. In case where a width and a height of the current block are S/2 and S, respectively, and the coordinates of the top-left sample position of the current block is (xp, yp), C0 may represent a motion vector of a sample of (xp−1, yp+S) coordinates and C1 may represent a motion vector of a sample of (xp−1, yp+S−1) coordinates. In this case, the encoding device may use C0 and C1 as prediction candidates of v2, That is, the encoding device may include the sample of the (xp−1, yp+S) coordinates and the sample of the (xp−1, yp+S−1) coordinates in the neighboring sample group 2, and availability of the sample of the (xp−1, yp+S/2) coordinates and the sample of the (xp−1, yp+S/2−1) coordinates may be sequentially determined according to third predefined priority order.

In another example, in case where the current block is a PU to which the partitioning type nL×2N is applied, for example, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the encoding device may use at least one of the motion vectors B0 and B1 as a prediction candidate of v1. That is, the encoding device may derive the motion vector v1 regarding CP1 based on the neighboring sample group 1 including the sample of the (xp+W, yp−1) coordinates and the sample of the (xp+W−1, yp−1) coordinates.

Also, in the case of the motion vector v2 of CP2, the encoding device may use two pieces of motion information, among pieces of motion information of neighboring blocks (or neighboring samples), and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the encoding device may use at least one of the motion vectors C0 and C1 as a prediction candidate of v2. That is, the encoding device may derive the motion vector v2 regarding CP2 based on the neighboring sample group 2 including the sample of the (xp−1, yp+H) coordinates and the sample of the (xp−1, yp+H−1) coordinates.

Also, in case where a partition ID of the current block is 1, the encoding device may further include samples of neighboring blocks of the current CU as prediction candidates for the motion vector 0 of CP0 and the motion vector v2 of CP2. For example, in the case of the motion vector v0 of CP0, the encoding device may further include motion information of neighboring blocks (i.e., neighboring samples) as a prediction candidate. In detail, the encoding device may further use at least one of two pieces of motion information of neighboring samples as a prediction candidate, and the two pieces of motion information may be represented by A3 and A4, respectively. In case where a width and a height of the CU including the current block are H and coordinates of the top-left sample position of the CU is (xc, yc), A3 may represent a motion vector of a sample of (xc−1, yc−1) coordinates and A4 may represent a motion vector of a sample of (xc−1, yc) coordinates. In this case, the encoding device may further use at least one of the motion vectors A3 and A4 as a prediction candidate of v0. That is, the encoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v2 of CP2, the encoding device may further include motion information of neighboring blocks (i.e., neighboring samples) as a prediction candidate. In detail, the encoding device may further use at least one of two pieces of motion information of neighboring samples as a prediction candidate, and the two pieces of motion information may be represented by C2 and C3, respectively. In case where a width and a height of the CU including the current block are H and coordinates of the top-left sample position of the CU is (xc, yc), C2 may represent a motion vector of a sample of (xc−1, yc+H) coordinates and C3 may represent a motion vector of a sample of (xc−1, yc+H−1) coordinates. In this case, the encoding device may further use at least one of the motion vectors C2 and C3 as a prediction candidate of v2. That is, the encoding device may further include at least one of the sample of the (xc−1, yc+H) coordinates and the sample of the (xc−1, yc+H−1) coordinates in the neighboring sample group 2.

In another example, in case where the current block is a PU to which the partitioning type nR×2N is applied, for example, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the encoding device may use at least one of the motion vectors B0 and B1 as a prediction candidate of v1. That is, the encoding device may derive the motion vector v1 regarding CP1 based on the neighboring sample group 1 including the sample of the (xp+W, yp−1) coordinates and the sample of the (xp+W−1, yp−1) coordinates. Also, in the case of the motion vector v2 of CP2, the encoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the encoding device may use at least one of the motion vectors C0 and C1 as a prediction candidate of v2. That is, the encoding device may derive the motion vector v2 regarding CP2 based on the neighboring sample group 2 including the sample of the (xp−1, yp+H) coordinates and the sample of the (xp−1, yp+H−1) coordinates.

Also, in case where a partition ID of the current block is 1, the encoding device may further include samples of neighboring blocks of the current CU as prediction candidates for the motion vector v0 of CP0 and the motion vector v2 of CP2. For example, in the case of the motion vector v0 of CP0, the encoding device may further include motion information of neighboring blocks (i.e., neighboring samples) as a prediction candidate. In detail, the encoding device may further use at least one of three pieces of motion information of neighboring samples as a prediction candidate, and the three pieces of motion information may be represented by A3, A4, and A5, respectively. In case where a width and a height of the CU including the current block are H and coordinates of the top-left sample position of the CU is (xc, yc), A3 may represent a motion vector of a sample of (xc−1, yc−1) coordinates, A4 may represent a motion vector of a sample of (xc, yc−1) coordinates, and A5 may represent a motion vector of a sample of (xc−1, yc) coordinates. In this case, the encoding device may further use at least one of the motion vectors A3, A4, and A5 as a prediction candidate of v0. That is, the encoding device may further include at least one of the sample of the xc−1, yc−1) coordinates, the sample of the (xc−1, xc) coordinates, and the sample of the (xc yc−1) coordinates in the neighboring sample group 0.

Also, in the case of the motion vector v2 of CP2, the encoding device may further include motion information of neighboring blocks (i.e., neighboring samples) as a prediction candidate. In detail, the encoding device may further use at least one of three pieces of motion information of neighboring samples as a prediction candidate, and the three pieces of motion information may be represented by C2, C3, and C4, respectively. In case where a width and a height of the CU including the current block are H and coordinates of the top-left sample position of the CU is (xc, yc), C2 may represent a motion vector of a sample of (xc−1, yc+H) coordinates, C3 may represent a motion vector of a sample of (xc, yc+H) coordinates, and C4 may represent a motion vector of a sample of (xc−1, yc+H−1) coordinates. In this case, the encoding device may further use at least one of the motion vectors C2, C3, and C4 as a prediction candidate of v2. That is, the encoding device may further include at least one of the sample of the (xc−1, yc+H−1) coordinates, the sample of the (xc, yc+H) coordinates, and the sample of the (xc−1, yc+H−1) coordinates in the neighboring sample group 2.

In another example, in case where the current block is a PU to which the partitioning type 2N×nU is applied, for example, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the encoding device may use at least one of the motion vectors B0 and B1 as a prediction candidate of v1. That is, the encoding device may derive the motion vector v1 regarding CP1 based on the neighboring sample group 1 including at least one of the sample of the (xp+W, yp−1) coordinates and the sample of the (xp+W−1, yp−1) coordinates.

Also, in the case of the motion vector v2 of CP2, the encoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the encoding device may use at least one of the motion vectors C0 and C1 as a prediction candidate of v2. That is, the encoding device may derive the motion vector v2 regarding CP2 based on the neighboring sample group 2 including at least one of the sample of the (xp−1, yp+H) coordinates and the sample of the (xp−1, yp+H−1) coordinates.

Also, in case where a partition ID of the current block is 1, the encoding device may further include samples of neighboring blocks of the current CU as prediction candidates for the motion vector v0 of CP0 and the motion vector v1 of CP1. For example, in the case of the motion vector v0 of CP0, the encoding device may further include motion information of neighboring blocks (i.e., neighboring samples) as a prediction candidate. In detail, the encoding device may further use at least one of two pieces of motion information of neighboring samples as a prediction candidate, and the two pieces of motion information may be represented by A3 and A4, respectively. In case where a width and a height of the CU including the current block are W and coordinates of the top-left sample position of the CU is (xc, yc), A3 may represent a motion vector of a sample of (xc−1, yc−1) coordinates and A4 may represent a motion vector of a sample of (xc, yc−1) coordinates. In this case, the encoding device may further use at least one of the motion vectors A3 and A1 as a prediction candidate of v0. That is, the encoding device may further include at least one of the sample of the (xc−1, yc−1) coordinates and the sample of the (xc, yc−1) coordinates in the neighboring sample group 0.

Also, in the case of the motion vector v1 of CP1, the encoding device may further include motion information of neighboring blocks (i.e., neighboring samples) as a prediction candidate. In detail, the encoding device may further use at least one of two pieces of motion information of neighboring samples as a prediction candidate, and the two pieces of motion information may be represented by B2 and B3, respectively. In case where a width and a height of the CU including the current block are W and coordinates of the top-left sample position of the CU is (xc, yc), B2 may represent a motion vector of a sample of (xc+W, yc−1) coordinates and B3 may represent a motion vector of a sample of (xc+W−1, yc−1) coordinates. In this case, the encoding device may further use at least one of the motion vectors B2 and B3 as a prediction candidate of v1. That is, the encoding device may further include at least one of the sample of the (xc+W, yc−1) coordinates and the sample of the (xc+W−1, yc−1) coordinates in the neighboring sample group 1.

In another example, in case where the current block is a PU to which the partitioning type 2N×nD is applied, for example, in the case of the motion vector v0 of CP0, the encoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the encoding device may use at least one of the motion vectors A0, A1 and A2 as a prediction candidate of v0. That is, the encoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the encoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the encoding device may use at least one of the motion vectors B0 and B1 as a prediction candidate of v1. That is, the encoding device may derive the motion vector v1 regarding CP1 based on the neighboring sample group 1 including at least one of the sample of the (xp+W, yp−1) coordinates and the sample of the (xp+W−1, yp−1) coordinates.

Also, in the case of the motion vector v2 of CP2, the encoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the encoding device may use at least one of the motion vectors C0 and C1 as a prediction candidate of v2. That is, the encoding device may derive the motion vector v2 regarding CP2 based on the neighboring sample group 2 including at least one of the sample of the (xp−1, yp+H) coordinates and the sample of the (xp−1, yp+H−1) coordinates.

Also, in case where a partition ID of the current block is 1, the encoding device may further include samples of neighboring blocks of the current CU as prediction candidates for the motion vector v0 of CP0 and the motion vector v1 of CP1. For example, in the case of the motion vector v0 of CP0, the encoding device may further include motion information of neighboring blocks (i.e., neighboring samples) as a prediction candidate. In detail, the encoding device may further use at least one of three pieces of motion information of neighboring samples as a prediction candidate, and the three pieces of motion information may be represented by A3, A4, and A5, respectively. In case where a width and a height of the CU including the current block are W and coordinates of the top-left sample position of the CU is (xc, yc), A3 may represent a motion vector of a sample of (xc−1, yc) coordinates, A4 may represent a motion vector of a sample of (xc−1, yc−1) coordinates, and A5 may represent a motion vector of a sample of (xc, yc−1) coordinates. In this case, the encoding device may further use at least one of the motion vectors A3, A4, and A5 as a prediction candidate of v0. That is, the encoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v1 of CP1, the encoding device may further include motion information of neighboring blocks (i.e., neighboring samples) as a prediction candidate. In detail, the encoding device may further use at least one of three pieces of motion information of neighboring samples as a prediction candidate, and the three pieces of motion information may be represented by B2, B3, and B4, respectively. In case where a width and a height of the CU including the current block are W and coordinates of the top-left sample position of the CU is (xc, yc), B2 may represent a motion vector of a sample of (xc+W, yc) coordinates, B3 may represent a motion vector of a sample of (xc+W, yc−1) candidates, and B4 may represent a motion vector of a sample of (xc+W−1, yc−1) coordinates. In this case, the encoding device may further use at least one of the motion vectors B2, B3, and B4 as a prediction candidate of v1. That is, the encoding device may further include at least one of the sample of the (xc+W, yc) coordinates, the sample of the (xc+W, yc−1) coordinates, and the sample of the (xc+W−1, yc−1) coordinates in the neighboring sample group 1.

In another example, the encoding device may use the same prediction candidates of PUs included in the CU may use the same prediction candidates of the PUs in the CU as prediction candidates for the motion vectors of the CPs, regardless of partition ID. For example, in the case of the motion vector v0 of CP0 of the current block, the encoding device may use three pieces of motion information, among pieces of motion information of neighboring blocks (i.e., neighboring blocks or neighboring samples of the current CU), as prediction candidates, and the three pieces of motion information may be represented by A0, A1, and A2, respectively. In case where a width and a height of the CU are W and respectively, and coordinates of the top-left sample position of the CU is (xc, yc), A0 may represent a motion vector of a sample of (xc−1, yc−1) coordinates, A1 may represent a motion vector of a sample of (xc, yc−1) coordinates, and A2 may represent a motion vector of a sample of (xc−1, yc) coordinates. In this case, the encoding device may use at least one of the motion vectors A0, A1 and A2 as a prediction candidate of v0.

Also, in the case of the motion vector v1 of CP1 of the current block, the encoding device may use two pieces of motion information, among pieces of motion information of neighboring blocks (or neighboring samples), as prediction candidates, and the two pieces of motion information may be represented by B0 and B1. In case where a width and a height of the CU are W and coordinates of the top-left sample position of the CU is (xc, yc), B0 may represent a motion vector of a sample of (xc+W, yc−1) coordinates and B1 may represent a motion vector of a sample of (xc+W−1, yc−1) coordinates. In this case, the encoding device may use at least one of the motion vectors B0 and B1 as a prediction candidate of v1.

Also, in the case of the motion vector v2 of CP2 of the current block, the encoding device may use two pieces of motion information, among pieces of the motion information of the neighboring blocks (or neighboring samples), as prediction candidates, and the two pieces of motion information may be represented by C0 and C1, respectively. In case where a width and a height of the CU are W and coordinates of the top-left sample position of the CU is (xc, yc), C0 may represent a motion vector of a sample of (xc−1, yc+H) coordinates and C1 may represent a motion vector of a sample of (xc−1, yc+H−1) coordinates. In this case, the encoding device may use at least one of the motion vectors C0 and C1 as a prediction candidate of v2.

In another example, as a method of configuring a prediction candidate for motion vectors of CPs of a PU to which the nL×2N, nR×2N, 2N×nU, or 2N×nD partitioning type is applied, prediction candidates may be limited to a predetermined number so as to be configured.

In another example, in case where the current block is a PU to which the partitioning type nL×2N, nR×2N, 2N×nU, or 2N×nD is applied, the encoding device may configure the prediction candidates of each CP by limiting the number thereof into two. For example, in the case of the motion vector v0 of CP0, the encoding device may use two pieces of motion information, among pieces of motion information of the neighboring blocks (or neighboring samples), as prediction candidates, and the two pieces of motion information may be represented by A0 and A1. In case where a width and a height of the current block are W and H, respectively, and the coordinates of the top-left sample position of the current block is (xp, yp), A0 may represent a motion vector of a sample of (xp−1, yp−1) coordinates and A1 may represent a motion vector of a sample of (xp, yp−1) coordinates. In this case, the encoding device may use A0 and A1 as prediction candidates of v0. That is, the encoding device may include the sample of the (xp−1, yp−1) coordinates and the sample of the (xp, yp−1) coordinates in the neighboring sample group 0, and availability of the sample of the (xp−1, yp−1) coordinates and the sample of the (xp, yp−1) coordinates may be sequentially determined according to first predefined priority order.

Also, in the case of the motion vector v1 of CP1, the encoding device may use two pieces of motion information, among pieces of motion information of the neighboring blocks (or neighboring samples), as prediction candidates, and the two pieces of motion information may be represented by B0 and B1. In case where a width and a height of the current block are W and H, respectively, and the coordinates of the top-left sample position of the current block is (xp, yp), B0 may represent a motion vector of a sample of (xp+W, yp−1) coordinates and B1 may represent a motion vector of a sample of (xp+W−1, yp−1) coordinates. In this case, the encoding device may use B0 and B1 as prediction candidates of v1. That is, the encoding device may include the sample of the (xp+W, yp−1) coordinates and the sample of the (xp+W−1, yp−1) coordinates in the neighboring sample group 1, and availability of the sample of the (xp+W, yp−1) coordinates and the sample of the (xp+W−1, yp−1) coordinates may be sequentially determined according to second predefined priority order.

Also, in the case of the motion vector v2 of CP2, the encoding device may use two pieces of motion information, among pieces of motion information of the neighboring blocks (or neighboring samples), as prediction candidates, and the two pieces of motion information may be represented by C0 and C1. In case where a width and a height of the current block are W and H, respectively, and the coordinates of the top-left sample position of the current block is (xp, yp), C0 may represent a motion vector of a sample of (xp−1, yp+H) coordinates and C1 may represent a motion vector of a sample of (xp−1, yp+H−1) coordinates. In this case, the encoding device may use C0 and C1 as prediction candidates of v2. That is, the encoding device may include the sample of the (xp−1, yp+H) coordinates and the sample of the (xp−1, yp+H−1) coordinates in the neighboring sample group 2, and availability of the sample of the (xp−1, yp+H) coordinates and the sample of the (xp−1, yp+H−1) coordinates may be sequentially determined according to third predefined priority order.

The encoding device derives a sample unit motion vector in the current block based on motion vectors for the CPs (S1920). According to the affine motion model, motion vectors may be different according to each sample coordinate in the current block. If a motion vector of CP0, a motion vector of CP1, and a motion vector of CP2 are known, a motion vector according to a sample position in the current block may be derived. That is, according to the affine motion model, the sample unit motion vector of the sample position may be derived using the motion vectors in the CPs, the motion vector $(v_{x0}, v_{y0})$ of CP0, the motion vector $(v_{x1}, v_{y1})$ of CP1, and the motion vector $(v_{x2}, v_{y2})$ based on distance ratios between the coordinates (x, y) and three control points. In this case, the encoding device may derive the sample unit motion vector of the sample position in the current block based on Equations 2 to 5 described above.

The encoding device generates a prediction sample for the current block based on the sample unit motion vector (S1930). The encoding device may derive a reference region in a reference picture based on the sample unit motion vector and generate a prediction sample of the current block based on the reconstructed sample in the reference region. If a prediction mode for the current block is not a skip mode, the encoding device may generate a residual sample (or residual signal) based on the original sample of original picture and the prediction sample.

The encoding device encodes the prediction mode information for the current block and outputs the encoded information (S1940). The encoding device may encode the prediction mode for the current block and the derived motion vector and output the encoded information in the form of a bit stream. Also, when the CP of a previous block to be decoded has the same position as the CP of the current block, the encoding device may not separately code the motion information on the CP of the current block.

For example, in the case of the motion information for CP0 of the current block, in case where an uppermost block, among left neighboring blocks adjacent to a left boundary of the current block, is decoded based on the affine motion model, a motion vector of CP1 of the corresponding block may be used as a motion vector of CP0 of the current block, and thus, motion information for CP0 may not be separately coded. Also, in case where a leftmost block, among upper neighboring blocks adjacent to an upper boundary of the current block, is decoded based on the affine motion model, a motion vector of CP2 of the corresponding block may be used as a motion vector of CP0 of the current block, and thus, motion information for CP0 may not be separately coded. Also, in case where an upper left neighboring block of the current block is decoded based on the affine motion model, a motion vector of a lower right neighboring sample of the corresponding block derived based on the CPs of the corresponding block may be used as a motion vector of CP0 of the current block, and thus, motion information for CP0 may not be separately coded. In this case, the motion vector of the lower right neighboring sample of the corresponding block may be derived based on the CPs of the corresponding block based on Equations 2 to 5 described above.

For example, in the case of CP1 of the current block, in case where an upper right neighboring block of the current block is decoded based on the affine motion model, a motion vector of CP2 of the corresponding block may be used as a motion vector of CP1 of the current block, and thus, motion information for CP0 may not be separately coded. Also, in case where a rightmost block of the upper neighboring blocks adjacent to the upper boundary of the current block is decoded based on the affine motion model, a motion vector of a lower right neighboring sample of the corresponding block derived based on the CPs of the block may be used as a motion vector of CP1 of the current block, and thus, motion information for CP0 may not be separately coded. In this case, the motion vector of the lower right neighboring samples of the corresponding block may be derived based on the CPs of the corresponding block based on Equations 2 to 5 described above.

For example, in the case of CP2 of the current block, in case where a lower left neighboring block of the current block is decoded based on the affine motion model, a motion vector of CP1 of the corresponding block may be used as a motion vector of CP2 of the current block, and thus, motion information for CP0 may not be separately coded. Also, in case where a lowermost block of left neighboring blocks adjacent to a left boundary of the current block is decoded based on the affine motion model, a motion vector of a lower right neighboring sample of the corresponding block derived based on the CPs of the current block may be used as a motion vector of CP2 of the current block, and thus, motion information for CP0 may not be separately coded.

The bit stream may be transmitted to a decoding device through a network or a storage medium.

Although not shown, the encoding device may encode information on residual samples of the current block and output the same. The information on the residual samples may include transform coefficients relating to the residual samples.

Figure 20:
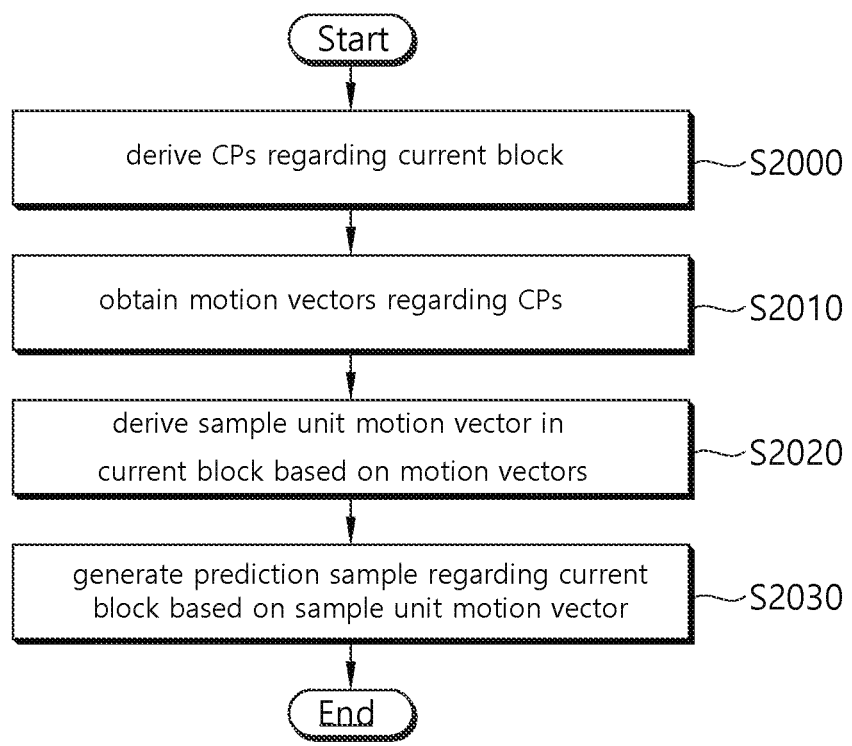
FIG. 20 is a view schematically illustrating a video decoding method by a decoding device according to the present invention.

FIG. 20 schematically illustrates a video decoding method by a decoding device according to the present invention. The method disclosed in FIG. 20 may be performed by the decoding device disclosed in FIG. 2. Specifically, for example, steps S2000 to S2030 of FIG. 20 may be performed by the predicting unit of the decoding device.

The decoding device derives control points (CPs) for the current block (S2000). The decoding device may receive information on inter-prediction of the current block through a bit stream. In case where the affine motion model is applied to the current block, the decoding device may derive CPs to apply the affine motion model. The CPs may be three CPs. For example, in case where the current block is a PU partitioned from a CU based on the partitioning type 2N×2N and a width and a height of the current block are S, the decoding device may derive three CPs in which CP0 is a sample of (0, 0) coordinates, CP1 is a sample of (S, 0) coordinates, and CP2 is a sample of (0, S) coordinates based on coordinates (0, 0) of the top-left sample position of the current block.

Also, in case where the current block is a PU partitioned from a CU based on the partitioning type N×2N and a width and a height of the current block are S/2 and S, respectively, the decoding device may derive three CPs in which CP0 is a sample of (0, 0) coordinates, CP1 is a sample of (S/2, 0) coordinates, and CP2 is a sample of (0, S) coordinates based on the coordinates (0, 0) of the top-left sample position of the current block.

Also, in case where the current block is a PU partitioned from a CU based on the partitioning type 2N×N and a width and a height of the current block are S and S/2, respectively, the decoding device may derive three CPs in which CP0 is a sample of (0, 0) coordinates, CP1 is a sample of (S/2, 0) coordinates, and CP2 is a sample of (0, S/2) coordinates based on the coordinates (0, 0) of the top-left sample position of the current block.

Also, in case where the current block is a PU partitioned from a CU based on the partitioning type nL×2N, nR×2N, 2N×nU, or 2N×nD and a width and a height of the current block are W and H, respectively, the decoding device may derive three CPs in which CP0 is a sample of (0, 0) coordinates, CP1 is a sample of (W, 0) coordinates, and CP2 is a sample of (0, H) coordinates based on the coordinates (0, 0) of the top-left sample position of the current block.

The decoding device Obtains motion vectors for the CPs (S2010).

The decoding device may derive motion vectors of the CPs based on a motion vector for the current block and a motion vector of a neighboring block of the current block. The decoding device may receive motion information of the CPs through a bit stream. In case where a motion vector for a CP which is the same in position as that of a CP of the current block is derived before the current block is decoded, the decoding device may not receive information regarding the CP of the current block. The decoding device may configure adjacent samples of each CP as a neighboring sample group and derive a motion vector of the CP based on the neighboring sample group. The neighboring sample group may be determined based on a partitioning type, a partition ID, and a shape of the current block.

For example, in case where the current block is a PU to which the partitioning type 2N×2N is applied, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are S and coordinates of atop-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the decoding device may use at least one of the motion vectors A0, A1 and A2 as a prediction candidate of v0. That is, the decoding device may derive the motion vector v0 regarding CP0 based on a neighboring sample group 0 including the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are S and coordinates of a top-left sample position of the current block is (xp, yp), B0 may represent a motion vector of a sample of (xp+S, yp−1) coordinates and B1 may represent a motion vector of a sample of (xp+S−1, yp−1) coordinates. In this case, the decoding device may use at least one of the motion vectors B0 and B1 as a prediction candidate of v1. That is, the decoding device may derive the motion vector v1 regarding CP1 based on a neighboring sample group 1 including the sample of the (xp+S, yp−1) coordinates and the sample of the (xp+S−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are S and coordinates of a top-left sample position of the current block is (xp, yp), C0 may represent a motion vector of a sample of (xp−1, yp+S) coordinates and C1 may represent a motion vector of a sample of (xp−1, yp+S−1) coordinates. In this case, the decoding device may use at least one of the motion vectors C0 and C1 as a prediction candidate of v2. That is, the decoding device may derive the motion vector v2 regarding CP2 based on a neighboring sample group 2 including at least one of the sample of the (xp−1, yp+S) coordinates and the sample of the (xp−1, yp+S−1) coordinates.

In another example, in case where the current block is a PU to which the partitioning type 2N×N is applied, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are S and S/2, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the decoding device may use at least one of the motion vectors A0, A1 and A2 as a prediction candidate of v0. That is, the decoding device may derive the motion vector v0 regarding CP0 based on a neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are S and S/2, respectively, and coordinates of a top-left sample position of the current block is (xp, yp), B0 may represent a motion vector of a sample of (xp+S, yp−1) coordinates and B1 may represent a motion vector of a sample of (xp+S−1, yp−1) coordinates. In this case, the decoding device may use at least one of the motion vectors B0 and B1 as a prediction candidate of v1. That is, the decoding device may derive the motion vector v1 regarding CP1 based on a neighboring sample group 1 including at least one of the sample of the (xp+S, yp−1) coordinates and the sample of the (xp+S−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are S and S/2, respectively, and coordinates of a top-left sample position of the current block is (xp, yp), C0 may represent a motion vector of a sample of (xp−1, yp+S/2) coordinates and C1 may represent a motion vector of a sample of (xp−1, yp+S/2−1) coordinates. In this case, the decoding device may use at least one of the motion vectors C0 and C1 as a prediction candidate of v2. That is, the decoding device may derive the motion vector v2 regarding CP2 based on a neighboring sample group 2 including at least one of the sample of the (xp−1, yp+S/2) coordinates and the sample of the (xp−1, yp+S/2−1) coordinates.

In case where a partition ID of the current block is 1, the decoding device may further include samples of neighboring blocks of the current CU as prediction candidates for the motion vector v0 of CP0 and the motion vector v1 of CP1. For example, in the case of the motion vector v0 of CP0, the decoding device may further include motion information of neighboring blocks (i.e., neighboring samples) as a prediction candidate. In detail, the decoding device may further use at least one of three pieces of motion information of neighboring samples as a prediction candidate, and the three pieces of motion information may be represented by A3, A4, and A5, respectively. In ease where a width and a height of the CU including the current block are S and coordinates of the top-left sample position of the CU is (xc, yc), A3 may represent a motion vector of a sample of (xc−1, yc) coordinates, A4 may represent a motion vector of a sample of (xc−1, yc−1) coordinates, and A5 may represent a motion vector of a sample of (xc, yc−1) coordinates. In this case, the decoding device may further use at least one of the motion vectors A3, A4, and A5 as a prediction candidate of v0. That is, the decoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v1 of CP1, the decoding device may further include motion information of neighboring blocks (or neighboring samples) as a prediction candidate. In detail, the decoding device may further use at least one of three pieces of motion information of neighboring samples as a prediction candidate, and the three pieces of motion information may be represented by B2, B3, and B4, respectively. In ease where a width and a height of the CU including the current block are S and coordinates of the top-left sample position of the CU is (xc, yc), B2 may represent a motion vector of a sample of (xc+S, yc) coordinates, B3 may represent a motion vector of a sample of (xc+S, yc−1) coordinates, and B4 may represent a motion vector of a sample of (xc+S−1, yc−1) coordinates. In this case, the decoding device may further use at least one of the motion vectors B2, B3, and B4 as a prediction candidate of v1. That is, the decoding device may further include at least one of the sample of the (xc+S, yc) coordinates, the sample of the (xc+S, yc−1) coordinates, and the sample of the (xc+S−1, yc−1) coordinates in the neighboring sample group 1.

Also, the decoding device may configure the prediction candidates for the motion vectors of the CPs of the current block by limiting the number of prediction candidates to a certain number. In the case of the motion vector v0 of CP0, the decoding device may use two pieces of motion information, among pieces of motion information of the neighboring blocks (or neighboring samples), as prediction candidates, and the two pieces of motion information may be represented by A0 and A1. In case where a width and a height of the current block are S and S/2, respectively, and the coordinates of the top-left sample position of the current block is (xp, yp), A0 may represent a motion vector of a sample of (xp−1, yp−1) coordinates and A1 may represent a motion vector of a sample of (xp, yp−1) coordinates. In this case, the decoding device may use A0 and A1 as prediction candidates of v0. That is, the decoding device may include the sample of the (xp−1, yp−1) coordinates and the sample of the (xp, yp−1) coordinates in the neighboring sample group 0, and availability of the sample of the (xp−1, yp−1) coordinates and the sample of the (xp, yp−1) coordinates may be sequentially determined according to first predefined priority order.

In the case of the motion vector v1 of CP1, the decoding device may use two pieces of motion information, among pieces of motion information of the neighboring blocks (or neighboring samples), as prediction candidates, and the two pieces of motion information may be represented by B0 and B1. In case where a width and a height of the current block are S and S12, respectively, and the coordinates of the top-left sample position of the current block is (xp, yp), B0 may represent a motion vector of a sample of (xp+S, yp−1)

coordinates and B1 may represent a motion vector of a sample of (xp+S−1, yp−1) coordinates. In this case, the decoding device may use B0 and B1 as prediction candidates of v1. That is, the decoding device may include the sample of the (xp+S, yp−1) coordinates and the sample of the (xp+S−1, yp−1) coordinates in the neighboring sample group 1, and availability of the sample of the (xp+S, yp−1) coordinates and the sample of the (xp+S−1, yp−1) coordinates may be sequentially determined according to second predefined priority order.

In the case of the motion vector v2 of CP2, the decoding device may use two pieces of motion information, among pieces of motion information of the neighboring blocks (or neighboring samples), as prediction candidates, and the two pieces of motion information may be represented by C0 and C1. In case where a width and a height of the current block are S and S/2, respectively, and the coordinates of the top-left sample position of the current block is (xp, yp), C0 may represent a motion vector of a sample of (xp−1, yp+S/2) coordinates and C1 may represent a motion vector of a sample of (xp−1, yp+S/2−1) coordinates. In this case, the decoding device may use C0 and C1 as prediction candidates of v2. That is, the decoding device may include the sample of the (xp−1, yp+S/2) coordinates and the sample of the (xp−1, yp+S/2−1) coordinates in the neighboring sample group 2, and availability of the sample of the (xp−1, yp+S/2) coordinates and the sample of the (xp−1, yp+S/2−1) coordinates may be sequentially determined according to third predefined priority order.

In another example, in case where the current block is a PU to which the partitioning type N×2N is applied, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are S/2 and S, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the decoding device may use at least one of the motion vectors A0, A1 and A2 as a prediction candidate of v0. That is, the decoding device may derive the motion vector v0 regarding CP0 based on a neighboring sample group 0 including the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are S/2 and S, respectively, and coordinates of a top-left sample position of the current block is (xp, yp), B0 may represent a motion vector of a sample of (xp+S/2, yp−1) coordinates and B1 may represent a motion vector of a sample of (xp+S/2−1, yp−1) coordinates. In this case, the decoding device may use at least one of the motion vectors B0 and B1 as a prediction candidate of v1. Also, in case where a partition ID of the current block is 0, the decoding device may further include at least one of the motion vector B2 of the sample of the (xp+S/2+1, yp−1) coordinates and the motion vector B3 of the sample of the (xp+S/2+2, yp−1) coordinates as a prediction candidate of v1. That is, the decoding device may derive the motion vector v1 regarding CP1 based on the neighboring sample group 1 including the sample of the (xp+S/2, yp−1) coordinates and the sample of the (xp+S/2−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are S/2 and S, respectively, and coordinates of atop-left sample position of the current block is (xp, yp), C0 may represent a motion vector of a sample of (xp−1, yp+S) coordinates and C1 may represent a motion vector of a sample of (xp−1, yp+S−1) coordinates. In this case, the decoding device may use at least one of the motion vectors C0 and C1 as a prediction candidate of v2. That is, the decoding device may derive the motion vector v2 regarding CP2 based on the neighboring sample group 2 including the sample of the (xp−1, yp+S) coordinates and the sample of the (xp−1, yp+S−1) coordinates.

In case where a partition ID of the current block is 1, the decoding device may further include samples of neighboring blocks of the current CU as prediction candidates for the motion vector v0 of CP0 and the motion vector v2 of CP2. For example, in the case of the motion vector v0 of CP0, the decoding device may further include motion information of neighboring blocks (i.e., neighboring samples) as a prediction candidate. In detail, the decoding device may further use at least one of three pieces of motion information of neighboring samples as a prediction candidate, and the three pieces of motion information may be represented by A3, A4, and A5, respectively. In case where a width and a height of the CU including the current block are S and coordinates of the top-left sample position of the CU is (xc, yc), A3 may represent a motion vector of a sample of (xc−1, yc−1) coordinates, A4 may represent a motion vector of a sample of (xc, yc−1) coordinates, and A5 may represent a motion vector of a sample of (xc−1, yc) coordinates. In this case, the decoding device may further use at least one of the motion vectors A3, A4, and A5 as a prediction candidate of v0. That is, the decoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v2 of CP2, the decoding device may further include motion information of neighboring blocks (or neighboring samples) as a prediction candidate. In detail, the decoding device may further use at least one of three pieces of motion information of neighboring samples as a prediction candidate, and the three pieces of motion information may be represented by C3, and C4, respectively. In case where a width and a height of the CU including the current block are S and coordinates of the top-left sample position of the CU is (xc, ye), C2 may represent a motion vector of a sample of (xc−1, yc+S) coordinates, C3 may represent a motion vector of a sample of (xc, yc+S) coordinates, and C4 may represent a motion vector of a sample of (xc−1, yc+S−1) coordinates. In this case, the decoding device may further use at least one of the motion vectors C2, C3, and C4 as a prediction candidate of v2. That is, the decoding device may further include at least one of the sample of the (xc−1, yc+S) coordinates, the sample of the (xc, yc+S) coordinates, and the sample of the (xc−1, yc+S−1) coordinates in the neighboring sample group 2.

Also, the decoding device may configure the prediction candidates for the motion vectors of the CPs of the current block by limiting the number of prediction candidates to a certain number. In the case of the motion vector v0 of CP0, the decoding device may use two pieces of motion information, among pieces of motion information of the neighboring blocks (or neighboring samples), as prediction candidates, and the two pieces of motion information may be represented by A0 and A1. In case where a width and a height of the current block are S/2 and S, respectively, and the coordinates of the top-left sample position of the current block is (xp, yp), A0 may represent a motion vector of a sample of (xp−1, yp−1) coordinates and A1 may represent a motion vector of a sample of (xp, yp−1) coordinates. In this case, the decoding device may use A0 and A1 as prediction candidates of v0. That is, the decoding device may include the sample of the (xp−1, yp−1) coordinates and the sample of the (xp, yp−1) coordinates in the neighboring sample group 0, and availability of the sample of the (xp−1, yp−1) coordinates and the sample of the (xp, yp−1) coordinates may be sequentially determined according to first predefined priority order.

In the case of the motion vector v1 of CP1, the decoding device may use two pieces of motion information, among pieces of motion information of the neighboring blocks neighboring samples), as prediction candidates, and the two pieces of motion information may be represented by B0 and B1. In case where a width and a height of the current block are S/2 and S, respectively, and the coordinates of the top-left sample position of the current block is (xp, yp), B0 may represent a motion vector of a sample of (xp+S/2, yp−1) coordinates and B1 may represent a motion vector of a sample of (xp+S/2−1, yp−1) coordinates. In this case, the decoding device may use B0 and B1 as prediction candidates of v1. That is, the decoding device may include the sample of the (xp+S/2, yp−1) coordinates and the sample of the (xp+S/2−1, yp−1) coordinates in the neighboring sample group 1, and availability of the sample of the (xp+S/2, yp−1) coordinates and the sample of the (xp+S/2−1, yp−1) coordinates may be sequentially determined according to second predefined priority order.

Also, in the case of the motion vector v2 of CP2, the decoding device may use two pieces of motion information, among pieces of motion information of the neighboring blocks (or neighboring samples), as prediction candidates, and the two pieces of motion information may be represented by C0 and C1. In case where a width and a height of the current block are S/2 and S, respectively, and the coordinates of the top-left sample position of the current block is (xp, yp), C0 may represent a motion vector of a sample of (xp−1, yp+S) coordinates and C1 may represent a motion vector of a sample of (xp−1, yp+S−1) coordinates. In this case, the decoding device may use C0 and C1 as prediction candidates of v2. That is, the decoding device may include the sample of the (xp−1, yp+S) coordinates and the sample of the (xp−1, yp+S−1) coordinates in the neighboring sample group 2, and availability of the sample of the (xp−1, yp+S/2) coordinates and the sample of the (xp−1, yp+S/2−1) coordinates may be sequentially determined according to third predefined priority order.

In another example, in case where the current block is a PU to which the partitioning type nL×2N is applied, for example, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the decoding device may use at least one of the motion vectors A0, A1 and A2 as a prediction candidate of v0. That is, the decoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the decoding device may use at least one of the motion vectors B0 and B1 as a prediction candidate of v1. That is, the decoding device may derive the motion vector v1 regarding CP1 based on the neighboring sample group 1 including the sample of the (xp+W, yp−1) coordinates and the sample of the (xp+W−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the decoding device may use at least one of the motion vectors C0 and C1 as a prediction candidate of v2. That is, the decoding device may derive the motion vector v2 regarding CP2 based on the neighboring sample group 2 including the sample of the (xp−1, yp+H) coordinates and the sample of the (xp−1, yp+H−1) coordinates.

Also, in case where a partition ID of the current block is 1, the decoding device may further include samples of neighboring blocks of the current CU as prediction candidates for the motion vector v0 of CP0 and the motion vector v2 of CP2. For example, in the case of the motion vector v0 of CP0, the decoding device may further include motion information of neighboring blocks (i.e., neighboring samples) as a prediction candidate. In detail, the decoding device may further use at least one of two pieces of motion information of neighboring samples as a prediction candidate, and the two pieces of motion information may be represented by A3 and A4, respectively. In case where a width and a height of the CU including the current block are H and coordinates of the top-left sample position of the CU is (xc, yc), A3 may represent a motion vector of a sample of (xc−1, yc−1) coordinates and A4 may represent a motion vector of a sample of (xc−1, yc) coordinates. In this case, the decoding device may further use at least one of the motion vectors A3 and A4 as a prediction candidate of v0. That is, the decoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v2 of CP2, the decoding device may further include motion information of neighboring blocks (i.e., neighboring samples) as a prediction candidate. In detail, the decoding device may further use at least one of two pieces of motion information of neighboring samples as a prediction candidate, and the two pieces of motion information may be represented by C2 and C3, respectively. In case where a width and a height of the CU including the current block are H and coordinates of the top-left sample position of the CU is (xc, yc), C2 may represent a motion vector of a sample of (xc−1, yc+H) coordinates and C3 may represent a motion vector of a sample of (xc−1, yc+H−1) coordinates. In this case, the decoding device may further use at least one of the motion vectors C2 and C3 as a prediction candidate of v2. That is, the decoding device may further include at least one of the sample of the (xc−1, yc+H) coordinates and the sample of the (xc−1, yc+H−1) coordinates in the neighboring sample group 2.

In another example, in case where the current block is a PU to which the partitioning type nR×2N is applied, for example, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, vp), A0 may represent a motion vector of a sample of (xp−1, yp−1) coordinates, A1 may represent a motion vector of a sample of (xp, yp−1) coordinates, and A2 may represent a motion vector of a sample of (xp−1, vp) coordinates. In this case, the decoding device may use at least one of the motion vectors A0, A1 and A2 as a prediction candidate of v0. That is, the decoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the decoding device may use at least one of the motion vectors B0 and B1 as a prediction candidate of v1. That is, the decoding device may derive the motion vector v1 regarding CP1 based on the neighboring sample group 1 including the sample of the (xp+W, yp−1) coordinates and the sample of the (xp+W−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the decoding device may use at least one of the motion vectors C0 and C1 as a prediction candidate of v2. That is, the decoding device may derive the motion vector v2 regarding CP2 based on the neighboring sample group 2 including the sample of the (xp−1, yp+H) coordinates and the sample of the (xp−1, yp+H−1) coordinates.

Also, in case where a partition ID of the current block is 1, the decoding device may further include samples of neighboring blocks of the current CU as prediction candidates for the motion vector v0 of CP0 and the motion vector v2 of CP2. For example, in the case of the motion vector v0 of CP0, the decoding device may further include motion information of neighboring blocks (i.e., neighboring samples) as a prediction candidate. In detail, the decoding device may further use at least one of three pieces of motion information of neighboring samples as a prediction candidate, and the three pieces of motion information may be represented by A3, A4, and A5, respectively. In case where a width and a height of the CU including the current block are H and coordinates of the top-left sample position of the CU is (xc, yc), A3 may represent a motion vector of a sample of (xc−1, yc−1) coordinates, A4 may represent a motion vector of a sample of (xc, yc−1) coordinates, and A5 may represent a motion vector of a sample of (xc−1, yc) coordinates. In this case, the decoding device may further use at least one of the motion vectors A3, A4, and A5 as a prediction candidate of v0. That is, the decoding device may further include at least one of the sample of the (xc−1, yc−1) coordinates, the sample of the (xc−1, yc) coordinates, and the sample of the (xc, yc−1) coordinates in the neighboring sample group 0.

Also, in the case of the motion vector v2 of CP2, the decoding device may further include motion information of neighboring blocks (i.e., neighboring samples) as a prediction candidate. In detail, the decoding device may further use at least one of three pieces of motion information of neighboring samples as a prediction candidate, and the three pieces of motion information may be represented by C2, C3, and C4, respectively. In case where a width and a height of the CU including the current block are H and coordinates of the top-left sample position of the CU is (xc, yc), C2 may represent a motion vector of a sample of (xc−1, yc+H) coordinates, C3 may represent a motion vector of a sample of (xc, yc+H) coordinates, and C4 may represent a motion vector of a sample of (xc−1, yc+H) coordinates. In this case, the decoding device may further use at least one of the motion vectors C2, C3, and C4 as a prediction candidate of v2. That is, the decoding device may further include at least one of the sample of the (xc−1, yc+H) coordinates, the sample of the (xc, yc+H) coordinates, and the sample of the (xc−1, yc+H−1) coordinates in the neighboring sample group 2.

In another example, in case where the current block is a PU to which the partitioning type 2N×nU is applied, for example, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the decoding device may use at least one of the motion vectors A0, A1 and A2 as a prediction candidate of v0. That is, the decoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the decoding device may use at least one of the motion vectors B0 and B1 as a prediction candidate of v1. That is, the decoding device may derive the motion vector v1 regarding CP1 based on the neighboring sample group 1 including at least one of the sample of the (xp+W, yp−1) coordinates and the sample of the (xp+W−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the decoding device may use at least one of the motion vectors C0 and C1 as a prediction candidate of v2. That is, the decoding device may derive the motion vector v2 regarding CP2 based on the neighboring sample group 2 including at least one of the sample of the (xp−1, yp+H) coordinates and the sample of the (xp−1, coordinates.

Also, in case where a partition ID of the current block is 1, the decoding device may further include samples of neighboring blocks of the current CU as prediction candidates for the motion vector v0 of CP0 and the motion vector v1 of CP1 For example, in the case of the motion vector v0 of CP0, the decoding device may further include motion information of neighboring blocks (i.e., neighboring samples) as a prediction candidate. In detail, the decoding device may further use at least one of two pieces of motion information of neighboring samples as a prediction candidate, and the two pieces of motion information may be represented by A3 and A4, respectively. In case where a width and a height of the CU including the current block are W and coordinates of the top-left sample position of the CU is (xc, yc), A3 may represent a motion vector of a sample of (xc−1, yc−1) coordinates and A4 may represent a motion vector of a sample of (xc, yc−1) coordinates. In this case, the decoding device may further use at least one of the motion vectors A3 and 44 as a prediction candidate of v0. That is, the decoding device may further include at least one of the sample of the (xc−1, yc−1) coordinates and the sample of the (xc, yc−1) coordinates in the neighboring sample group 0.

Also, in the case of the motion vector v1 of CP1, the decoding device may further include motion information of neighboring blocks (i.e., neighboring samples) as a prediction candidate. In detail, the decoding device may further use at least one of two pieces of motion information of neighboring samples as a prediction candidate, and the two pieces of motion information may be represented by B2 and B3, respectively. In case where a width and a height of the CU including the current block are W and coordinates of the top-left sample position of the CU is (xc, yc), B2 may represent a motion vector of a sample of (xc+W, yc−1) coordinates and B3 may represent a motion vector of a sample of (xc+W−1, yc−1) coordinates. In this case, the decoding device may further use at least one of the motion vectors B2 and B3 as a prediction candidate of v1. That is, the decoding device may further include at least one of the sample of the (xc+W, yc−1) coordinates and the sample of the (xc+W−1, yc−1) coordinates in the neighboring sample group 1.

In another example, in case where the current block is a PU to which the partitioning type 2N×nD is applied, for example, in the case of the motion vector v0 of CP0, the decoding device may use three pieces of motion information, among pieces of motion information of neighboring blocks (or neighboring samples), as prediction candidates, and the three pieces of motion information may be represented by A0, A1, and A2, respectively. In case where a width and a height of the current block are W and H, respectively, and coordinates of a top-left sample position of the current block is (xp, yp), A0 may represent a motion vector of a sample of (xp−1, yp−1) coordinates, A1 may represent a motion vector of a sample of (xp, yp−1) coordinates, and A2 may represent a motion vector of a sample of (xp−1, yp) coordinates. In this case, the decoding device may use at least one of the motion vectors A0, A1 and A2 as a prediction candidate of v0. That is, the decoding device may derive the motion vector v0 regarding CP0 based on the neighboring sample group 0 including at least one of the sample of the (xp−1, yp−1) coordinates, the sample of the (xp, yp−1) coordinates, and the sample of the (xp−1, yp) coordinates.

Also, in the case of the motion vector v1 of CP1, the decoding device may use two pieces of motion information, among pieces of motion information of neighboring blocks (or neighboring samples), as prediction candidates, and the two pieces of motion information may be represented by B0 and B1. In case where a width and a height of the current block are W and H, respectively, and coordinates of a top-left sample position of the current block is (xp, yp), B0 may represent a motion vector of a sample of (xp+W, yp−1) coordinates and B1 may represent a motion vector of a sample of (xp+W−1, yp−1) coordinates. In this case, the decoding device may use at least one of the motion vectors B0 and B1 as a prediction candidate of v1. That is, the decoding device may derive the motion vector v1 regarding CP1 based on the neighboring sample group 1 including at least one of the sample of the (xp+W, yp−1) coordinates and the sample of the (xp+W−1, yp−1) coordinates.

Also, in the case of the motion vector v2 of CP2, the decoding device may use two pieces of motion information, among pieces of motion information of neighboring blocks (or neighboring samples), as prediction candidates, and the two pieces of motion information may be represented by C0 and C1. In case where a width and a height of the current block are W and H, respectively, and coordinates of a top-left sample position of the current block is (xp, yp), C0 may represent a motion vector of a sample of (xp−1, yp+H) coordinates and C1 may represent a motion vector of a sample of (xp−1, yp+H−1) coordinates. In this case, the decoding device may use at least one of the motion vectors C0 and C1 as a prediction candidate of v2. That is, the decoding device may derive the motion vector v2 regarding CP2 based on the neighboring sample group 2 including at least one of the sample of the (xp−1, yp+H) coordinates and the sample of the (xp−1, yp+H−1) coordinates.

Also, in case where a partition ID of the current block is 1, the decoding device may further include samples of neighboring blocks of the current CU as prediction candidates for the motion vector v0 of CP0 and the motion vector v1 of CP1. For example, in the case of the motion vector v0 of CP0, the decoding device may further include motion information of neighboring blocks (i.e., neighboring samples) as a prediction candidate. In detail, the decoding device may further use at least one of three pieces of motion information of neighboring samples as a prediction candidate, and the three pieces of motion information may be represented by A3, A4, and A5, respectively. In case where a width and a height of the CU including the current block are W and coordinates of the top-left sample position of the CU is (xc, yc), A3 may represent a motion vector of a sample of (xc−1, yc) coordinates, A4 may represent a motion vector of a sample of (xc−1, yc−1) coordinates, and A5 may represent a motion vector of a sample of (xc, yc−1) coordinates. In this case, the decoding device may further use at least one of the motion vectors A3, A4, and A5 as a prediction candidate of v0. That is, the decoding device may further include at least one of the sample of the xc−1, yc−1) coordinates, the sample of the (xc−1, ye coordinates, and the sample of the (xc, yc−1) coordinates in the neighboring sample group 0.

Also, in the case of the motion vector v1 of CP1, the decoding device may further include motion information of neighboring blocks (i.e., neighboring samples) as a prediction candidate. In detail, the decoding device may further use at least one of three pieces of motion information of neighboring samples as a prediction candidate, and the three pieces of motion information may be represented by B2, B3, and B4, respectively. In case where a width and a height of the CU including the current block are W and coordinates of the top-left sample position of the CU is (xc, yc), B2 may represent a motion vector of a sample of (xc+W, yc) coordinates, B3 may represent a motion vector of a sample of (xc+W yc−1) candidates, and B4 may represent a motion vector of a sample of (xc+W−1, yc−1) coordinates. In this case, the decoding device may further use at least one of the motion vectors B2, B3, and B4 as a prediction candidate of v1. That is, the decoding device may further include at least one of the sample of the (xc+W, yc) coordinates, the sample of the (xc+W, yc−1) coordinates, and the sample of the (xc+W−1, yc−1) coordinates in the neighboring sample group 1.

In another example, the decoding device may use the same prediction candidates of PUs included in the CU may use the same prediction candidates of the PUs in the CU as prediction candidates for the motion vectors of the CPs, regardless of partition ID. For example, in the case of the motion vector v0 of CP0 of the current block, the decoding device may use three pieces of motion information, among pieces of motion information of neighboring blocks (i.e., neighboring blocks or neighboring samples of the current CU), as prediction candidates, and the three pieces of motion information may be represented by A0, A1, and A2, respectively. In case where a width and a height of the CU are W and H, respectively, and coordinates of the top-left sample position of the CU is (xc, yc), A0 may represent a motion vector of a sample of (xc−1, yc−1) coordinates, A1 may represent a motion vector of a sample of (xc, yc−1) coordinates, and A2 may represent a motion vector of a sample of (xc−1, yc) coordinates. In this case, the decoding device may use at least one of the motion vectors A0, A1 and A2 as a prediction candidate of v0.

Also, in the case of the motion vector v1 of CP1 of the current block, the decoding device may use two pieces of motion information, among pieces of motion information of neighboring blocks (or neighboring samples), as prediction candidates, and the two pieces of motion information may be represented by B0 and B1. In case where a width and a height of the CU are W and coordinates of the top-left sample position of the CU is (xc, yc), B0 may represent a motion vector of a sample of (xc+W, yc−1) coordinates and B1 may represent a motion vector of a sample of (xc+W−1, yc−1) coordinates. In this case, the decoding device may use at least one of the motion vectors B0 and B1 as a prediction candidate of v1.

Also, in the case of the motion vector v2 of CP2 of the current block, the decoding device may use two pieces of motion information, among pieces of the motion information of the neighboring blocks (or neighboring samples), as prediction candidates, and the two pieces of motion information may be represented by C0 and C1, respectively. In case where a width and a height of the CU are W and coordinates of the top-left sample position of the CU is (xc, yc), C0 may represent a motion vector of a sample of (xc−1, yc+H) coordinates and C1 may represent a motion vector of a sample of (xc−1, yc+H−1) coordinates. In this case, the decoding device may use at least one of the motion vectors C0 and C1 as a prediction candidate of v2.

In another example, as a method of configuring a prediction candidate for motion vectors of CPs of a PU to which the nL×2N, nR×2N, 2N×nU, or 2N×nD partitioning type is applied, prediction candidates may be limited to a predetermined number so as to be configured.

In another example, in case where the current block is a PU to which the partitioning type nL×2N, nR×2N, 2N×nU, or 2N×nD is applied, the decoding device may configure the prediction candidates of each CP by limiting the number thereof into two. For example, in the case of the motion vector v0 of CP0, the decoding device may use two pieces of motion information, among pieces of motion information of the neighboring blocks (or neighboring samples), as prediction candidates, and the two pieces of motion information may be represented by A0 and A1. In case where a width and a height of the current block are W and H, respectively, and the coordinates of the top-left sample position of the current block is (xp, yp), A0 may represent a motion vector of a sample of (xp−1, yp−1) coordinates and A1 may represent a motion vector of a sample of (xp, yp−1) coordinates. In this case, the decoding device may use A0 and A1 as prediction candidates of v0. That is, the decoding device may include the sample of the (xp−1, yp−1) coordinates and the sample of the (xp, yp−1) coordinates in the neighboring sample group 0, and availability of the sample of the (xp−1, yp−1) coordinates and the sample of the (xp, yp−1) coordinates may be sequentially determined according to first predefined priority order.

Also, in the case of the motion vector v1 of CP1, the decoding device may use two pieces of motion information, among pieces of motion information of the neighboring blocks (or neighboring samples), as prediction candidates, and the two pieces of motion information may be represented by B0 and B1. In case where a width and a height of the current block are W and H, respectively, and the coordinates of the top-left sample position of the current block is (xp, yp), B0 may represent a motion vector of a sample of (xp+W, yp−1) coordinates and B1 may represent a motion vector of a sample of (xp+W, yp−1) coordinates. In this case, the decoding device may use B0 and B1 as prediction candidates of v1. That is, the decoding device may include the sample of the (xp+W, yp−1) coordinates and the sample of the (xp+W−1, yp−1) coordinates in the neighboring sample group 1, and availability of the sample of the (xp+W, yp−1) coordinates and the sample of the (xp+W−1, yp−1) coordinates may be sequentially determined according to second predefined priority order.

Also, in the case of the motion vector v2 of CP2, the decoding device may use two pieces of motion information, among pieces of motion information of the neighboring blocks (or neighboring samples), as prediction candidates, and the two pieces of motion information may be represented by C0 and C1. In case where a width and a height of the current block are W and H, respectively, and the coordinates of the top-left sample position of the current block is (xp, yp), C0 may represent a motion vector of a sample of (xp−1, yp+H) coordinates and C1 may represent a motion vector of a sample of (xp−1, yp+H−1) coordinates. In this case, the decoding device may use C0 and C1 as prediction candidates of v2. That is, the decoding device may include the sample of the (xp−1, yp+H) coordinates and the sample of the (xp−1, yp+H) coordinates in the neighboring sample group 2, and availability of the sample of the (xp−1, yp+H) coordinates and the sample of the (xp−1, yp+H−1) coordinates may be sequentially determined according to third predefined priority order.

In addition, the decoding device may derive the motion vectors of the CPs of the current PU based on the motion vectors derived in the previous decoding process, without receiving additional motion information.

For example, in the case of CP0, in case where an uppermost block, among left neighboring blocks adjacent to a left boundary of the current block, is decoded based on the affine motion model, a motion vector of CP0 of the current block may be derived based on a motion vector of CP1 of the corresponding block. Also, in case where a leftmost block, among upper neighboring blocks adjacent to an upper boundary of the current block, is decoded based on the affine motion model, a motion vector of CP0 of the current block may be derived based on a motion vector of CP2 of the corresponding block. Also, in case where an upper left neighboring block of the current block is decoded based on the affine motion model, a motion vector of CP0 of the current block may be derived based on a motion vector of a lower right neighboring sample of the corresponding block derived based on the CPs of the corresponding block. In this case, the motion vector of the lower right neighboring sample of the corresponding block may be derived based on the CPs of the corresponding block based on Equations 2 to 5 described above.

For example, in the case of CP1, in case where an upper right neighboring block of the current block is decoded based on the affine motion model, a motion vector of CP1 of the current block may be derived based on a motion vector of CP2 of the corresponding block. In case where a rightmost block of the upper neighboring blocks adjacent to the upper boundary of the current block is decoded based on the affine motion model, a motion vector of CP1 of the current block may be derived based on a motion vector of a lower right neighboring sample of the corresponding block derived based on the CPs of the block. In this case, the motion vector of the lower right neighboring samples of the corresponding block may be derived based on the CPs of the corresponding block based on Equations 2 to 5 described above.

For example, in the case of CP2, in case where a lower left neighboring block of the current block is decoded based on the affine motion model, a motion vector of CP2 of the current block may be derived based on a motion vector of CP1 of the corresponding block. Also, in case where a lowermost block of left neighboring blocks adjacent to a left boundary of the current block is decoded based on the affine motion model, a motion vector of CP2 of the current block may be derived based on a motion vector of a lower right neighboring sample of the corresponding block derived based on the CPs of the current block. In this case, the motion vector of the lower right neighboring sample of the corresponding block may be derived based on the CPs of the corresponding block based on Equations 2 to 5 described above.

The decoding device derives a sample unit motion vector in the current block based on the Obtained motion vectors (S2020). Based on the motion vector of CP0, the motion vector of CP1, and the motion vector of CP2, the decoding device may derive a sample unit motion vector according to a sample position in the current block. In this case, the decoding device may derive the sample unit motion vector at the sample position in the current block based on Equations 2 to 5.

The decoding device derives a prediction sample for the current block based on the sample unit motion vector (S2030). The decoding device may derive a reference region in a reference picture based on the sample unit motion vector and generate a prediction sample of the current block based on the reconstructed sample in a reference region.

The decoding device may generate a reconstructed sample based on the prediction sample. If a prediction mode for the current block is not a skip mode, the decoding device may acquire a residual signal from a bit stream received from the encoding device and generate a residual sample for the current block. In this case, the decoding device may generate the reconstructed sample based on the prediction sample and the residual sample. The decoding device may generate a reconstructed picture based on the reconstructed sample.

According to the present invention described above, more accurate sample unit motion vectors for the current block may be derived and inter prediction efficiency may significantly be increased.

Also, according to the present invention, a motion vector for samples of a current block may be efficiently derived based on motion vectors of control points for the current block.

Also, according to the present invention, motion vectors of control points for a current block may be derived based on motion vectors of control points of a previously decoded neighboring block, without additionally transmitting information regarding the motion vectors of the control points for the current block. Accordingly, an amount of data for the motion vectors of the control points may be eliminated or reduced, and overall coding efficiency may be improved.

In addition, according to the present invention, inter-prediction may be effectively performed through sample unit motion vectors even in case where an image of the current block is rotated, zoomed in, zoomed out, or deformed in parallelogram, as well as in case where the image of the current block is plane-shifted. Accordingly, an amount of data for the residual signal for the current block may be eliminated or reduced and overall coding efficiency may be improved.

In the above-described embodiments, methods are described on the basis of a flowchart using a series of steps or blocks, but the present invention is not limited to the sequence of steps. Some steps may occur simultaneously or in a different sequence than the steps described above. Further, those skilled in the art will understand that the steps illustrated in the sequence diagram are not exclusive, that other steps may be included, or that one or more steps in the flowchart may be deleted without affecting the scope of the present invention.

The method according to the present invention described above may be implemented in software. The encoding device and/or decoding device according to the present invention may be included in a device that performs image processing, for example, for a TV, a computer, a smart phone, a set-top box, or a display device.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding device, the video decoding method comprising:
    deriving motion vectors for control points (CPs) for a current block;
    deriving a motion vector for the current block based on the obtained motion vectors for the CPs;
    performing a prediction for the current block based on the motion vector for the current block; and
    generating a reconstructed block for the current block based on a result of the prediction for the current block,
    wherein the CPs includes a first CP, a second CP and a third CP, wherein the first CP is for a top-left corner of the current block, the second CP is for a top-right corner of the current block and the third CP is for bottom-left corner of the current block,
    wherein the motion vectors for the CPs include a first motion vector for the first CP, a second motion vector for the second CP and a third motion vector for the third CP,
    wherein the first motion vector is derived based on a firstly-checked available block according to a first predefined priority order in a first block group,
    wherein the first block group comprises a top-left corner neighboring block of the current block, a first top neighboring block which is leftmost block among blocks adjacent to an upper side of the current block and a first left neighboring block which is an uppermost block among blocks adjacent to a left side of the current block,
    wherein the second motion vector is derived based on a firstly-checked available block according to a second predefined priority order in a second block group,
    wherein the second block group comprises a top-right corner neighboring block of the current block and a second top neighboring block which is a rightmost block among the blocks adjacent to the upper side of the current block,
    wherein the third motion vector is derived based on a firstly-checked available block according to a third predefined priority order in a third block group, and
    wherein the third block group comprises a bottom-left corner neighboring block of the current block and a second left neighboring block which is a lowermost block among the blocks adjacent to the left side of the current block.

2. The video decoding method of claim 1, wherein the motion vector related to a sample position for the current block is derived based on the following equations, $$Vx=(Vx1-Vx0)*x/W+(Vx2-Vx0)*y/H+Vx0, Vy=(Vy1-Vy0)*x/W+(Vy2-Vy0)*y/H+Vy0, \text{ and}$$

wherein the Vx represents a x component of the motion vector related to the sample position at a coordinate of (x, y), the Vy represents a y component of the motion vector related to the sample position at the coordinate of (x, y), the Vx0 represents a x component of the first motion vector for the first CP, the Vy0 represents a y component of the first motion vector for the second CP, the Vx1 represents a x component of the second motion vector for the second CP, the Vy1 represents a y component of the second motion vector for the second CP, the Vx2 represents a x component of the third motion vector for the third CP, the Vy2 represents a y component of the third motion vector for the third CP, and W and H are a width and a height of the current block respectively.

3. The video decoding method of claim 1, wherein:
    the top-left corner neighboring block is located on the coordinate of (xc−1, yc−1), the first top neighboring block is located on the coordinate of (xc, yc−1), and the first left neighboring block is located on the coordinate of (xc−1, yc),
    the top-right corner neighboring block is located on the coordinate of (xc+W, yc−1) and the second top neighboring block is located on the coordinate of (xc+W−1, yc−1), and
    the bottom-left corner neighboring block is located on the coordinate of (xc−1, yc+H) and the second left neighboring block is located on the coordinate of (xc−1, yc+H−1), and
    wherein (xc, yc) is a top-left sample position of the current block, and W and H are a width and a height of the current block respectively.

4. The video decoding method of claim 1,
    wherein the third motion vector for the third CP is derived from the third block group comprising the bottom-left corner neighboring block and the second left neighboring block based on a third predefined priority order,
    wherein the first predefined priority order is from the top-left corner neighboring block to the first top neighboring block to the first left neighboring block,
    wherein the second predefined priority order is from the top-right corner neighboring block to the second top neighboring block, and
    wherein the third predefined priority order is from the bottom-left corner neighboring bock to the second left neighboring block.

5. The video decoding method of claim 1,
    wherein the second CP is located on a coordinate of (xc+W, yc) and the third CP is located on a coordinate of (xc, yc+W/2), and wherein (xc, yc) is a top-left sample position of the current block, and W and H are a width and a height of the current block respectively.

6. The video decoding method of claim 1, wherein:
the motion vector related to a sample position for the current block is derived based on the following equations, $$Vx=(Vx1-Vx0)*x/W+(Vx2-Vx0)*y/(W/2)+Vx0,$$

wherein the Vx represents a x component of the motion vector related to the sample position at a coordinate of (x, y), the Vy represents a y component of the motion vector related to the sample position at the coordinate of (x, y), the Vx0 represents a x component of the first motion vector for the first CP, the Vy0 represents a y component of the first motion vector for the first CP, the Vx1 represents a x component of the second motion vector for the second CP, the Vy1 represents a y component of the second motion vector 1 for the second CP, the Vx2 represents a x component of the third motion vector for the third CP, the Vy2 represents a y component of the third motion vector for the third CP, and W and H are a width and a height of the current block respectively.

7. The video decoding method of claim 1, wherein:
the top-left corner neighboring block is located on the coordinate of (xc−1, yc−1), the first top neighboring block is located on the coordinate of (xc, yc−1), and the first left neighboring block is located on the coordinate of (xc−1, yc),
the top-right corner neighboring block is located on the coordinate of (xc+W, yc−1) and the second top neighboring block is located on the coordinate of (xc+W−1, yc−1), and
the bottom-left corner neighboring block is located on a coordinate of (xc−1, yc+W/2) and the second left neighboring block is located on a coordinate of (xc−1, yc+W/2−1).

8. A video encoding method performed by an encoding device, the video encoding method including:
deriving motion vectors for control points (CPs) for a current block;
deriving a motion vector for the current block based on the obtained motion vectors for the CPs;
performing a prediction for the current block based on the motion vector for the current block; and
encoding video information including information on the prediction for the current block,
wherein the CPs includes a first CP, a second CP and a third CP, wherein the first CP is for a top-left corner of the current block, the second CP is for a top-right corner of the current block and the third CP is for bottom-left corner of the current block,
wherein the motion vectors for the CPs include a first motion vector for the first CP, a second motion vector for the second CP and a third motion vector for the third CP,
wherein the first motion vector is derived based on a firstly-checked available block according to a first predefined priority order in a first block group,
wherein the first block group comprises a top-left corner neighboring block of the current block, a first top neighboring block which is leftmost block among blocks adjacent to an upper side of the current block and a first left neighboring block which is an uppermost block among blocks adjacent to a left side of the current block, wherein the second motion vector is derived based on a firstly-checked available block according to a second predefined priority order in a second block group,
wherein the second block group comprises a top-right corner neighboring block of the current block and a second top neighboring block which is a rightmost block among the blocks adjacent to the upper side of the current block,
wherein the third motion vector is derived based on a firstly-checked available block according to a third predefined priority order in a third block group, and
wherein the third block group comprises a bottom-left corner neighboring block of the current block and a second left neighboring block which is a lowermost block among the blocks adjacent to the left side of the current block.

9. The video encoding method of claim 8, wherein the motion vector related to a sample position for the current block is derived based on the following equations, $$Vx=(Vx1-Vx0)*x/W+(Vx2-Vx0)*y/H+Vx0, Vy=(Vy1-Vy0)*x/W+(Vy2-Vy0)*y/H+Vy0, \text{ and}$$

wherein the Vx represents a x component of the motion vector related to the sample position at a coordinate of (x, y), the Vy represents a y component of the motion vector related to the sample position at the coordinate of (x, y), the Vx0 represents a x component of the first motion vector for the first CP, the Vy0 represents a y component of the first motion vector for the second CP, the Vx1 represents a x component of the second motion vector for the second CP, the Vy1 represents a y component of the second motion vector for the second CP, the Vx2 represents a x component of the third motion vector for the third CP, the Vy2 represents a y component of the third motion vector for the third CP, and W and H are a width and a height of the current block respectively.

10. The video encoding method of claim 8, wherein:
the top-left corner neighboring block is located on the coordinate of (xc−1, yc−1), the first top neighboring block is located on the coordinate of (xc, yc−1), and the first left neighboring block is located on the coordinate of (xc−1, yc),
the top-right corner neighboring block is located on the coordinate of (xc+W, yc−1) and the second top neighboring block is located on the coordinate of (xc+W−1, yc−1), and
the bottom-left corner neighboring block is located on the coordinate of (xc−1, yc+H) and the second left neighboring block is located on the coordinate of (xc−1, yc+H−1).

11. The video encoding method of claim 8,
wherein the first predefined priority order is from the top-left corner neighboring block to the first top neighboring block to the first left neighboring block,
wherein the second predefined priority order is from the top-right corner neighboring block to the second top neighboring block, and
wherein the third predefined priority order is from the bottom-left corner neighboring bock to the second left neighboring block.

12. The video encoding method of claim 8,
wherein the second CP is located on a coordinate of (xc+W, yc) and the third CP is located on a coordinate of (xc, yc+W/2), wherein (xc, yc) is a top-left sample position of the current block, and W and H are a width and a height of the current block respectively.

13. The video encoding method of claim 8, wherein:
the motion vector related to a sample position for the current block is derived based on the following equations, $$Vx=(Vx1-Vx0)*x/W+(Vx2-Vx0)*y/(W/2)+Vx0,$$

wherein the Vx represents a x component of the motion vector related to the sample position at a coordinate of (x, y), the Vy represents a y component of the motion vector related to the sample position at the coordinate of (x, y), the Vx0 represents a x component of the first motion vector for the first CP, the Vy0 represents a y component of the first motion vector for the first CP, the Vx1 represents a x component of the second motion vector for the second CP, the Vy1 represents a y component of the second motion vector 1 for the second CP, the Vx2 represents a x component of the third motion vector for the third CP, the Vy2 represents a y component of the third motion vector for the third CP, and W and H are a width and a height of the current block respectively.

14. The video encoding method of claim 8, wherein:
the top-left corner neighboring block is located on the coordinate of (xc−1, yc−1), the first top neighboring block is located on the coordinate of (xc, yc−1), and the first left neighboring block is located on the coordinate of (xc−1, yc),
the top-right corner neighboring block is located on the coordinate of (xc+W, yc−1) and the second top neighboring block is located on the coordinate of (xc+W−1, yc−1), and
the bottom-left corner neighboring block is located on a coordinate of (xc−1, yc+W/2) and the second left neighboring block is located on a coordinate of (xc−1, yc+W/2−1).

15. A non-transitory computer-readable digital storage medium storing a bitstream generated by a video encoding method, the method comprising:
deriving motion vectors for control points (CPs) for a current block;
deriving a motion vector for the current block based on the obtained motion vectors for the CPs;
performing a prediction for the current block based on the motion vector for the current block; and
encoding video information including information on the prediction for the current block to output the bitstream,
wherein the CPs includes a first CP, a second CP and a third CP, wherein the first CP is for a top-left corner of the current block, the second CP is for a top-right corner of the current block and the third CP is for bottom-left corner of the current block,
wherein the motion vectors for the CPs include a first motion vector for the first CP, a second motion vector for the second CP and a third motion vector for the third CP,
wherein the first motion vector is derived based on a firstly-checked available block according to a first predefined priority order in a first block group,
wherein the first block group comprises a top-left corner neighboring block of the current block, a first top neighboring block which is leftmost block among blocks adjacent to an upper side of the current block and a first left neighboring block which is an uppermost block among blocks adjacent to a left side of the current block,
wherein the second motion vector is derived based on a firstly-checked available block according to a second predefined priority order in a second block group,
wherein the second block group comprises a top-right corner neighboring block of the current block and a second top neighboring block which is a rightmost block among the blocks adjacent to the upper side of the current block,
wherein the third motion vector is derived based on a firstly-checked available block according to a third predefined priority order in a third block group, and
wherein the third block group comprises a bottom-left corner neighboring block of the current block and a second left neighboring block which is a lowermost block among the blocks adjacent to the left side of the current block.

16. A transmission method of data for a video, the method comprising:
obtaining a bitstream for the video, wherein the bitstream is generated based on deriving motion vectors for control points (CPs) for a current block, deriving a motion vector for the current block based on the obtained motion vectors for the CPs, performing a prediction for the current block based on the motion vector for the current block, and encoding video information including information on the prediction for the current block; and
transmitting the data comprising the bitstream,
wherein the CPs includes a first CP, a second CP and a third CP, wherein the first CP is for a top-left corner of the current block, the second CP is for a top-right corner of the current block and the third CP is for bottom-left corner of the current block,
wherein the motion vectors for the CPs include a first motion vector for the first CP, a second motion vector for the second CP and a third motion vector for the third CP,
wherein the first motion vector is derived based on a firstly-checked available block according to a first predefined priority order in a first block group,
wherein the first block group comprises a top-left corner neighboring block of the current block, a first top neighboring block which is leftmost block among blocks adjacent to an upper side of the current block and a first left neighboring block which is an uppermost block among blocks adjacent to a left side of the current block,
wherein the second motion vector is derived based on a firstly-checked available block according to a second predefined priority order in a second block group,
wherein the second block group comprises a top-right corner neighboring block of the current block and a second top neighboring block which is a rightmost block among the blocks adjacent to the upper side of the current block,
wherein the third motion vector is derived based on a firstly-checked available block according to a third predefined priority order in a third block group, and
wherein the third block group comprises a bottom-left corner neighboring block of the current block and a second left neighboring block which is a lowermost block among the blocks adjacent to the left side of the current block.

* * * * *